US008715035B2

(12) United States Patent
Roy et al.

(10) Patent No.: US 8,715,035 B2
(45) Date of Patent: May 6, 2014

(54) CUSTOMIZED POLISHING PADS FOR CMP AND METHODS OF FABRICATION AND USE THEREOF

(75) Inventors: Pradip K. Roy, Orlando, FL (US); Manish Deopura, Sunnyvale, CA (US); Sudhanshu Misra, San Jose, CA (US)

(73) Assignee: NexPlanar Corporation, Hillsboro, OR (US)

( * ) Notice: Subject to any disclaimer, the term of this patent is extended or adjusted under 35 U.S.C. 154(b) by 1133 days.

(21) Appl. No.: 11/884,829

(22) PCT Filed: Feb. 21, 2006

(86) PCT No.: PCT/US2006/006176
§ 371 (c)(1),
(2), (4) Date: Oct. 16, 2008

(87) PCT Pub. No.: WO2006/089293
PCT Pub. Date: Aug. 24, 2006

(65) Prior Publication Data
US 2009/0053976 A1    Feb. 26, 2009

Related U.S. Application Data

(63) Continuation-in-part of application No. 11/251,547, filed on Oct. 14, 2005, now Pat. No. 7,704,125, which is a continuation-in-part of application No. 10/810,070, filed on Mar. 25, 2004, now Pat. No. 7,425,172, said application No. 11/251,547 is a continuation-in-part of application No. PCT/US2004/017638, filed on Jun. 3, 2004, and a continuation-in-part of application No. 10/897,192, filed on Jul. 21, 2004, now Pat. No. 7,377,840.

(60) Provisional application No. 60/654,104, filed on Feb. 18, 2005, provisional application No. 60/654,173, filed on Feb. 18, 2005, provisional application No. 60/677,062, filed on May 2, 2005, provisional application No. 60/457,273, filed on Mar. 25, 2003.

(51) Int. Cl.
*B24B 49/00* (2012.01)

(52) U.S. Cl.
USPC .............. 451/6; 451/526; 451/533; 451/539

(58) Field of Classification Search
USPC .............................. 451/6, 526–539
See application file for complete search history.

(56) References Cited

U.S. PATENT DOCUMENTS 959,054 A * 5/1910 Glover .......................... 451/530
(Continued)

FOREIGN PATENT DOCUMENTS

JP            08025205         1/1996
(Continued)

OTHER PUBLICATIONS

Anonymous (1994). "Polishing and Etching Langasite and Quartz Crystals," *IEEE International Frequency Control Symposium* see p. 2, col. 1, text lines 14-17.

(Continued)

*Primary Examiner* — Maurina Rachuba
(74) *Attorney, Agent, or Firm* — Blakely Sokoloff Taylor Zafman LLP

(57) ABSTRACT

The present application relates to polishing pads for chemical mechanical planarization (CMP) of substrates, and methods of fabrication and use thereof. The pads described in this invention are customized to polishing specifications where specifications include (but not limited to) the material being polished, chip design and architecture, chip density and pattern density, equipment platform and type of slurry used. These pads can be designed with a specialized polymeric nano-structure with a long or short range order which allows for molecular level tuning achieving superior thermo-mechanical characteristics. More particularly, the pads can be designed and fabricated so that there is both uniform and nonuniform spatial distribution of chemical and physical properties within the pads. In addition, these pads can be designed to tune the coefficient of friction by surface engineering, through the addition of solid lubricants, and creating low shear integral pads having multiple layers of polymeric material which form an interface parallel to the polishing surface. The pads can also have controlled porosity, embedded abrasive, novel grooves on the polishing surface, for slurry transport, which are produced in situ, and a transparent region for endpoint detection.

48 Claims, 48 Drawing Sheets

Hardness can be controlled by the chain length of soft-segment

(56) References Cited

U.S. PATENT DOCUMENTS

| Patent No. | | Date | Inventor | Ref |
|---|---|---|---|---|
| 5,020,283 | A * | 6/1991 | Tuttle | 451/550 |
| 5,197,999 | A | 3/1993 | Thomas | |
| 5,527,215 | A | 6/1996 | Rubino et al. | |
| 5,534,106 | A | 7/1996 | Cote et al. | |
| 5,605,760 | A | 2/1997 | Roberts | |
| 5,690,540 | A | 11/1997 | Elliott et al. | |
| 5,769,699 | A | 6/1998 | Yu | |
| 5,842,910 | A | 12/1998 | Krywanczyk et al. | |
| 5,893,796 | A | 4/1999 | Birang et al. | |
| 5,899,745 | A * | 5/1999 | Kim et al. | 438/692 |
| 5,921,855 | A | 7/1999 | Osterheld et al. | |
| 5,944,583 | A | 8/1999 | Cruz et al. | |
| 6,022,268 | A | 2/2000 | Roberts et al. | |
| 6,045,439 | A | 4/2000 | Birang et al. | |
| 6,062,958 | A | 5/2000 | Wright et al. | |
| 6,068,539 | A | 5/2000 | Bajaj et al. | |
| 6,077,153 | A | 6/2000 | Fujita et al. | |
| 6,120,366 | A | 9/2000 | Lin et al. | |
| 6,126,532 | A | 10/2000 | Sevilla et al. | |
| 6,146,242 | A | 11/2000 | Treur et al. | |
| 6,168,508 | B1 | 1/2001 | Nagahara et al. | |
| 6,171,181 | B1 | 1/2001 | Roberts et al. | |
| 6,179,709 | B1 | 1/2001 | Redeker et al. | |
| 6,239,118 | B1 | 5/2001 | Schatz et al. | |
| 6,254,459 | B1 | 7/2001 | Bajaj et al. | |
| 6,257,973 | B1 | 7/2001 | Fernand Guiselin | |
| 6,280,289 | B1 | 8/2001 | Wiswesser et al. | |
| 6,280,290 | B1 | 8/2001 | Birang et al. | |
| 6,293,852 | B1 | 9/2001 | Roberts et al. | |
| 6,293,853 | B1 | 9/2001 | Perlov et al. | |
| 6,315,645 | B1 | 11/2001 | Zhang et al. | |
| 6,358,130 | B1 | 3/2002 | Freeman et al. | |
| 6,368,200 | B1 | 4/2002 | Merchant et al. | |
| 6,383,058 | B1 | 5/2002 | Birang et al. | |
| 6,387,312 | B1 | 5/2002 | Roberts et al. | |
| 6,390,890 | B1 | 5/2002 | Molnar | |
| 6,413,153 | B1 * | 7/2002 | Molar | 451/259 |
| 6,448,568 | B1 | 9/2002 | Allen et al. | |
| 6,454,630 | B1 | 9/2002 | Tolles | |
| 6,454,634 | B1 | 9/2002 | James et al. | |
| 6,458,014 | B1 * | 10/2002 | Ihsikawa et al. | 451/6 |
| 6,477,926 | B1 | 11/2002 | Swisher et al. | |
| RE37,997 | E * | 2/2003 | Tuttle | 451/548 |
| 6,520,847 | B2 | 2/2003 | Osterheld et al. | |
| 6,524,164 | B1 | 2/2003 | Tolles | |
| 6,537,133 | B1 | 3/2003 | Birang et al. | |
| 6,544,104 | B1 | 4/2003 | Koike et al. | |
| 6,544,107 | B2 | 4/2003 | Misra et al. | |
| 6,565,419 | B1 | 5/2003 | Nishio et al. | |
| 6,582,283 | B2 | 6/2003 | James et al. | |
| 6,604,985 | B2 | 8/2003 | Muilenburg et al. | |
| 6,641,470 | B1 | 11/2003 | Zhao et al. | |
| 6,648,733 | B2 | 11/2003 | Roberts et al. | |
| 6,657,726 | B1 | 12/2003 | Wang et al. | |
| 6,676,483 | B1 | 1/2004 | Roberts et al. | |
| 6,676,717 | B1 | 1/2004 | Birang et al. | |
| 6,682,402 | B1 | 1/2004 | Roberts | |
| 6,685,537 | B1 | 2/2004 | Fruitman et al. | |
| 6,716,085 | B2 | 4/2004 | Wiswesser et al. | |
| 6,719,818 | B1 | 4/2004 | Birang et al. | |
| 6,722,249 | B2 | 4/2004 | David | |
| 6,736,709 | B1 | 5/2004 | James et al. | |
| 6,749,485 | B1 | 6/2004 | James et al. | |
| 6,752,690 | B1 | 6/2004 | Fruitman | |
| 6,786,810 | B2 | 9/2004 | Muilenburg et al. | |
| 6,806,100 | B1 | 10/2004 | Xu et al. | |
| 6,821,570 | B2 | 11/2004 | Obeng et al. | |
| 6,824,447 | B2 | 11/2004 | Takahashi et al. | |
| 6,837,781 | B2 | 1/2005 | Hishiki | |
| 6,843,711 | B1 | 1/2005 | Muldowney | |
| 6,843,712 | B2 | 1/2005 | Roberts et al. | |
| 6,846,225 | B2 | 1/2005 | Obeng et al. | |
| 6,857,941 | B2 | 2/2005 | Emami et al. | |
| 6,860,793 | B2 | 3/2005 | Budinger et al. | |
| 6,860,802 | B1 | 3/2005 | Vishwanathan et al. | |
| 6,862,949 | B2 | 3/2005 | Hanamura | |
| 6,869,350 | B2 | 3/2005 | Roberts et al. | |
| 6,949,020 | B2 | 9/2005 | Xu et al. | |
| 6,955,587 | B2 | 10/2005 | Muldowney | |
| 6,974,372 | B1 | 12/2005 | Muldowney | |
| 7,004,823 | B2 | 2/2006 | Kisbøll et al. | |
| 7,018,282 | B1 * | 3/2006 | Drill et al. | 451/529 |
| 7,140,955 | B2 | 11/2006 | Nabeya | |
| 7,329,174 | B2 | 2/2008 | Hosaka et al. | |
| 2001/0041511 | A1 | 11/2001 | Lack et al. | |
| 2002/0013120 | A1 * | 1/2002 | Wiswesser et al. | 451/6 |
| 2002/0078632 | A1 | 6/2002 | Hasegawa et al. | |
| 2002/0086615 | A1 * | 7/2002 | Moon | 451/25 |
| 2002/0102924 | A1 | 8/2002 | Obeng et al. | |
| 2002/0115385 | A1 * | 8/2002 | Misra et al. | 451/41 |
| 2003/0019570 | A1 | 1/2003 | Chen et al. | |
| 2003/0027500 | A1 | 2/2003 | James et al. | |
| 2003/0083003 | A1 | 5/2003 | West, Jr. et al. | |
| 2003/0094721 | A1 | 5/2003 | Horie et al. | |
| 2003/0100250 | A1 | 5/2003 | West, Jr. | |
| 2003/0109209 | A1 | 6/2003 | Hishiki | |
| 2003/0114084 | A1 | 6/2003 | Moon et al. | |
| 2003/0139122 | A1 | 7/2003 | Lawing | |
| 2003/0220061 | A1 | 11/2003 | Prasad | |
| 2004/0048562 | A1 | 3/2004 | Roberts et al. | |
| 2004/0048564 | A1 | 3/2004 | Roberts et al. | |
| 2004/0171338 | A1 | 9/2004 | Prasad | |
| 2004/0171339 | A1 | 9/2004 | Prasad | |
| 2004/0171340 | A1 | 9/2004 | Prasad | |
| 2004/0177563 | A1 | 9/2004 | Prasad | |
| 2004/0209066 | A1 | 10/2004 | Swisher et al. | |
| 2004/0235398 | A1 | 11/2004 | Thornton et al. | |
| 2004/0248501 | A1 | 12/2004 | Kim et al. | |
| 2004/0258882 | A1 | 12/2004 | Prasad | |
| 2005/0020082 | A1 | 1/2005 | Vishwanathan et al. | |
| 2005/0042976 | A1 * | 2/2005 | Ronay | 451/41 |
| 2005/0064709 | A1 | 3/2005 | Shimomura et al. | |
| 2005/0260929 | A1 | 11/2005 | Shiho et al. | |
| 2006/0019587 | A1 | 1/2006 | Deopura et al. | |
| 2006/0189269 | A1 | 8/2006 | Roy et al. | |
| 2006/0276109 | A1 | 12/2006 | Roy et al. | |

FOREIGN PATENT DOCUMENTS

| | | |
|---|---|---|
| JP | 11285961 | 10/1999 |
| JP | 11347919 | 12/1999 |
| JP | 2000061818 | 2/2000 |
| JP | 2000158325 | 6/2000 |
| JP | 2000176829 | 6/2000 |
| JP | 2000246620 | 9/2000 |
| JP | 2000354951 | 12/2000 |
| JP | 2001138212 | 5/2001 |
| JP | 2001162515 | 6/2001 |
| JP | 2002178255 | 6/2002 |
| JP | 2003209078 | 7/2003 |
| JP | 2004025415 | 1/2004 |
| JP | 2004337992 | 12/2004 |
| KR | 101999003477 | 5/1999 |
| WO | WO-9845087 | 10/1998 |
| WO | WO-0112387 | 2/2001 |
| WO | WO-0191972 | 12/2001 |
| WO | WO-2005000529 | 1/2005 |

OTHER PUBLICATIONS

Anonymous (May/Jun. 1998). "3-D Printing Speeds Prototype Development," *Molding Systems* 56(5):40-41.

CMP Technologies/Electronic Materials. (Apr. 2005). Suba Product Description, located at <http://electronicmaterials.rohmhaas.com>, two pages.

Dekker, C. (Jan. 2003). "Stereolithography Tooling for Silicone Molding," *Advanced Materials & Processes* 161 (1):59-61.

Denardis, D. et al. (Nov. 2003). "Tribology and Removal Rate Characteristics of Abrasive-Free Slurries for Copper CMP Applications," *Japanese J. Appl. Phys.* 42(part 1)(11):6809-6814.

Deopura, M. et al. (2005). "Stress Characterization of Post-CMP Copper Films Planarized Using Novel Low-Shear and Surface-Engineered Pads," *Materials Research Society Symposium Proceed-*

(56) References Cited

OTHER PUBLICATIONS

*ings*, San Francisco, California, U.S.A., Mar. 28-31, 2005, 867: 197-208.

Doy, T. et al. (2004). "Impact of Novel Pad Groove Designs on Removal Rate and Uniformity of Dielectric and Copper CMP," *Journal of the Electrochemical Society* 151(3):G196-G199.

Duarte, J.P. et al. (Mar./Apr. 1998). "Abrasive Water Jet: A Complementary Tool," *Rivista De Metalurgia* 34(2):217-219. (Translation of Abstract Only.).

Heckele, M. et al. (Mar. 2004). "Review on Micro Molding of Thermoplastic Polymers," *J. Micromechanics and Microengineering* 14(3):R1-R14.

International Search Report mailed on Oct. 19, 2004, for PCT Application No. PCT/US2004/017638, filed on Jun. 3, 2004, two pages. (3.40).

International Search Report mailed on Feb. 24, 2006, for PCT Application No. PCT/US2005/025330, filed on Jul. 15, 2005, four pages. (7.40).

International Preliminary Report on Patentability and Written Opinion mailed Feb. 24, 2006 for PCT Application No. PCT/US2005/025330 filed Jul. 15, 2005, seven pages. (7.40).

International Search Report mailed on Jun. 7, 2006, for PCT Application No. PCT/US2006/006176, filed on Feb. 21, 2006, three pages. (8.40).

International Preliminary Report on Patentability and Written Opinion mailed Aug. 30, 2007, for PCT Application No. PCT/US2006/006176, filed on Feb. 21, 2006, five pages. (8.40).

Kim, J. et al. (Nov. 2003). "Excimer Laser Fabrication of Polymer Microfluidic Devices," *J. Laser Applications* 15(4):255-260.

Philipossian, A. et al. (2003). "Fundamental Tribological and Removal Rate Studies of Inter-Layer Dielectric Chemical Mechanical Planarization," *Japanese J. Appl. Phys.* 42(pt. 1)(10):6371-6379.

Smock, D. (Apr. 1998). "New Formulations, Process Technology Propel Silicone Molding," *Modern Plastics* 75:64-65.

Stein, D.J. et al. (2001). "A Review of Dielectric CMP Pad Material Choice and Manufacturing Techniques and the Effect of Pad Mechanical Properties on Process Metrics," *2001 Proceedings of the Sixth International Chemical-Mechanical Planarization for ULSI Multilevel Interconnection Conference (CMP-MIC)*, Santa Clara, California, U.S.A. Mar. 7-8, 2001, 454-463.

Non-Final Office Action mailed on Nov. 29, 2005, for U.S. Appl. No. 11/060,898, 5 pages.

Notice of Abandonment mailed on Sep. 20, 2006, for U.S. Appl. No. 11/060,898, 2 pages.

Restriction Requirement mailed on Jan. 31, 2007, for U.S. Appl. No. 11/251,547, 6 pages.

Response to Restriction Requirement submitted on Feb. 20, 2007, for U.S. Appl. No. 11/251,547, 2 pages.

Miscellaneous Action with SSP mailed on May 7, 2007, for U.S. Appl. No. 11/251,547, 4 pages.

Miscellaneous Action with SSP mailed on May 11, 2007, for U.S. Appl. No. 11/251,547, 4 pages.

Response to Non-Final Office Action submitted on Jul. 9, 2007, for U.S. Appl. No. 11/251,547, 14 pages.

Non-Final Office Action mailed on Sep. 25, 2007, for U.S. Appl. No. 11/251,547, 4 pages.

Amendment in Response to Non-Final Office Action mailed on Mar. 24, 2008, for U.S. Appl. No. 11/251,547, filed Oct. 14, 2005, 8 pages.

Final Office Action mailed on Jun. 13, 2008, for U.S. Appl. No. 11/251,547, filed Oct. 14, 2005, 6 pages.

Restriction Requirement mailed on Sep. 1, 2005, for U.S. Appl. No. 10/897,192, 5 pages.

Response to Election of Species Requirement submitted on Oct. 3, 2005, for U.S. Appl. No. 10/897,192, 3 pages.

Non-Final Office Action mailed on Dec. 19, 2005, for U.S. Appl. No. 10/897,192, 4 pages.

Amendment in Response to Non-Final Office Action mailed on Mar. 20, 2006, for U.S. Appl. No. 10/897,192, 7 pages.

Final Office Action mailed on Jun. 13, 2006, for U.S. Appl. No. 10/897,192, 5 pages.

Request for Continued Examination mailed on Dec. 11, 2006, for U.S. Appl. No. 10/897,192, 1 page.

Amendment with Request for Continued Examination mailed on Dec. 11, 2006, for U.S. Appl. No. 10/897,192, 12 pages.

Non-Final Office Action mailed on Mar. 8, 2007, for U.S. Appl. No. 10/897,192, 6 pages.

Amendment in Response to Non-Final Office Action mailed on Dec. 10, 2007, for U.S. Appl. No. 10/897,192, 13 pages.

First Office Action from Chinese Patent Application No. 200680012730.7 mailed Nov. 28, 2008, 6 pgs.

Second Office Action from Chinese Patent Application No. 200680012730.7 mailed Feb. 12, 2010, 4 pgs.

First Office Action from Israeli Patent Application No. 185099 mailed Jul. 21, 2010, 2 pgs.

First Office Action from Japanese Patent Application No. 2007-556409 mailed Oct. 17, 2011, 44 pgs.

Second Office Action from Japanese Patent Application No. 2007-556409 mailed Sep. 3, 2012, 20 pgs.

Final Office Action from Japanese Patent Application No. 2007-556409 mailed May 31, 2013, 5 pgs.

Notification of Grounds for Refusal from Korean Patent Application No. 10-2007-7021088 mailed Dec. 7, 2012, 14 pgs.

\* cited by examiner 20 inch part 24 inch 30 inch under US 8,715,035 B2

CUSTOMIZED POLISHING PADS FOR CMP AND METHODS OF FABRICATION AND USE THEREOF

CROSS-REFERENCE TO RELATED APPLICATIONS

This application claims the priority benefit of U.S. patent application Ser. No. 11/251,547 filed on Oct. 14, 2005. This application claims the benefit of PCT application No. US2005/025330 filed on Jul. 15, 2005. This application claims the priority benefit of U.S. patent application Ser. No. 11/060,898 filed on Feb. 18, 2005. This application claims the priority benefit of U.S. patent application No. 60/654,104 filed on Feb. 18, 2005. This application claims the priority benefit of U.S. patent application No. 60/654,173, filed on Feb. 18, 2005. This application claims the priority benefit of U.S. patent application No. 60/677,062, filed May 2, 2005. U.S. patent application Ser. No. 11/251,547 is a continuation-in-part of U.S. patent application Ser. No. 10/810,070, filed on Mar. 25, 2004 which claims the priority benefit of U.S. provisional application No. 60/457,273 filed Mar. 25, 2003 and is a continuation-in-part of U.S. patent application Ser. No. 11/060,898, filed Feb. 18, 2005 and is a continuation-in-part of PCT application US2004/017638, filed Jun. 3, 2004 which claims the priority benefit of U.S. provisional application No. 60/457,305, filed Jun. 3, 2003 and is a continuation-in-part of U.S. patent application Ser. No. 10/897,192, filed Jul. 21, 2004. The above applications are hereby incorporated by reference in their entirety.

The following applications are hereby incorporated by reference in their entirety, as if fully put forth below.

PCT application No. US2004/009535 filed Mar. 25, 2004 which claims priority to U.S. application number No. 60/457,273, filed Mar. 25, 2003.

U.S. provisional application No. 60/475,374 filed Jun. 3, 2003.

U.S. provisional application No. 60/475,283, filed Jun. 3, 2003.

U.S. provisional application No. 60/475,307 filed Jun. 3, 2003.

PCT application No. US2005/025330, filed Jul. 15, 2005 which claims priority to U.S. patent application Ser. No. 10/897,192, filed Jul. 21, 2004.

U.S. provisional application No. 60/486,306, filed Apr. 28, 2003.

U.S. provisional application No. 60/567,893, filed May 3, 2004.

FIELD

Background

CMP utilizes a slurry, referred to as a reactive liquid medium, in conjunction with a polishing pad to provide the chemical and mechanical action for removal of material from the substrate surface during the planarization process. For example, one area of use for CMP is for the planarization of individual layers (dielectric or metal layers) during integrated circuit (IC) fabrication on a semiconductor substrate. CMP removes undesirable topographical features of the IC layers, such as excess metal deposits subsequent to damascene processes, removal of excess oxide from shallow trench isolation (STI) steps, or planarizing inter-level dielectric (ILD) and inter-metal dielectric (IMD) layers. The main purpose of CMP used in IC fabrication is to maintain planarity at each step of depositing and photo-lithographically imaging sequential dielectric and metal layers.

During the CMP process, the chemical interaction of the slurry with the substrate forms a chemically modified layer at the polishing surface. Simultaneously, abrasives in the slurry mechanically interact with chemically modified surface layers resulting in material removal. Polishing pads are typically made of a rigid, micro-porous polymeric material, such as polyurethane, and perform several functions including providing uniform slurry transport, distribution and removal of the reacted products, and uniform distribution of applied pressure across the wafer. At the nano to micron-scale, the interaction of the pad and slurry in the formation and removal of the thin surface layer determine the removal rate (RR), surface planarity, surface non-uniformities, surface defects, and selectivity of material removal. In that regard, the pad local material/tribological/mechanical properties are critical to both local and global planarization during the CMP process.

As previously mentioned, one area of use of CMP is for the semiconductor industry, where CMP is used in different process steps. The current art of CMP pads, which are both open-pore and closed-pore polymeric pads, are not tailored to achieve customized tribological, chemical and frictional characteristics. Although, such pads may be suitable for the processing of conventional ICs, for the new and evolving sub-90 nm CMOS technologies, high yields are not obtained with these pads. These challenges result from increased complexities in design [i.e. system on a chip (SOC)], and process [i.e. silicon on insulator (SOI)], as well as differences and changes in materials [i.e. STI; copper and low k dielectrics], variation in chip pattern density, and increased chip size. The impact of these challenges related to the processing of sub-90 nm technologies is that chip yields, device performance, and device reliability have deteriorated significantly.

A typical CMP process would be able to remove excess dielectric during the semiconductor fabrication process. With complexities in design, the first dimension which gets affected is the increase in the number of material being polished simultaneously. For example, both STI, and copper CMP (Cu CMP) represent challenges of the CMP of dissimilar materials. During STI CMP, dishing of oxide, and erosion of nitride are typically observed, where the differences in materials demand a CMP process with selectivity for removal rate (RR) of such materials. Similarly, for the Cu CMP of the evolving sub 90 nm technologies, dishing occurs when copper is unevenly removed through mechanical action, such as pad flexing and abrasive gouging, while erosion creates surface anomalies due to localized excessive removal of dielectric. A high degree of planarization is compromised by excessive dishing and erosion, which causes difficulties in meeting resistance specifications across different pattern densities. Presently, the problem of feature loss due to loss of planarization resulting from dishing and erosion accounts for over 50% of yield loss for the sub 90 nm technologies. Dishing and erosion are impacted by pad properties, such as hardness, toughness, and porosity.

As another example, variation of pattern density presents challenges for the CMP of ICs. For example, pattern density is correlated with chip size, so that a lower pattern density is correlated with smaller chip size, and conversely, a higher pattern density exists for larger chip size. It is desired to vary pad features, such as hardness, surface architecture, and surface texturing, as a function of variation of pattern density. Further complexities arise since the pattern densities within a single chip typically vary as well. The polishing parameters such as removal rate are dependent on the chip pattern density.

SUMMARY

Given the numerous variables in IC fabrication, such as IC design, material differences, and pattern density, there is a need in the art for polishing pads which can systematically address these issues to achieve high quality of polishing taking into consideration the various eventual outputs of a polishing process. Such avenues of customized polishing methods require various techniques of pad engineering. Considering size scales, pad engineering can be viewed as a customization process at the nano-micron length scale as well as macro length scales (macro length scale is on the order of approximately 1 cm). For example, at the nano-length scale it can be desirable to have a tailored pad nano-structure (i.e. distribution, size, and type of hard domains throughout the pad). At the macro-length scale, several opportunities for engineering exist. CMP pads can be designed and fabricated so that there is spatial distribution of chemical and physical properties of the pads that are customized for performance suited to a specific type of substrate. In this regard, in can be desirable to have polishing pads in which properties, such as material type, as well as physical properties, such as hardness, porosity, toughness, and compressibility are selectively designed before fabrication. In can also desirable to include add features to pad. One feature is the surface engineering of pads through the additional of solid lubricants within the body of the pad. Another feature is the control of the porosity through out the pad, through the use of different amounts and sizes of porosity agents as well as manufacture processing temperatures. Another feature is functionally grading the pad by adjusting the polymeric composition of the pad in different regions along the polishing surface. Another feature is the manufacture of low shear pads, in which interfaces are deliberately added within the pad body. Another feature is the addition of embedded abrasive in pads by distributing selected abrasives within the pads. Another feature is the manufacture of in situ grooves on the polishing surface to optimize slurry transport. Another feature is the manufacture of an optically transparent region in the pad for endpoint detection. Various customized polishing pads disclosed herein address the need in the art for such pads having customized design, as well as fabrication control in implementing such customized design. Such customized design and fabrication control produce a single unified pad thereby specifically suited to provide superior performance of CMP of the targeted substrate.

In general, for CMP, uniformity of pad properties, such as pad modulus, pore size distribution and the chemical structure of the material are known to be critical for stable operation in the boundary lubrication regime. Design methods through which these fundamental pad properties are obtained, as well as customized polishing requirements like low COF are described.

Pads having one or any combination of the following characteristics are described:

1) Pad Micro-Structure

The choice of pad micro-structure can have a impact on the polishing properties. Several polymers have been used in the past as polishing pad materials, which include polyolefins, polyurethanes and polycarbonates. Amongst all polymers, urethanes are used most commonly to make CMP pads. In the present invention, the pad micro-structure has been controlled through selection of appropriate polymeric components. An isocyanate prepolymer is first synthesized or commercially obtained. The isocyanate prepolymer is then reacted in with a mixture of polyamine and polyol chain extenders and polyamine and polyol curatives to complete the polymer formation. As a result, a uniform spatial distribution of alternating hard and soft domains with a long range order is obtained at the nano-micron length scale. Such a pad microstructure can allow for a flat and extended Stribeck curve. Further, such pad structure can allow for superior control of tribological, thermal and optical properties. Accordingly, these properties can also be spatially distributed to achieve customized polishing functionality.

As a result of this polymeric formulation several properties of the polymer pad, such as the storage modulus ($E'$) of the polymer, loss modulus ($E''$) of the polymer can be increased while the glass transition temperature ($T_g$) of the pad polymer, the ratio (tan $\delta$) of $E''$ to $E'$ of the pad, KEL (tan $\delta * 10^{12}$ ($E'(1+\tan^2\delta)$)), surface tension, compressibility, thermal transient, $\Delta E'$ as a function of temperature, and the compressibility can be decreased and the surface tension can be modulated.

2) Controlled Porosity

Control of pad porosity; i.e. in controlling the size, density, and shape of pores can have an impact on factors such as slurry transport, microtexture and abrasive distribution, which in turn can have impact on key metrics of uniform performance of CMP, such as removal rate (RR), and the number of within wafer non-uniformities (WIWNU). Additionally, it is further observed that pads fabricated without control of porosity can cause a non-uniform shear force on the substrate from different regions of the pad, and therefore a non-uniform COF over the entire process range. The non-uniformity of shear force has an impact on two additional metrics of CMP performance, planarity and defectivity.

Various customized polishing pads disclosed herein can be fabricated so that the porosity formed in the subject pads is highly controlled with respect to porosity, i.e. pore size and shape and pore density, and the distribution of porosity.

3) Functional Grading of Mechanical Properties

Function grading of materials refers to different regions of polymeric material along the polishing surface which may or may not be radially symmetric. Functional grading of pad mechanical properties can be used to modulate pad tribology and polishing properties in a pre-defined systematic manner and can lead to an increase in the planarization length and efficiency. Functional grading can also be useful for overcoming outer edge yield loss during CMP. One reason for outer edge yield loss is the uneven distribution of pressure as seen by the wafer during the polishing process. The uneven distribution of pressure from the center to the edge is inherent to the way the wafer is mounted on the polishing head. Reduction in the outer edge yield and a decrease in the number of defects can be achieved if radially symmetric functional grading issued to compensate for the uneven pressure distribution. Functional grading of mechanical properties (hardness, compressibility, pore size and distribution) can be used to compensate for any non-uniformity in pressure distribution.

4) Surface-Engineering

Surface-engineering of pads is achieved through the addition of solid lubricants and/or polymeric lubricants within the pad. Such methods of surface-engineering through lubricant addition can be used effectively to reduce the coefficient of friction while maintaining the desired removal rate. These pads can be used for most polishing applications, since a lower COF can be desirable for most applications. In particular, these surface engineered pads can be used for all the processing steps in copper CMP, which include the bulk, the soft landing and the barrier removal steps, eliminating the need for three different pads for each of the processing steps.

5) Low-Shear Integral Pads

Low-shear integral pads have at least one interface which can be parallel to the polishing surface. This interface can be selectively formed in situ between materials having either the same or different properties and can lead to a reduction of the shear force at the pad/substrate boundary. Reduction of shear force allows for the reduction of COF during polishing while maintaining the desired removal rate. A schematic of a low-shear pad is shown in FIG. 11 which shows an interface parallel to the polishing surface.

6) Embedded Abrasive Pad

Embedded abrasive pads may be made by incorporating abrasives within a pad during pad manufacture by techniques such as liquid casting/molding, injection molding, sintering and others. The embedded abrasive pads can have the advantage of eliminating the need for the addition of abrasives to the slurry, by providing these abrasives through the pad composition. Embedded abrasive pads can comprise individual abrasive particles and also block copolymers, where the block copolymer has a differing constituent abrasive polymeric composition in the block copolymer over distance.

7) In Situ Grooved Pads

In general, the methods for producing in-situ grooves comprise the steps of patterning a silicone lining, placing the silicone lining in, or on, a mold, adding CMP pad material to the silicone lining, and allowing the CMP pad to solidify. In some variations, the silicone lining can be made from a silicone elastomer, and in some variations, patterning the silicone lining comprises the step of patterning the silicone lining using lithography or embossing. The methods of producing in-situ grooves may further comprise the step of adhering the silicone lining to the mold, for example, using glue, tape, clamps, pressure fitting techniques, or mixtures thereof.

In some variations, the mold is metallic. For example, the mold may be made from a material selected from the group consisting of aluminum, steel, ultramold material, and mixtures thereof. In some variations, the mold is patterned, in addition to the patterning of the silicone lining (i.e, a combination of patterning is used). In some variations, the CMP pad material comprises a thermoplastic material. In other variations, the CMP pad material comprises a thermoset material. In some variations, the CMP pad material is polyurethane.

CMP pads comprising novel groove designs are also described. For example, described here are CMP pads comprising reverse logarithmic grooves, concentric circular grooves and axially curved grooves. In one variation, the axially curved grooves are discontinuous. The concentric circular grooves and the axially curved grooves may also intersect.

The grooves produced therein may be made by a method from the group consisting of silicone lined molding, laser writing, water jet cutting, 3-D printing, thermoforming, vacuum forming, micro-contact printing, hot stamping, and mixtures thereof.

8) Pads with a Transparent Window for Endpoint Detection

Polishing pads are provided comprising a transparent region and methods of manufacturing such pads. The pads are useful in methods of detecting the end point of a substrate polishing process, such as a CMP process, wherein optical measurements are used to assess the surface of the substrate. Such optical measurements can measure the light transmitted through the polishing pad, either from a light source to the substrate surface or to the slurry below the substrate surface, or from the substrate surface or from the slurry below the substrate surface to a detector, or both. As such, the transparent region of the polishing pad is sufficiently transparent over a spectrum or a wavelength of light. Preferably it is sufficiently transparent to at least one or more wavelengths of light from the ultraviolet, visible and infrared spectra, such as from 100 nm to 1,000 nm. The transparent region need not be transparent across the entire spectra, but could be transparent to one or more wavelengths within such a broad spectra.

Optical transparency is achieved by reducing scattering centers through reduction of porous elements. In one instance, the polishing pad comprises a polymer having a transparent region that lacks pores so as to be sufficiently transparent to a desired wavelength or wavelengths of light and a microporous region that is sufficiently less transparent to a desired wavelength or wavelengths of light than the transparent region. The less transparent region is sufficiently porous such that it has a desired compressibility or hardness.

In one instance, the transparent region is sufficiently transparent to light comprising wavelengths within the range of about 100 to 1,000 nm, also about 200 to 800 nm, or about 250 to 700 nm. In one instance, the sufficiently less transparent region comprises the same materials as the transparent region wherein the less transparent has a higher porosity than the transparent region. In one instance, the transparent region comprises a first polymer and sufficiently lacks pores and the less transparent region comprises a second polymer and is substantially microporous. In one instance, a transparent region comprising a first polymer and sufficiently lacking pores is surrounded by a less transparent region comprising a second polymer that is substantially microporous. In one instance, the first and second polymers are the same polymer. In one instance, the pore density of the less transparent region gradually increases as the distance from the transparent region increases up to a maximum pore density for the pad. In this instance, most of the pad is at or near the maximum pore density, where noticeable variation in the pore density may be found around the transparent region, such as within about 2 cm, also within about 1 cm of any boundary of the transparent region. In one instance the pore structure is formed using one or more pore forming agents selected from the group consisting of an inorganic salt, a foaming agent, a supercritical fluid, a chemical blowing agent, a micelle, a block copolymer, a porogen material and a microballoon

DETAILED DESCRIPTION

Figure 1:
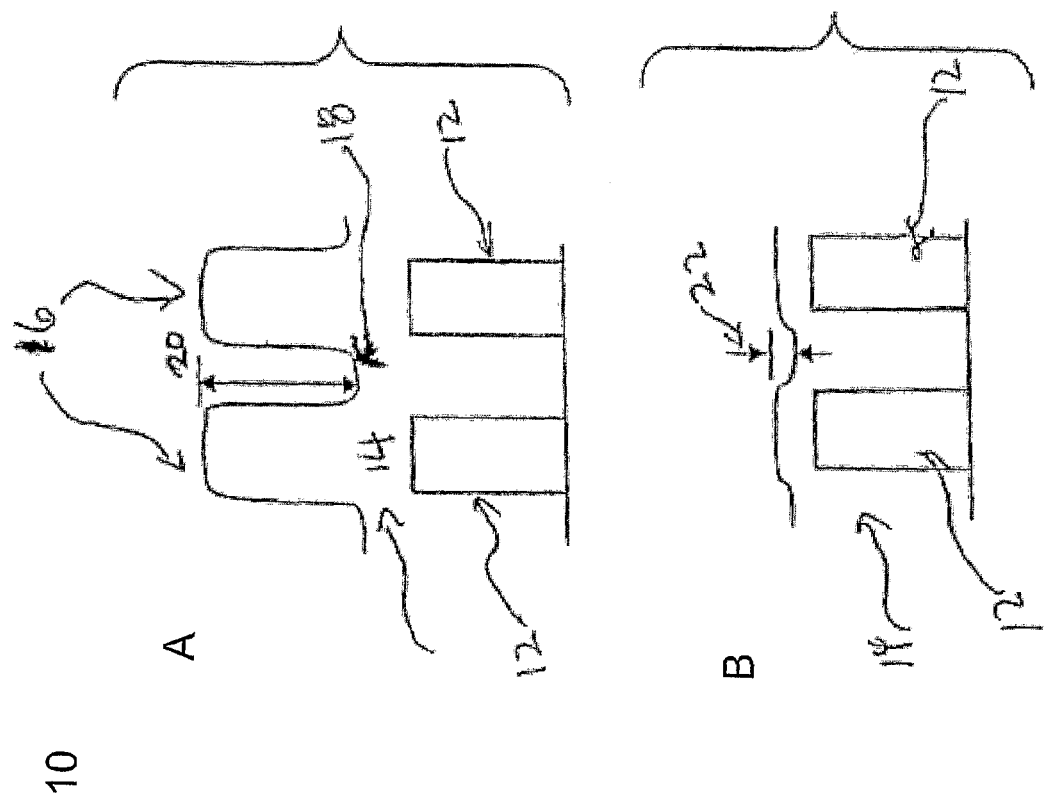
FIGS. 1A and 1B is a exemplary deposition layer formed on an underlying layer.

Various polishing pads disclosed herein are pads in which certain aspects of the substrate to be polished including (but not limited to) the stricture, material, and characteristics of the substrate have been taken into consideration in the customized design of the polishing pad. Pads are then fabricated using fabrication means that control the properties of the pad according to the customized design, producing single unified customized pads thereby.

What is meant by substrate is any material or device for which a polishing process such as CMP is indicated. In this regard, various customized polishing pads described herein may be useful for processing various types of substrates, including (but not limited to): 1.) Wafers, such as silicon, quartz, silicon carbide, gallium arsenide, and germanium, 2.) Layers deposited or grown on wafers formed in semiconductor processing, such as reducing topography across a dielectric region, clearing oxide in an aluminum technology damascene process, clearing metal deposits (copper and tantalum barriers) in dual damascene processes, producing uniform FinFet structures, producing SoC devices, or removing excess oxide in STI steps. 3.) Rigid disks used for storage media, such as nickel plated aluminum, glass, and other magnetic materials typically used in storage media. 4.) Optical devices used for the internet and digital optical networks, such as fiber optic cables and optical interconnects. 5.) Materials, such as metallurgical materials, ceramics, inorganics, polymers, epoxy based carbon fiber composites and nanocomposite substrates, and the like. 6.) Micro- and nano-structures and devices created in numerous materials using micromachining techniques, such as lithographic techniques, laser ablation, hot embossing, and micromolding, etc. In short, various subject customized polishing pads are useful for a variety of materials, devices and systems where the requirements of surfaces are precision in finish, evenness, flatness and less defectivity.

It is contemplated that various subject customized polishing pads disclosed herein may be customized for use in the semiconductor industry for the CMP of integrated circuits (ICs) on a wafer substrate. For such a use, a polishing pad for CMP of an IC structure is customized by obtaining one or more characteristics of the IC structure on the substrate, such as the IC size, pattern density, IC architecture, film material, film topography, and the like. Based on the one or more characteristics of the IC structure pad properties, such as pad nano-structure with long range and short range order, pad material type, hardness, porosity, toughness, compressibility, surface architecture, surface texturing, the addition of lubricants, the formation of interfaces within the pad and the addition of abrasives, of the pad is selected. Such custom design and in situ fabrication of a single unified pad can lead to desired uniform performance for the CMP processing of ICs.

What is meant by uniform performance of the CMP process for ICs has to do with a number of criteria that can be used to assess the quality of the process including, but are not limited to, maintaining a removal rate which is Prestonian, having a coefficient of friction which is constant in the boundary lubrication regime, and maintaining uniform polishing performance across different regions of the substrate. One criterion of polishing performance is removal rate (RR). As will be discussed in more detail subsequently, removal rate is affected by a number of apparatus and consumable parameters. Examples of pad properties, such as compressibility, porosity, and surface texture, may impact slurry transport, for example, which in turn may impacts RR. Another criterion of polishing performance is substrate planarity, so that occurrences of dishing and erosion, such as of dielectric materials in an STI stack or of a dielectric material during a copper polishing process, are minimized or eliminated. Pad hardness, toughness, and porosity, are examples of pad properties that have an impact on substrate planarity. It has been observed that pads which have controlled porosity, i.e. controlled size and density of pores and distribution of porosity, can better planarize the substrate. The number of substrate non-uniformities (NUs), such as scratches and chips, is still another criterion of polishing performance. Examples of pad properties that impact the number of NUs include hardness, and surface texture, which impacts slurry transport. Finally, defectivity is yet another criterion by which the polishing process is evaluated. The CMP process is harsh, both chemically and mechanically, and stress-induced defects in ICs reduce device yield. An example of a pad property that affects defectivity is pad hardness. A harder pad may yield good planarity at the expense of increased defectivity. A lack of control in any of the above mentioned pad properties can affect the pad performance, For example, lack of control of pad porosity may result in non-uniform shear force across the polishing surface, and therefore non-uniform COF, which may result in increased defectivity. Further, lack of control of other pad parameters can lead to degradation in pad performance in a manner similar to the pad performance issues caused by lack of porosity control. The criteria of polishing performance, RR, substrate planarity, incidence of NUs, and defects are examples of criteria that impact the cost of ownership of CMP processes.

Several variables of the IC design have an impact on pad design and on polishing performance. One such a variable can be the pattern density of an IC. The pattern density can have an affect on the film removal amount, and therefore the uniformity within an IC and across a wafer. In FIG. 1 an IC 10 being fabricated has underlying features 12, such as metal lines, which can create high regions 16 and low regions 18 in the topography of the deposited film 14. In particular, the topography is strongly dependent on pattern density in copper based dual damascene structures because of the nature of electroplating in trenches that have different widths across a chip and the chemistry associated with the additives used in the electroplating process. In general, high regions 16 in the topography polish faster than the low regions 18. As depicted in FIG. 1A, an initial step height 20 is associated with deposited film 14 before polishing. As depicted in FIG. 1B, a final step height 22 is associated with deposited film 14 after polishing. The differential removal rate for high regions 16 and low regions 18, indicated by the difference in initial step height 20 and final step height 22, is a figure of merit for planarization. The larger this difference, the better the planarity after the CMP process.

Figure 2:
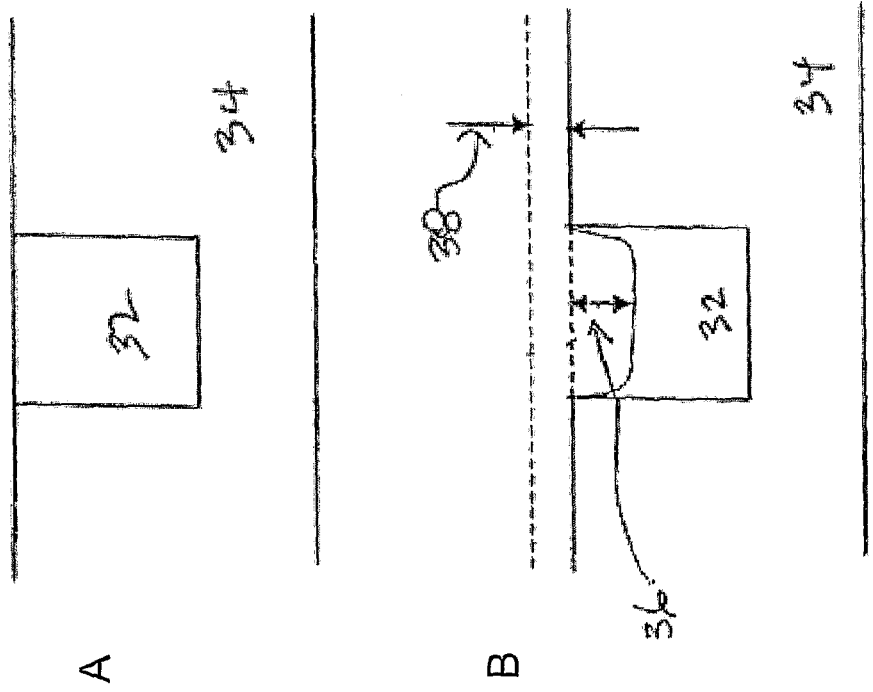
FIGS. 2A and 2B depict dishing and erosion in a metal deposited within a trench in a dielectric layer.

Another example of a variable in IC fabrication that has an impact on uniform polishing performance within an IC and across the wafer is the film material. In particular, dishing and erosion can occur in a CMP process involving multiple film materials, due to the fact that different materials frequently have different polishing rates. In FIG. 2A is a schematic of an IC being fabricated 30, which has a metal line 32 deposited within a trench in a dielectric layer 34. In FIG. 2B, dishing of metal line 32 is depicted as a deviation in height 36 of metal line 32 from planarity with dielectric layer 34. Also, erosion of dielectric layer 34 is depicted as a deviation in height 38 of dielectric layer 34 from its intended height. Dishing and erosion can exist in shallow trench isolation (STI), tungsten plug, and dual damascene process for copper based interconnects. When copper is used, an additional film material is used as a barrier layer between the copper and the dielectric material.

A property of the pads which can be selected for is the porosity (i.e. pore size and density). The typical pore density is between about 5-20% of the polishing pad. Zero pore density i.e. nonporous pad may not allow for a uniform slurry flow and therefore leads to problems in removal rate uniformity. Pore size is usually a good indicator of pad performance. Approx. 40 microns can be the desired size for good pad performance. If slurry reduction is not a big concern, then higher pore size, such as 80 micron, may be used. A higher pore size will provide more uniform removal rate while a lower pore size can be used when the slurry flow rate reduction is required.

Yet another property of the pad that can be selected based on IC size is pad surface architecture, such as grooving, and surface texturing, or asperity. In particular, a higher degree of asperity may be used for larger IC size and higher density than for smaller IC size and density. While many of these determinations can be made based on knowledge of IC sizes, pattern densities, and the materials being polished, for sub 90 nm technologies these determinations become extremely complex. It should also be noted that a pattern density of less than about 30% is typical for smaller IC size, while a pattern density of about 50% is typical for larger IC size. Therefore, a higher pattern density is correlated with a larger IC size.

Within the field of CMP, a domain which may be described as "pad engineering" has been explored to a very limited extent. Pad engineering, in general terms, can be described as the use of fundamental materials along with scientific concepts, both at the nano and micron length scale as well as the macro, 1 cm and above, length scale to selectively control and individually tune the various aspects of the polishing process; for example control of lubricity, uniformity in removal rate, thermal behavior and stress control. Conventional open-pore and closed-pore polymeric pads used in the industry today have several limitations with the limitations becoming prominent at the lower technology nodes. Several of these limitations may be overcome by novel "pad engineering" methods. Multiple pad engineering inventive designs are disclosed: molecular engineering of pad micro-structure, functional grading of pads, surface engineering in pads design, through the addition of solid lubricants, manufacture of low shear integral pads have multiple polymeric layers which form an interface within the pad parallel to the polishing surface which can have the effect of reducing the shear on a substrate being polished, embedded abrasive pads, in situ grooved pads, and pads containing transparent regions for endpoint detection.

Figure 3:
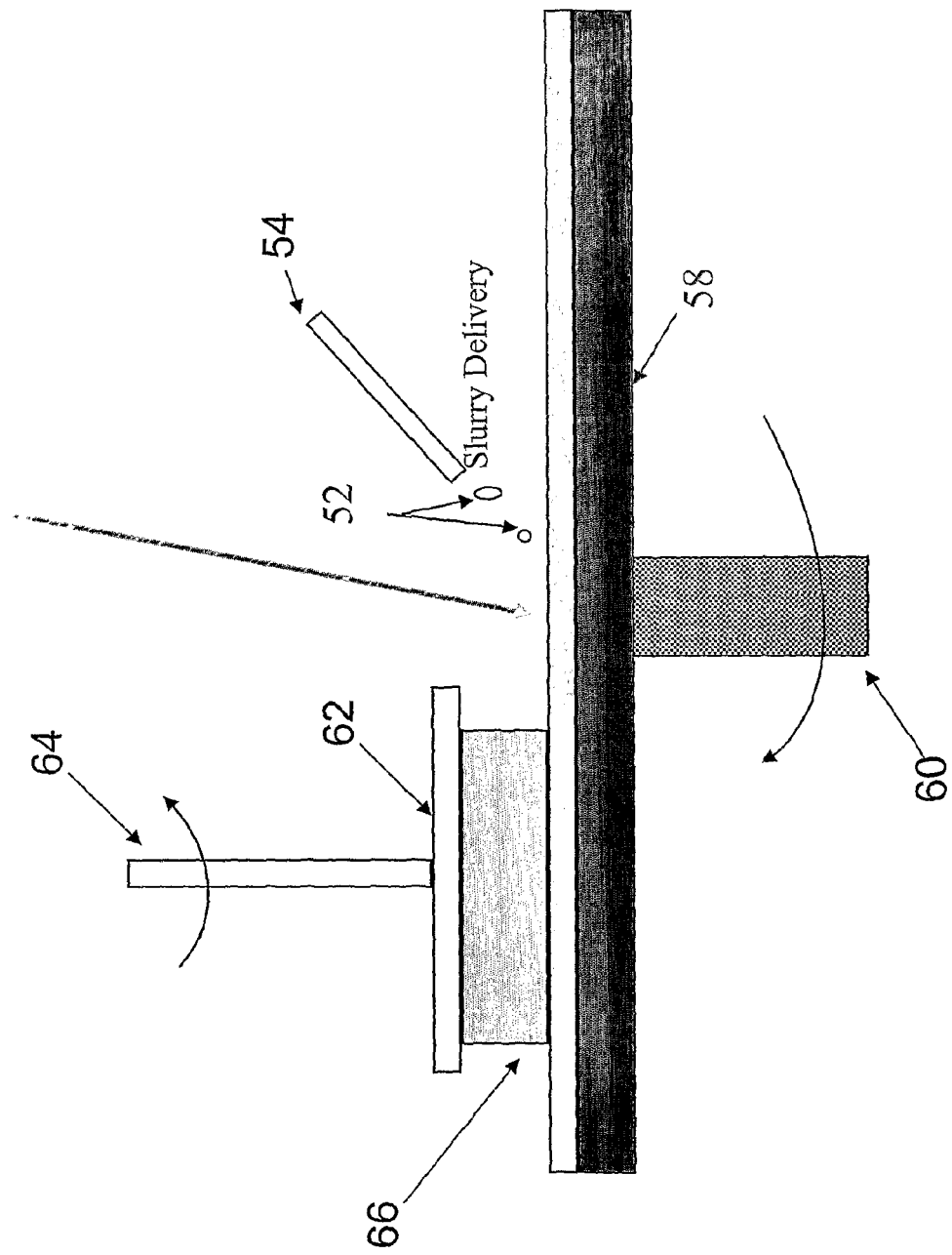
FIG. 3 is a schematic of the elements of a CMP apparatus.

In FIG. 3, a generalized depiction of key elements of a CMP apparatus 50 is shown. The slurry 52 is typically dispensed via a slurry dispenser 54 onto the polishing pad 56, as shown in FIG. 3. Alternatively, the slurry 52 may be delivered from the bottom of the pad to the surface of the pad there through. The polishing pad 56 is mounted on a rotatable platen 58, from which a rotatable platen shaft 60 extends. The substrate 66 is held by a substrate chuck 62, from which a substrate chuck shaft 64 extends. The arrows show the direction of vector forces which act to rotate the polishing pad 56 and the substrate chuck 62, and hence the substrate (not shown). A down force is controllably applied to the substrate chuck 62 via the substrate chuck shaft 64, providing controllable contact between the polishing pad 56 and the substrate 66.

Figure 4:
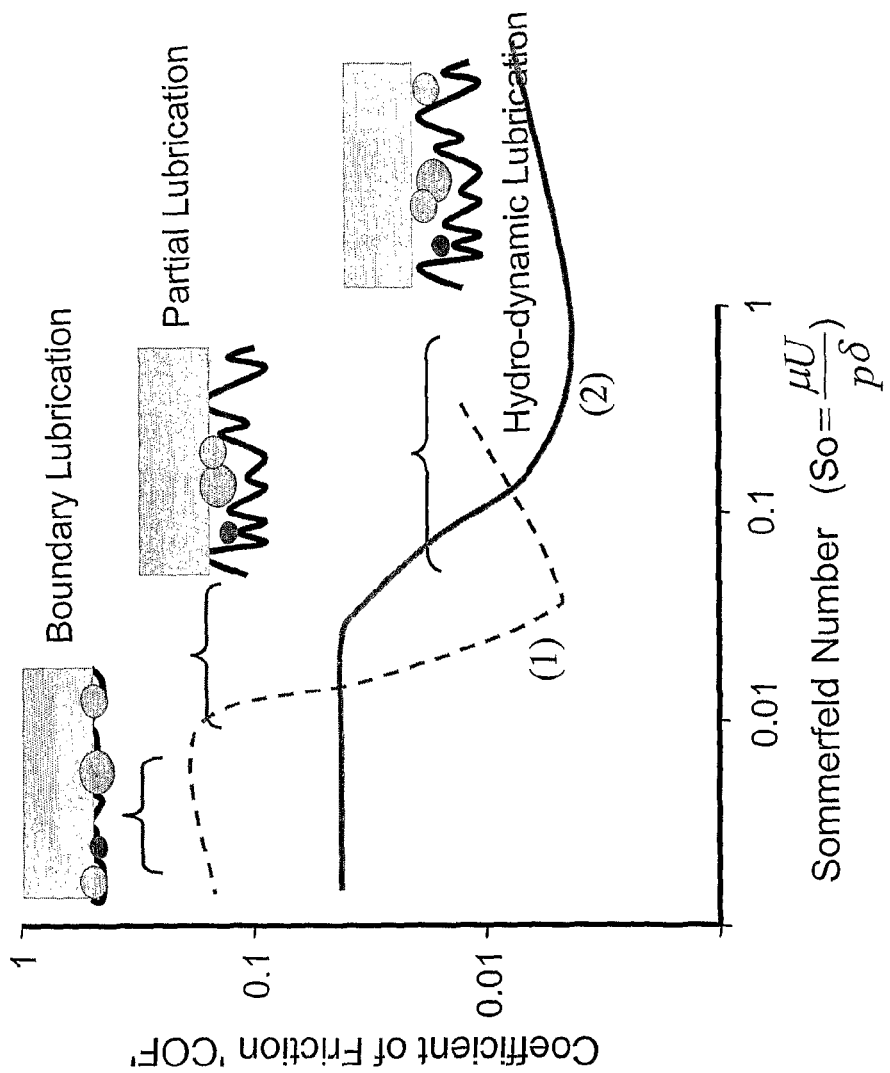
FIG. 4 is an example of a Stribeck Curve.

To understand some of the factors affecting CMP processing, an understanding of FIG. 4 the Stribeck curve is useful. The Stribeck curve displays the relationship of the coefficient of friction (COF) vs. the Sommerfeld number (So) where the COF and So are given by:

$$COF = F_{shear}/F_{normal} \quad (1)$$

where $F_{shear}$ is the shear force; $F_{normal}$ is the normal force $$So [=\mu V/(p\delta \mathit{eff})] \quad (2)$$

where $\mu$=slurry viscosity, V=the relative pad-wafer velocity, p=pressure;
and $\delta$ eff=$\alpha R_a + [1-\alpha]\delta_{groove}$
where $R_a$=average pad roughness, $\delta_{groove}$=pad groove depth, and $\alpha$, a scaling factor, is given by
=$A_{up\text{-}features}/A_{flat\,pad}$
where A is the corresponding area.

There are three regions indicated on the generalized Stribeck-curve shown in FIG. 4 In the region indicated as "boundary lubrication", both the polishing pad and the substrate are in intimate contact with slurry abrasive particles, and COF remains constant with increasing values of So. In this regime larger values of both the COF and removal rate (RR) are obtained. Such constancy is desirable for process stability. Any drift in the boundary lubrication regime is a result of variability in wafer/slurry/pad interface during the CMP process. In the partial lubrication regime, the substrate and pad are separated by a fluid film layer that has a thickness approximately the roughness of the pad. Since RRs are lower in this regime than in the boundary lubrication regime, pad life is increased in the partial lubrication regime. However, the rate of change of the negative slope indicates for the partial lubrication regime there is less stability, control, and predictability than in the boundary lubrication regime. In the hydrodynamic lubrication regime, an even larger fluid layer results in even lower RRs.

Figure 5:
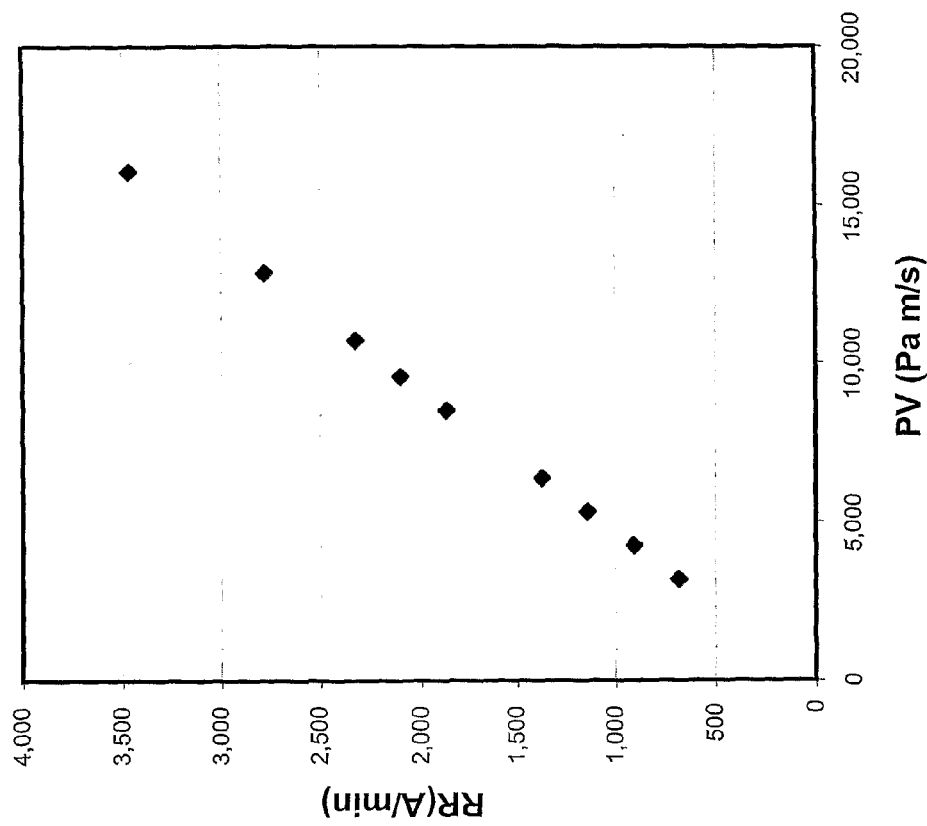
FIG. 5 is an example of a Prestonian plot.

In FIG. 5, an idealized Prestonian plot is shown, where the removal rate (RR) is given as:

$$RR = k_P \times p \times V \quad (3)$$

where $k_P$=Preston constant;
p=actual pressure between the pad and the substrate; and
V=relative pad-substrate velocity.

Ideally, the Prestonian plot is linear as a function of the pressure times the velocity. Deviation from ideal linear behavior can be attributed to slurry rheology and polishing pad tribology. For instance, a comparison of different slurries under constant conditions has shown that some exhibit non-ideal Prestonian behavior at high pressures. Such slurries are referred to as pressure-sensitive slurries. Additionally, polishing pad tribology, which is influenced by variables such as pad hardness, thickness, compressibility, porosity, and surface texture may also contribute to non-ideal Prestonian behavior.

Through several of the Neopad designs which include sub surface engineering and low shear design of the pads, a CMP pad with a low COF can be manufactured. The uniformity of the COF can be controlled by the pad microstructure, through the use of numerous and small hard segments distributed throughout the matrix of the urethane. Extension of the boundary lubrication regime also correlates directly to the pad microstructure.

Pad customization can be systematically carried out based on the polishing process. Since the "art" of CMP involves several parameters, customization has to be carried out in accordance to the various aspects which affect the process. Methods according to the material to be polished as well as the IC characteristics for pad customization are described below which can be used systematically in order to design pads according to specific requirements. Our customization which is based on polyurethane/polyureas engineering which allow for control of critical parameters like tan $\delta$, loss modulus (E"), storage modulus (E'), microtexture (also called as micro-structure), glass transition temperature, hard segment and soft segment distribution, and micropore size and distribution. We have achieved these controls through selection of appropriate materials and through use of specialized manufacturing process.

I. Polymer Formulation for Polymeric Pads Used in Chemical Mechanical Planarization and Control of Pad Microstructure A variety of materials are contemplated for use in the fabrication of the subject customized polishing pads. Though the pads are substantially polymeric and have tailored size and density of hard and soft domains, other inventive embodiments include the introduction of materials, such as pore-forming materials, solid lubricants, embedded abrasive, one or more layers normal to the polishing surface to relieve stress, in situ grooves, and a transparent regions for endpoint detection may be added into the continuous polymer phase.

The subject customized polishing pads are typically made from polymers. Examples of polymers contemplated for fabrication of the various customized polishing pads disclosed herein are drawn from classes of polyurethanes, polyureas, epoxide polymers, phenolic polymers, polycarbonates, polyamides, polyimides, polyesters, polysulfones, polyacetals, polyacrylates, polystyrenes, polyarlyetherketones, polyethyleneterephthlates, polyvinyls, polypropylenes, polyethylenes, polysilanes, and polysiloxanes. Further, polymers suitable for various customized polishing pads disclosed herein may be copolymers, blends, complexes, networks, composites, grafts, and laminates, and the like, of members selected from the exemplary classes of polymers. Other polymers suited for use in pads may be used, as would be clear to one of skill in the art.

Formulations using these materials can involve some understanding of the relationships between the structure of the macromolecules and the resulting physical properties of the polymer material used in the pad. Examples of such properties include, but are not limited to hardness, toughness, porosity, compressibility, and the like.

For instance, polymers having a significant scientific, engineering, and commercial history for CMP polishing pads include polyurethanes, polyureas, and copolymers thereof. Such polymers can be prepared using starting materials such as isocyanates, polyols, and polyamines, as well as chain extenders, and crosslinking agents etc. The reaction of an alcohol with an isocyanate functional group forms a urethane linkage which is the basis for polyurethane polymers. The reaction of an amine with an isocyanate functional group forms a urea linkage which the basis for polyurea polymers. For polyurethanes, minimally diol and diisocyanate monomers are required for the polymerization reaction, alternatively three or more hydroxyl or isocyanate groups in a polyol or polyisocyanate respectively, provide reactive sites for crosslinking. For polyurea minimally diamine and diisocyanate monomers are required for the polymerization reaction, alternatively three or more amine or isocyanate groups in a polyamine or polyisocyanate respectively, provide reactive sites for crosslinking. Examples of crosslinking agents which react with hydroxyl or amine groups include diisocyanate crosslinkers such as toluene-diisocyanate (TDI), diphenyl-methane-diisocyanate (MDI), and polymethylene polyphenyl isocyanate (PAPI). The type of crosslinking agent and extent of crosslinking of polymer chains can have an impact on material properties, such as hardness, toughness, and porosity, for example. The size and molecular weight of the hydrophilic molecules like polyamines and polyols impact material properties such as flexibility, melt temperature, and surface energy.

Polyurethanes and polyureas which can allow for the control of the hardness and mechanical properties, which have a high storage (E') and loss modulus (E") and which have low thermal transients, glass transition temperatures ($T_g$), KEL values, change in storage modulus as a function of temperature ($\Delta E'$), compressibility, and tan δ values can be used for pad manufacture.

Casting/Molding, Pad Material, and Microstructure Control

Several methods for casting and molding are appropriate for the fabrication of various customized polishing pads in situ as a single, unitary structure. Some exemplary fabrication methods for casting and molding polishing pads as a single, unitary structure, which fabrication methods additionally allow for the spatial control of physical features designed into the pads, are included in the following discussion.

Liquid Casting of Polymers

Liquid casting of polymers can be used to make pads for CMP. Liquid casting is a manufacturing technique which can be suitable for fabricating polymer parts from the simplest of designs to intricate polymer parts. Shapes like polymer disks can be made using this technique, and hence polymer pads for chemical mechanical planarization can be fabricated using liquid casting. Liquid casting allows for spatial control of the pad material properties during fabrication and hence it can be an appropriate choice to make pads for CMP. In using this process to make a polymer pad for CMP, a mold with the appropriate dimensions is first made. Further, liquid casting may be carried out to make the CMP pad in which grooves would be fabricated using the two possible options: ex-situ or in-situ. Ex-situ groove formation is typically used in the industry. However, this method is very expensive. In-situ grooving the mold can be adapted to provide grooves in the pad once the polymer cures of solidifies. Depending on whether or not the polymer is being cured in situ, the appropriate materials are poured inside the mold. In the case where the polymer is not already cured, the appropriate monomers, crosslinking agents, pore-forming agents, initiators and catalysts are added to the mold and the reaction taken to completion after reaching a certain temperature. Using liquid casting, once a first layer or section is poured cured, a second layer or section can be poured if desired. Also in the liquid casting methods, embedded abrasives as well as solid lubricants can be added to the polymer mixture in order to achieve a desired polishing performance as will be subsequently discussed.

Multiple Injection Molding

Another method for making customized pads is known as multiple point injection molding. Multiple injection molding is a sequential process in which two or more polymeric materials are utilized, with each of the materials injected into the mold at a different time. This method may be used to form customized pads with two or more layers, as well as pads having different areas across the entirety of the pad. Further, this method may be used to achieve any spatially designed pattern of polymeric material, from the simplest, most well defined annular patterns, to the most complex and random of patterns, either in a single layer or multiple layers.

Multiple Live-Feed (or In Situ) Injection Molding

Molds including multiple in-situ injection ports may be used to make customized pads. In this method a mold is selected having at least two ports, generally independent, for injection of polymer. At least two different polymers are injected through the ports during the same injection step, often at the same time, to fill the mold. Depending on the spatial variation desired for the customized pads, fluid flow and heat transfer calculations are carried out and appropriate injection points and injection flow rates for the different polymers and materials being fed into the mold are selected. In this fashion, it is possible to fabricate customized pads having two of more layers, as well as having different areas of polymeric materials across the diameter of the pad.

Reaction Injection Molding (RIM)

Particular polymeric systems (e.g., polyurethanes) are amenable to molding steps using the RIM techniques. In this molding process, instead of injecting previously synthesized polymers, the constituent monomeric materials and appropriate crosslinking agents as well as the initiating agents and chain extenders are added and the resulting mixture is polymerized while molding. To make customized pads with a variation in chemical structure throughout different regions of the pad, multiple ports can be used to inject two or more types of monomeric units (and corresponding chain extenders), as well as other selected materials, such as pore-forming agents, solid lubricants, and embedded abrasives. This can result in functional gradation of the chemical composition of the polymers and mechanical and physical properties. By differentially adding the various materials to the mold, this method may be used to produce customized pads in which properties vary substantially from one layer or region to the next or gradually from one layer or region to the next. In this fashion, RIM may also be used to make customized pads with uniform properties in a plane across the diameter of the pad and/or across the depth of the pad.

Lamellar Injection Molding

By using mixtures of polymers that have been previously extruded, for example in layers, in an injection molding procedure such as those discussed above, customized polishing pads having spatial variation of properties may be produced. This way of producing simple physical mixtures of polymers is direct and easily applied to changing demands upon a producer. The resulting spatial variation of properties will be according to the mechanical and physical characteristics of the individual polymers, as well as other selected materials, such as solid lubricants or embedded abrasives, that may be added to the continuous polymer phase. This method can be used to create microdomain gradation in either horizontal or vertical regions or layers.

Injection Molding of a Gas to Produce Pads Having Micropores

One method for producing customized pads having micropores in one or more sections of the pad may include injecting a gas during the injection molding step to achieve variation of porosity in the customized polishing pad. Gas may be dispersed into and injected into the mold from different ports with different flow rates in order to attain spatial distribution of the gaseous component within the pad. The resulting pad can contain differing amounts of included gas at differing points; hence a systematic variation in hardness and/or density can be achieved.

Microcellular (Mucell Molding)

In this technique the polymer fluid being molded is mixed with gas in order to form a solution mixture. Utilizing two or more such solutions with different chemistries (i.e. different starting chemical materials, such as two different polymers) will lead to a spatial variation of physical properties.

One-Shot and Two-Shot Polymeric Synthesis Techniques

The manner in which the polymer is prepared prior to molding or casting may have an impact on the polishing pad properties, and the consistency thereof. For example, there are two well-known approaches for formulating polyureas and polyurethanes, known as the one-shot and the two-shot techniques. In the one-shot technique, all the reaction components (e.g., monomers, chain extenders, crosslinking agents) can be reacted together. Such a process is difficult to control, due to factors such as varying local concentrations of reactants, and uneven local thermal gradients, which can result in widely varying polymer product characteristics. In the two-shot technique, the isocyanate is pre-reacted in a first step with a polyamine or polyol chain extender to form a high molecular weight prepolymer. This functionalized prepolymer is then further reacted with polyamine or polyol curatives and/or chain extenders to complete the polyurea or polyurethane formation. This process is more easily controlled but requires higher processing temperatures often in the neighborhood of 100° C. When a highly consistent material is required, a process lending itself to such consistency is desired.

CMP Pad Synthesis

In the present study, the uniformity of the size, density, and type of hard domains throughout the CMP pad can be controlled through the selection of the appropriate relative concentrations of polyurethanes and polyureas in the final product. A two-shot technique can be used. In the first step a poly or difunctional isocyanate prepolymer is either synthesized or is obtained from a commercial vendor. A tight distribution in the molecular weight of the isocyanate prepolymer can allow for a uniform distribution and size of hard domains throughout the pad when desired. In the second step the synthesized or commercially obtained isocyanate prepolymer of about 60-80 wt % is reacted with either one or a mixture of polyamine and polyol chain extenders of about 1-15 wt % and one or a mixture of polyamine and polyol curatives of about 5-25 wt % to complete the polyurea/polyurethane formation. Also, in the second step stabilizers of about 0.1-3 wt % can added to prevent U.V. degradations, porosity agents of about 0.1-5 wt % can be added to create micropores, and solid lubricant of about 0.1-20 wt % and embedded abrasives of about 0.1-10 wt % can be added for desired polishing performance. In some cases the chemical composition of the polyol used as a chain extender is the same or similar to the polyol used in the isocyanate prepolymer synthesis.

As a result, a uniform distribution of the size, type, and density of hard domains can be obtained at the nano-micron length scale. The individual hard domains segments comprise the region about the urethane or urea linkage in the polyurethane and polyurea formulation respectively. The hard domains can be comprised of one or more of the individual hard segments. The type of the hard domain can depend on the relative concentration of urea and urethane segments which constitute the hard domain. The density of hard domains can be well controlled using a very systematic process control. For example, the length and functionality of the prepolymer can affect the density of hard domains. The size of the domains can be governed by the relative amounts of urethane to urea because urethane has a single H-bond while urea has two H-bonds and can form larger blocks of hard segments by hydrogen bonding to other regions about a urethane or urea linkage, increasing the size of the domain. The size of the individual hard segment or segments which comprise the hard domain can be controlled by controlling the size of the isocyanate monomer used to synthesize the isocyanate prepolymer. For example, a larger monomer can form a larger domain segment and thus a combination of larger domain segments can form larger domain. The temperature at which the polymerization reaction occurs can also have an effect on the size and density of the hard domains. At higher reaction temperatures, smaller domains can form and can result in an increase in the density of the domains and vice versa. As previously discussed a uniform distribution of the size and density of the hard domains can be achieved through tight control of the molecular weight distributions of the polymeric components. Tight control of the temperature distribution in the reaction vessel and in the mold can also be important to achieve a uniform distribution of the size and density of the hard domains, because of the effects that the temperature can have on the size and the density of hard domains. Typically, the ratio of polyamines to polyols is around about 20%-40% polyamine to about 60%-80% polyol. Typically the number of hard chain segments per domain can be anywhere from about 1 to 20. Such a distribution of the size and density of hard domains allows for a flat and extended Stribeck curve in the boundary lubrication region. Accordingly, the density and size of the hard domains can be varied throughout different regions of the pad in order to achieve customized polishing functionality.

This consistency in the type, size and density of the hard domains can allow for uniformity in the bulk properties. The more consistent and spatially uniform the type, size and density of the hard domains are the more consistency can be seen in the tribological properties. For example, thermal characteristics can be better controlled through the use of uniformly spaced alternate blocks of polyamines/polyols whereas random distribution would lead to local differentials in heating.

Polishing pads for CMP can be individually manufactured. During pad fabrication all the pad materials are divided into two batches. The first batch of the raw materials contains the isocyanate prepolymer, abrasives, lubricants and porosity forming agents, such as microballoons or gas. The second batch contains the curative, U.V. stabilizers, and a mixture of polyol and polyamine chain extenders. Batch 1 is first blended in a vacuum at a temperature between about 80° F.-100° F. to achieve homogeneity and remove any air that may be trapped in the mixture as a result of the addition of the porosity agents. Batch 1 then is heated to the required temperature between about 120° F.-200° F. Batch 2 is kept at about room temperature and blended for about 15 min. Batch 1 and batch 2 are then both added together in the correct amounts. Liquid casting is used to mold the pad. Accordingly, the material, after thorough mixing, is poured on top of a rotating mold which is at a temperature between about 150° F.-220° F. Uniformity in the temperature of the mold can allow for a uniform distribution of type, size and density of the hard domains throughout the pad and can allow for uniformity of tribological properties. The pad is then further formed by either compressive centrifugal casting, the vacuum forming or the pressure forming methods described below.

For compressive centrifugal casting, after the mixture of batch 1 and 2 is poured on to the mold. The mixture is allowed to sit and react for approximately 2-3 minutes. After that the mold is covered by a flat stainless steel plate and put in a compression molding machine. Compression takes place at approx. 100,000 psig and about 200° F.-300° F. After about 10 minutes of compression, the pad is demolded from the mold.

The pad is then cured for approximately 6-12 hours at about 100° F.-200° F. Uniformity in temperature of the compression molding machine can allow for maintaining a uniform distribution of type, size and density of the hard domains throughout the pad and can allow for uniformity in technological properties. Fore, example a uniform temperature can be maintained by contacting the outside of the mold with a fluid maintained at a constant temperature.

Compressive centrifugal casting causes the pores to take on an oblong shape. Oblong oriented pores can act as micro-grooves during polishing and thus obviate the need to introduce higher groove density. The oblong orientation is coplanar with the polishing surface, and has an aspect ratio of at least about two to one or even more. When evenly distributed, the oblong pores act as periodic discontinuities in the polishing surface thus creating natural microtexture, which improves the conditioning efficiency (i.e. reduces conditioning time). Oblong pores also act as micro-slurry reservoirs, which prevent the wafer from losing slurry during polishing, even at lower slurry flow rates. This has the advantage of reduction of slurry usage, in some instances, by over 40% in comparison to a spherical pore structure. Another advantage is that oblong shaped micropores can provide for stability in the removal rate (maintains higher removal rate/and or tunable removal rate) and coefficient of friction.

For the vacuum forming method, immediately after batch 1 and 2 are mixed, the mixture is poured into the mold, the entire mold is put inside a closed chamber. The closed chamber is then brought under vacuum, to approximately 10-30% of atmospheric pressure and the temperature of the mold is uniformly maintained at about 150° F.-220° F. The vacuum allows for any air trapped within the pad pour to be expelled. After approximately 2-5 minutes within the vacuum, the vacuum is broken and the mold is taken out. After about 15 minutes the pad is demolded from the mold. The pad is then cured for approximately 6-12 hours at about 100° F.-200° F.

For the pressure forming method, immediately after batch 1 and 2 are mixed, the mixture is poured into the mold and the entire mold is put inside a closed chamber. The closed chamber is then brought under pressure, to approximately 3-10 times the atmospheric pressure and the temperature of the mold is uniformly maintained at about 150° F.-220° F. The pressure allows for any air trapped within the pad pour to be expelled. After approximately 2-5 minutes the pressure chamber is depressurized and the mold is taken out. After about 15 minutes the pad is demolded from the mold. The pad is then cured for approximately 6-12 hours at about 100° F.-200° F.

During the curing of the individual CMP pads, a skin in the range of about less than 2 μM is formed on the surface of the polishing pad. This skin can be important for protecting the pad surface from damage caused during handling of the CMP pads. Prior to use, the pads need to be conditioned (break in), which can be done using a diamond conditioner. In some cases the skin is less than about 2 μM for efficient break in of the pad prior to polishing of the substrate.

Some of the materials that are used for pad fabrication are discussed below. The materials fall into several categories. These categories include: isocyanate prepolymers and monomer, polyol and polyamine monomer and chain extenders, curative agents (crosslinking agents), stabilizers, porosity agents, solid lubricants, and abrasives.

Isocyanate monomer and prepolymers which may be used for the fabrication of the pads are shown in Table 1.

TABLE 1

| Number | Trade name | Chemical Description |
|---|---|---|
| | Isocyanate monomers and prepolymers | |
| 1 | Lupranate ® T80 | 80%-20% mixture of 2,4 and 2,6 isomers of toluene diisocyanate |
| 2 | Lupranate ® 7525 | 75%-25% mixture of 2,4 and 2,6 isomers of toluene diisocyanate |
| 3 | Trixene ® SC 7700 | toluene diisocyanate polyfunctional isocyanates |
| 4 | Isofam ® RM and SS | 2 component polyether systems based on methylene-diphenyl diisocyanate |
| 5 | Adiprene ® BL16 | Blocked polyether/toluene diisocyanate urethane prepolymer |
| 6 | Adiprene ® L-0311 | toluene diisocyanate polyether pre-polymer |
| 7 | Adiprene ® L0330 | toluene diisocyanate and aliphatic diisocyanate |
| 8 | Adiprene ® LW750 | Polyether based diisocyanate prepolymer |
| 9 | Adiprene ® LFP 590 D | LFPPDI ether prepolymer |
| 10 | Vibrathane ® B640 | Polyether based toluene diisocyanate prepolymer |
| 11 | Vibrathane ® B876 | Polyether based toluene diisocyanate prepolymer |
| 12 | Airthane ® PET-75D | Polyether based toluene diisocyanate prepolymer |
| 13 | Airthane ® PHP-75D | Polyether toluene diisocyanate prepolymer |
| 14 | Airthane ® PHP-70D | Polyether toluene diisocyanate prepolymer |
| 15 | Airthane ® PET-70D | Polyether toluene diisocyanate prepolymer |
| 16 | Airthane ® PET-60D | Polyether toluene diisocyanate prepolymer |
| 17 | Airthane ® PET-95A | Polyether toluene diisocyanate prepolymer |

Polyol monomers and chain extenders which may be used for the fabrication of the pads are shown in Table 2.

TABLE 2

| Number | Trade name | Chemical Description |
|---|---|---|
| | Polyol monomers and chain extenders | |
| 1 | Sorbitol | hexane-1,2,3,4,5,6-hexaol |
| 2 | Terathane ® T2000 | Poly (oxy-1,4-butanediyl)-A-hydroxy-W-hydroxy |
| 3 | Tone ® 0230 polyol | Polycaprolactone |
| 4 | Voranol ® 220-094 | Polyether polyol |
| 5 | Quadrol ® Polyol | Tetra (2-hydroxy propyl) |
| 6 | Isonol ® Polyol | Polyether/polyester |
| 7 | Pluracol ® P1010 | Difunctional Polyol |
| 8 | Fomrez ® 1024-56 | Trimethylol propane branched ethylene glycol/butanediol adipate |

TABLE 2-continued

Polyol monomers and chain extenders

| Number | Trade name | Chemical Description |
|---|---|---|
| 9 | Fomrez ® 2011-54B | Glycerine branched diethylene glycol adipate |
| 10 | Fomrez ® 45 | Trimethylol propane branched diethylene glycol adipate |

Polyamine chain extenders and monomers which may be used for the fabrication of the pads are shown in Table 3.

TABLE 3

Polyamine monomers and chain extenders.

| Number | Trade name | Chemical Description |
|---|---|---|
| 1 | Jeffamines ® | Polyoxyalkylene amines |
| 2 | Dow chemical ® DEH 24 | Triethyl triamine |
| 3 | Versalink ® P-1000 | Oligomeric diaminePolytetramethylene oxide-di-p-amino benzoate |
| 4 | Veralink ® P-650 | Oligomeric diaminePolytetramethylene oxide-di-p-amino benzoate |
| 5 | | Orthotoluene diamine |
| 6 | | 3,4 diamino toluene |
| 7 | | 2,3 diamino toluene |
| 8 | | Tetramethyl propane diamine |
| 9 | | Tetramethyl butane diamine |
| 10 | | Tetraethyl diamine |

Curative agents which may be used for the fabrication of the pads are shown in Table 4.

TABLE 4

Curative agents

| Number | Trade name | Chemical Description |
|---|---|---|
| 1 | Ethacure ® 100 | Diethyltoluenediamine) |
| 2 | Ethacure ® 300 | di-(methyl thio)toluenediamine |
| 3 | Ethacure ® 100-LC | Diethyltoluenediamine |
| 4 | Lonzacure ®MCDEA | 4,4' methylene-bis (3-chloro-2,6 dianiline) |
| 5 | | Methylene dianiline |
| 6 | | 4,4' methylene bis (orthochloroaniline) |
| 7 | MBOCA | 4,4'-Methylenebis(2-chloroaniline) |
| 8 | | Trimethylol propane (TMP) |
| 9 | | Tri iso propanol amine (TIPA) |
| 10 | Versalink ® 740 M | Trimethylene glycoldi-p amino benzoate |
| 11 | Dabco ® 1027 | Ethylene glycol (>55%) + triethylenediamine |
| 12 | Dabco ® BDO Curative | 1,4 butanediol |

Stabilizers which may be used for the fabrication of the pads are shown in Table 5.

TABLE 5

Stabilizers

| Number | Trade name | Chemical Description |
|---|---|---|
| 1 | Univul ® 3039 | 2-ethylhexyl-2-cyano-3,3-diphenyl acrylate |
| 2 | Univul ® 3050 | 2,2',4,4'-tetrahydroxy benzophenone |
| 3 | Univul ® 3027 | Methanon |
| 4 | Univul ® 3000 | 2,4 dihydroxybenzophenone |
| 5 | Univul ® 3030 | 1,3-bis-[2'-cyano-3,3'-(diphenylacryol)oxy]-2,2'-bis-{[2cyano-3,3'--(diphenyl-acryol)oxy]methyl} propane |
| 6 | | Benzophenone |
| 7 | | Benzotriazole |
| 8 | Tinuvin ® 234 | 2-(2H-benzotriazol-2-yl)-4,6-bis-(1-methyl-1 phenylether)phenol |
| 9 | Tinuvin ® 329 | 2-(2H-benzotriazol-2-yl)-4-(1,1,3,3-tetramethyl butyl) phenol |
| 10 | Tinuvin ® 360 | 2,2'-methylene-bis-(6-2H-benzotriazol-2-yl)-4-(1,1,3,3-tetra methyl butyl) phenol |
| 11 | | 2-chloro-4'-fluorbenzophenone |
| 12 | | 3,4' dimethyl benzophenone |
| 13 | | Hydroxyl phenyl triazine |
| 14 | | 2,5-dimethyl benzothiazole |
| 15 | Tinuvin ® 213 | Reaction products of methyl 3-(3-(2H-benzotriazole-2-yl)-5-t-butyl-4-hydroxyphenyl) propionate/PEG 300 |
| 16 | Tinuvin ® 765 | Bis(1,2,2,6,6-pentamethyl-4-piperidyl)sebacate + methyl 1,2,2,6,6-pentamethyl-4-piperidyl sebacate |

Porosity agents which may be used to create micropores during pad fabrication are shown in Table 6.

TABLE 6

Porosity agents

| Number | Trade name | Chemical Description |
|---|---|---|
| 1 | 3M ™ Microspheres,, S32, S38 | S22, ~75 μm |
| 2 | | (1,1,3,3) pentafluoropropane |
| 3 | Expancel ® | 091 dE40 d30~45 μm |
| 4 | Formacel ® blowing agents | Chlorodifluoromethane Di chlorodifluoromethane 2-2,1,1 difluoroethane |
| 5 | | Sodium bicarbonate |
| 6 | Phenoset ® microspheres | Phenolic resin based |
| 7 | | Hydrocerol |
| 8 | | Azodicarbomide |
| 9 | | Oxybisenzenesulphonylhydrazide |
| 10 | | Dodecylphophocholine, $C_{16}SO_3Na$ |
| 11 | | Supercritcal Gas |
| 12 | | Polystyrene |
| 13 | Expancel ® | 091 dE80 d30~75 μm |
| 14 | Expancel ® | 091 dU40~15 nm |
| 15 | Expancel ® | 091 dU80~20 μm |
| 16 | 3M ™ Microspheres | S32, ~80 μm |
| 17 | 3M ™ Microspheres | S38, ~85 μm |

Solid lubricants which may be used for pad fabrication are shown in Table 7.

TABLE 7

Solid Lubricants

| Number | Trade name | Chemical Description |
|---|---|---|
| 1 | From GE ® - NX1 | Boron nitride (particle size of below 1 micron) |
| 2 | From Dupont ® - MP 1100 | Teflon ® |

TABLE 7-continued

Solid Lubricants

| Number | Trade name | Chemical Description |
|---|---|---|
| 3. | | Cerium fluoride |
| 4. | | Polyhalogenated hydrocarbons: PTFE |
| 5. | | Polyamides: Nylon 6,6 |
| 6 | | Polyarylketones PEK(polyether ketone) PEK (polyether ketone) PEEK (polyetheretherketone) PEKK (polyetherketoneketone) PEKEKK(polyetherketoneetherketoneketone) |
| 7 | | Boron nitride polymers PBZ (poly (p-borazylene)) PVZ (poly(p-vinyleneborazylene)) |
| 8 | | Carbon Nanospheres (Buckyballs) |
| 9 | | Molybdenum sulfide |
| 10 | | Tungsten sulfide |
| 11 | | Graphite |
| 12 | | Graphite fluoride |
| 13 | | Niobium sulfide |
| 14 | | Tantalum sulfide |
| 15 | | Magnesium silicate hydroxide (talc) |

Embedded abrasive which may be used for pad fabrication are shown in Table 8.

TABLE 8

Embedded abrasives

| Number | Chemical Description |
|---|---|
| 1. | Cerium Oxide, 100 nm-30 μm |
| 2. | Silicon Oxide, 100 nm-30 μm |
| 3. | Aluminum oxide, 100 nm-30 μm |
| 4. | Zirconium oxide, 100 nm-30 μm |

A non limiting description of some of the possible combinations of the materials described above that can be used for pad fabrication are shown in table 9. All the customized pads using the combination of materials in table 9 can be cast using the liquid casting technique and can bee further formed using compressive centrifugal casting

TABLE 9

Exemplary combination of materials used for pad fabrication. The first number is representative of the number of the compound in the respective table as displayed above. Values in parentheses correspond to the wt % of each material.

| Isocyanate (Table I) | Polyol (Table II) | Polyamine (Table III) | Curatives (Table IV) | Stabilizers (Table V) | Porosity Agents (Table VI) | Lubricant (Table VII) | Abrasives (Table VIII) |
|---|---|---|---|---|---|---|---|
| 13 (77) | 2 (1) | — | 1 (15) | 15, 16 (.5, .5) | 3 (.5) | 1 (2) | — |
| 14 (70) | 7 (2) | 3 (2) | 2 (20) | 2 (1) | 6 (.6) | 3 (2.5) | 1 (1) |
| 17 (78) | 3 (2.5) | 1 (1) | 3 (13) | 16 (1) | 3 (1) | 2 (4) | — |
| 16 (80) | 10 (2.5) | — | 4 (14) | 9 (1) | 3 (.6) | 1, 2 (2, 2) | — |
| 3 (67) | 1 (5) | 7 (5) | 7 (15) | 5 (1) | 5 (.8) | 3 (4) | 2 (2) |
| 1 (70) | 8 (2) | 9 (3.5) | 10 (14) | 8 (1) | 6 (2) | 1 (3) | 3 (1) |
| 6 (79) | — | 10 (3) | 11 (12) | 11 (1) | 4 (1.5) | — | 4 (2.5) |
| 4 (65) | 5 (7) | 2 (7) | 12 (14) | 13 (1) | 2 (1.4) | — | — |
| 7 (80) | 9 (2) | — | 1 (12) | 2 (1) | 5 (1.6) | 3 (2) | 4 (1.5) |
| 11 (80) | 6 (2) | — | 5 (13) | 13 (1) | 1 (1.8) | 1 (2) | — |

II. Controlled Porosity Pads

As has been previously discussed, one exemplary property having an impact on the performance of CMP in the processing of semiconductor wafers is porosity. Control of porosity can be achieved by carefully controlling the distribution of the porosity agents within the polymer material and carefully controlling the uniformity of the temperature during the manufacture process. Lack of control of pad porosity; i.e. in controlling the size and density of pores, and distribution of pore size and density within a pad, can have an impact on factors such as the slurry transport, and abrasive distribution, which in turn can have an impact on the performance of CMP pad, such as the removal rate (RR), and the number of within wafer non-uniformities (WIWNU). Additionally, it is further observed that pads fabricated without control of porosity can have a non-uniform shear force across the polishing surface, and therefore a non-uniform COF over the entire process range. The non-uniformity of the shear force can affect the planarization efficiency, and introduce defects on the substrate leading to a decrease in the product yield.

Figure 6:
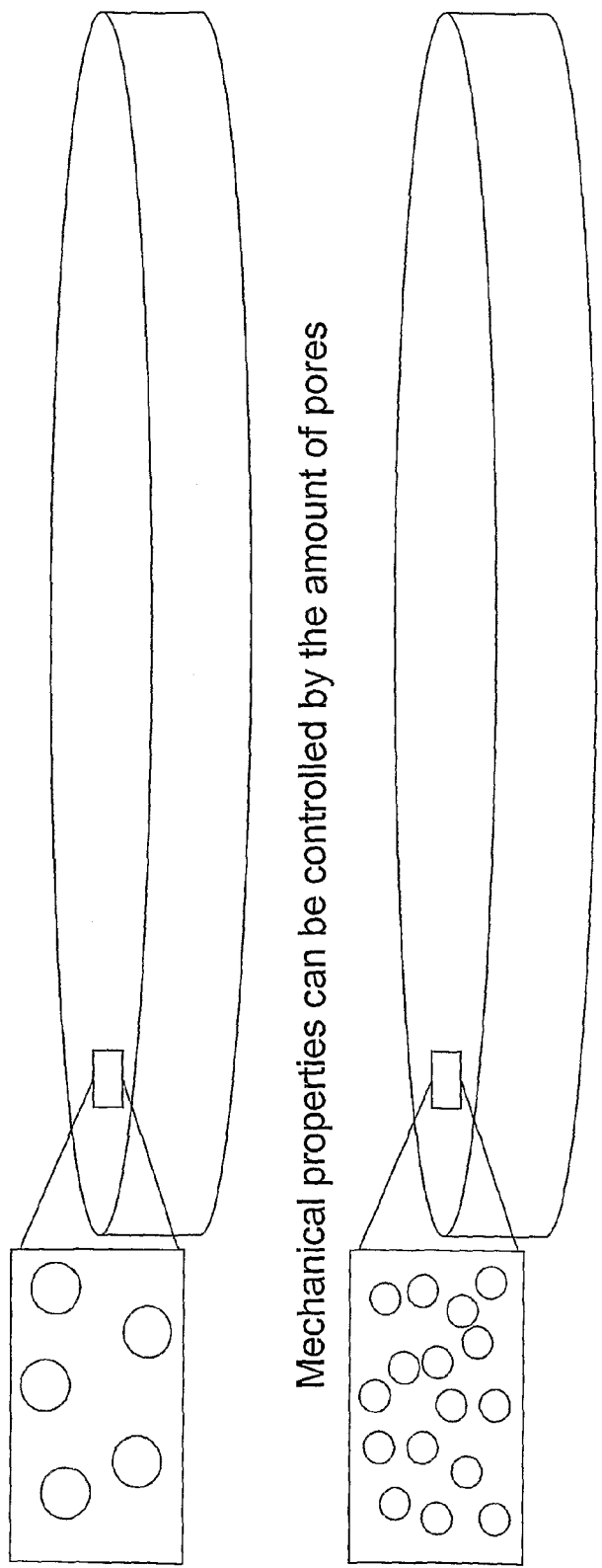
FIG. 6 is a schematic of how the pore-forming material or agent can be used to create uniform pore size, pore density, and distribution in a matrix.

Various customized polishing pads disclosed herein are fabricated so that the porosity formed in the subject pads is uniform with respect to porosity, i.e. pore size, and pore density, and the distribution of porosity. FIG. 6 is a schematic of how the pore-forming material or agent can be used to create uniform pore size, pore density, and distribution in a matrix. In these examples, the pore-forming materials or agents have different properties under different external conditions, such as temperature or pressure. Initially, the pore-forming material or agent is added to the matrix, and then by uniformly applying heat, the pore-forming material or agents can expand to a desired pore size. The distribution and density of the pores can be controlled by the amount of pore-forming material or agents added to the matrix, where, typically, the matrix is polymeric.

In some variations of the subject customized polishing pads, the pore size range is from about 20 nm to about 80 μm, while in other variations of the subject customized polishing pads, pore size range may be from about 50 nm to about 15 μm, and in still other variations of the subject pads, the pore size range may be from about 100 nm to about 10 μm. In some cases the pore range size range can be between about 10 μm-80 μm. The pore density variation of the subject customized polishing pads is determined by the concentration of the materials and agents added to the polymer before casting or molding. It is contemplated that pore density can be varied so that the polishing pads will have pore density of between about 1% to about 20% of the total pad.

It is contemplated that a variety of materials may be useful for generating pores in a controlled fashion within the polymer matrix during fabrication. Some exemplary materials include foaming agents, chemical blowing agents, supercritical fluids, block copolymers, micelles, and porogen materials, are discussed below.

A. Polymeric Hollow Micro-Elements (Microballoons)

Polymeric hollow micro-elements materials are usually spherical balls in the size range of 10-100 µm made from polymers. For example materials such as Expancel, PVDF, phenolic resin and inorganic materials such as silicates and zirconates which have gas, for example such as iso-butane gas, encapsulated within the sphere can be used. When these materials are added to the polymer melt prior to molding, the gas within expands to a desirable size through the controlled application of heat. Such hollow microelements are available both in expanded and unexpanded versions and either of these versions can be used for pad formation. In the expanded version the hollow microelements are pre-expanded and do not undergo size change during the eventual polymer processing operation. In the unexpanded version the hollow microelements expand during the pad fabrication process. There is a great deal of control of pore size using such microballoon materials. The pore density is controlled by the quantity of microballoons added.

B. Chemical Blowing Agents

Chemical blowing agents, for example Hydrocerol, sodium bicarbonate, which upon heating produces carbon dioxide, and complex salts, like azodicarbonamide and oxybisenzenesulphonylhydrazide, which lead to generation of nitrogen gas can be added into the polymer batch. On heating the polymer these chemical blowing agents decompose to give gases which lead to formation of pores in the molded part. Other examples of blowing agents include solids which can be leached using solvents after molding of the polymer.

C. Supercritical Fluids

In the Mucell process, supercritical gas is dissolved within the polymer feed to create a single phase solution. Once this polymer feed is allowed to cool down within the mold the gas forms microscopic bubbles, ranging in size from 0.1-10 µm.

D. Micelles

Micelle structures can be introduced within the polymer feed stream. Such micelles (liquids or solids) can then be leached out using selective solubility using a solvent which is selectively soluble for the micelles such as hexane, leaving porous regions within the polymer matrix. For example materials such as Dodecylphophocholine, $C_{16}SO_3Na$ can be used to introduce micelles into the polymer formulation.

E. Porogen Material

Porogen materials can be used to create pores in the polymer matrix. These porogen materials are made of another polymer for example polystyrene which has a low degradation temperature. After the desired amount of the porogen material is added to the polyurethane matrix and after the pad is formed, the porogen material can be removed by heat treatment of the entire pad.

III. Functionally Graded Pads

One family of customized polishing pads contemplated herein is the family of functionally graded polishing pads. Such pads are comprised of a customized polishing pad having a polishing surface for polishing a substrate that is one piece, substantially flat, and comprises at least two areas having differing physical characteristics. The at least two areas may have discrete boundaries or boundaries that are formed of mixtures of constituent polymers. The at least two areas may each comprise a compositionally different polymeric material and the region between the areas may comprise mixtures of the compositionally different polymeric materials.

Figure 7:
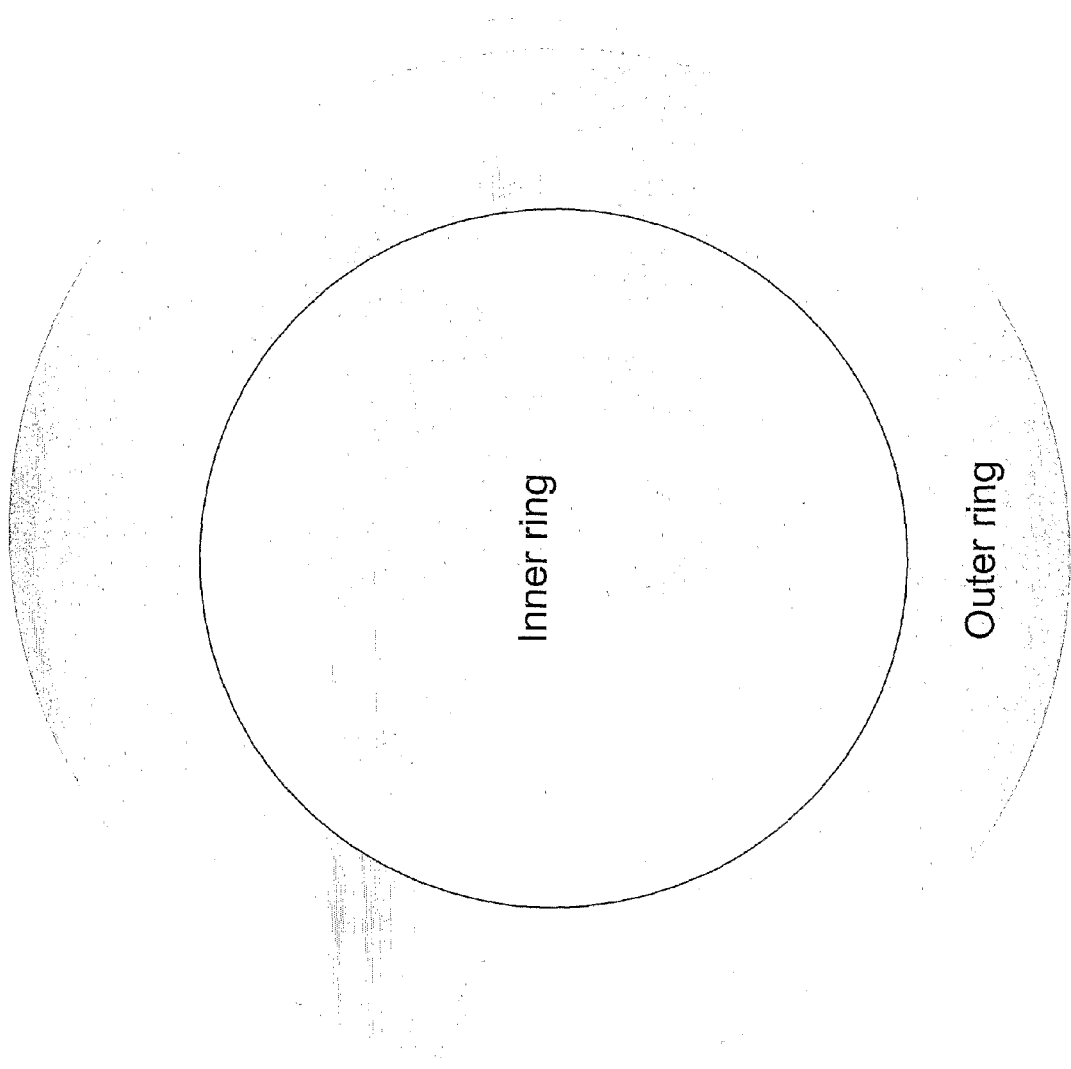
FIG. 7 is a schematic of discontinuous radially symmetric functionally graded pad.

A schematic of a radially symmetric two-area graded pad where two different polymeric compositions are used, one for each area, is shown in FIG. 7, a first outer annular ring of the pad is formed using the centrifugal liquid casting process. The center of the pad ring is then filled with a second polymeric material. Two different materials are used so that in the resulting pad there are two distinct regions or areas having different physical properties. Proper bonding at the interface between the two materials may require selection of materials that are compatible with each other.

Figure 8:
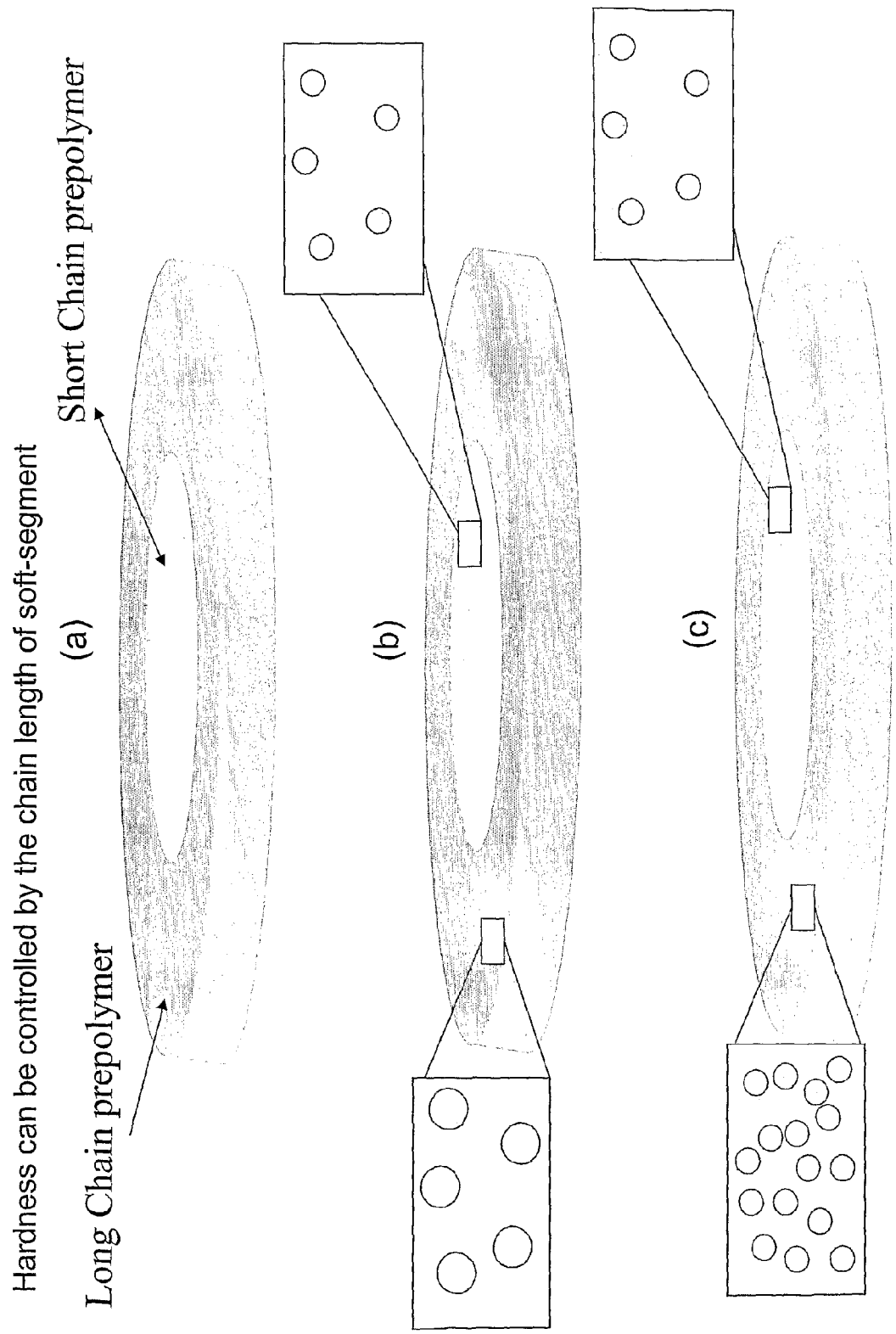
FIG. 8 is a schematic of combining porosity with a functionally graded pad.

In addition to being functionally graded, variations of functionally graded pads can additionally have the same and different pore sizes and densities in the different polymeric regions. FIG. 8a is a schematic of a functionally graded pad having a harder inner region comprised of short chain prepolymers and a soft outer region comprised of long chain prepolymer. FIG. 8b is a schematic showing that different size pores can be formed in the different region with the same pore density. FIG. 8c is a schematic showing that same sized pores can be formed in the different region with different pore densities. The at least two areas may each compromise a compositionally different polymeric material. Having an inner layer which is harder than the outer layer can be advantageous when the polishing head (retaining ring) applies more pressure on the outer region of the polishing pad than on the inner region causing high removal rates in area polished by the outer edge. Reduction in the outer edge yield loss and minimization of pattern density effects can be achieved by this method which compensates for the uneven pressure distribution. Functional grading of polymeric material can lead to the grading of mechanical properties (hardness, compressibility, pore size and pore distribution) and can be used to equalize any non-uniformity in pressure distribution.

Figure 9:
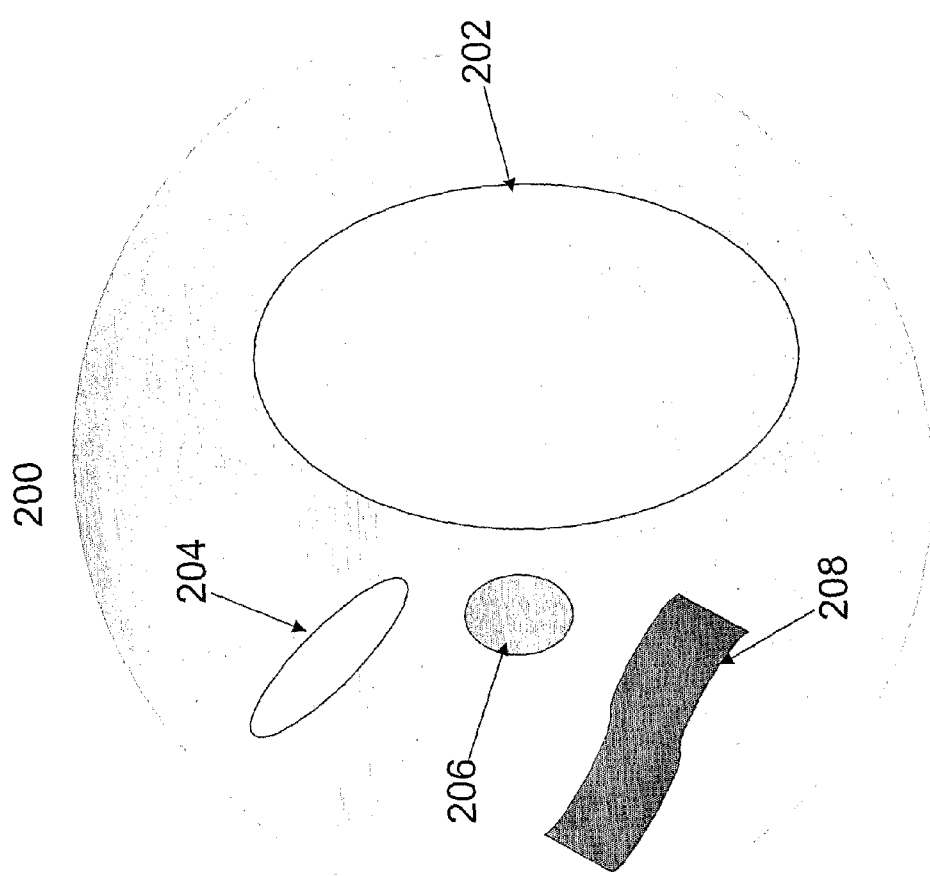
FIG. 9 is a schematic of a non-radially symmetric functionally graded pad.

FIG. 9 shows a schematic of a more complex patterns as may be made using this process in which a non-regular set of patterns are functionally graded on polishing pad 200, having a variety of chosen areas such as ovals (202, 204, 206) and flags (208). In each of the noted areas, the respective polymers may each be a different polymer of the types discussed above or at least two differing ones. Again, such patterns may be achieved by using appropriate mold geometries.

Figure 10:
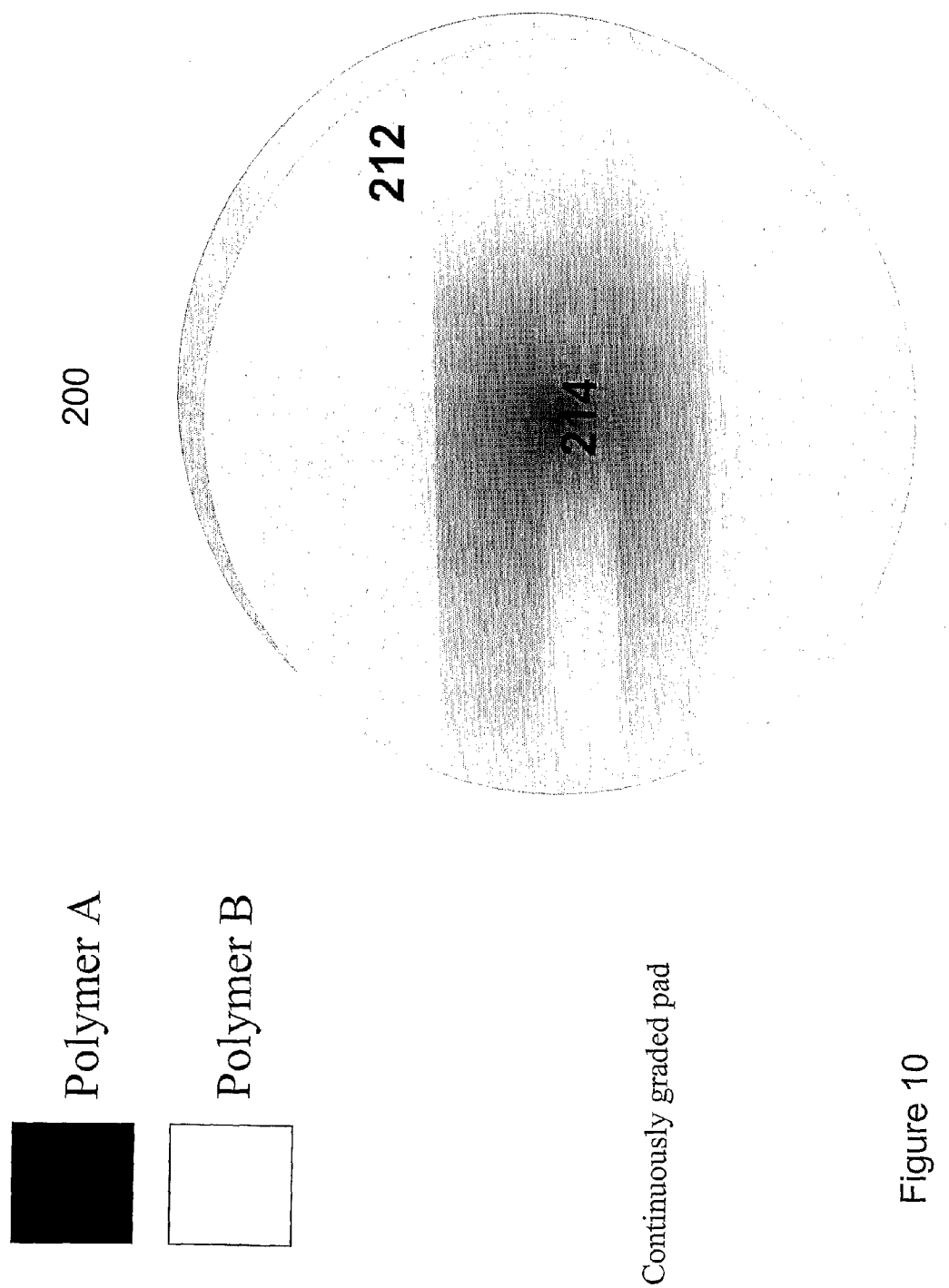
FIG. 10 is a schematic of continuous radially symmetric functionally graded pad.

FIG. 10 is a schematic of an exemplary customized functionally graded polishing pad 200, which is a continuously graded pad, made using a fabrication process in which a first polymer is injected from the outer periphery 212 of a mold while simultaneously injecting a second polymeric material from the center 214.

A graded pad may have polymers and/or formulation selected to provide different values for the coefficient of restitution in different areas of the pad. An outer annulus or an outer ring of the polishing surface of a circular pad may have a higher coefficient of restitution than an inner portion of the pad in order to provide more uniform wafer polishing. The outer annulus may be formed by increasing the amount of curative and/or changing the chemical composition of the polymer formulation compared to the formulation for the inner portion of the pad (for instance, by changing the type of curative, when forming the outer annulus), as is discussed later. In this manner, the hardness of the polishing surface may remain substantially or essentially unaltered, but the pad may provide improved planarity and/or device yield from the wafer upon which the pad acts. Coefficient of restitution can be estimated by measuring using Bashore Rebound %. typically the bashore rebound for a polishing pad can lie from about 0.05-0.6 for Neopad pads. Another estimation of the coefficient of restitution can be done using a compression set test at about 22 hrs and 158° F. (70° C.). Again the value obtained from compression set test for Neopad pads is between about 0.05-0.6

Likewise, a graded pad may have polymers and/or formulation selected to provide different values for the compressibility in different areas of the pad. An outer annulus or an outer ring of the polishing surface of a circular pad may have a higher compressibility than an inner portion of the pad in order to provide more uniform wafer polishing. The outer annulus may be formed by increasing the amount of curative and/or changing the chemical composition of the polymer formulation compared to the formulation for the inner portion of the pad (for instance, by changing the type of curative, when forming the outer annulus). Again, in this manner, the hardness of the polishing surface may remain substantially or essentially unaltered, but the pad may provide improved planarity and/or device yield from the wafer upon which the pad acts. Compressibility is defined as the inverse of the bulk modulus. Bulk modulus is defined as the amount of pressure required to bring about a unit change in volume.

Graded pads as discussed above, in which a property varies e.g. across a radius of the pad drawn from an axis of rotation of the pad, often have at least about 75% of the inner surface area of the polishing surface or volume of the pad formed to have one value and the remaining amount of the surface area of the polishing surface or volume of the pad to have a second value. While not being limited to the following theory, it is believed that the outer periphery of a circular pad or the outer edges of e.g. a belt polishing pad are more prone to movement from e.g. equipment vibration, edge effects, higher torque, etc., and grading accommodates the unequal forces acting along the surface of the pad IV. Low Shear Integral Pads Another family of customized polishing pads contemplated herein is the family of low shear integral pads. Customized low shear polishing pads are multilayer or integral pads that are made of at least two materials so that the interface between the two layers acts as a stress sink to reduce the COF at the pad/substrate boundary. The materials on either side of the interface can be the same or different. An interface is formed using the fabrication methods previously described except that layers of material are poured one at a time. After pouring the first layer of material the material is allowed to cure from 0.5-2 minutes before a second layer is poured. This is repeated if multiple layers are required. After the final layer is poured the entire pad is compressed, vacuum formed or pressure formed as previously described.

Pads having multiple layers may be of a unitary construction in which the multiple layers are covalently bonded to one another through an integral interface, or pads may be formed by calendering or adhering precured layers to one another. Many pads as disclosed herein are unitary and therefore have an integral interface through which layers are covalently bonded to one another. A unitary pad may have additional layers that are added to it, such as a double-sided tape to adhere the cured pad to a platen of a chemical mechanical polisher, but these additional layers do not add appreciably to the performance characteristics of the pad in use.

Figure 11:
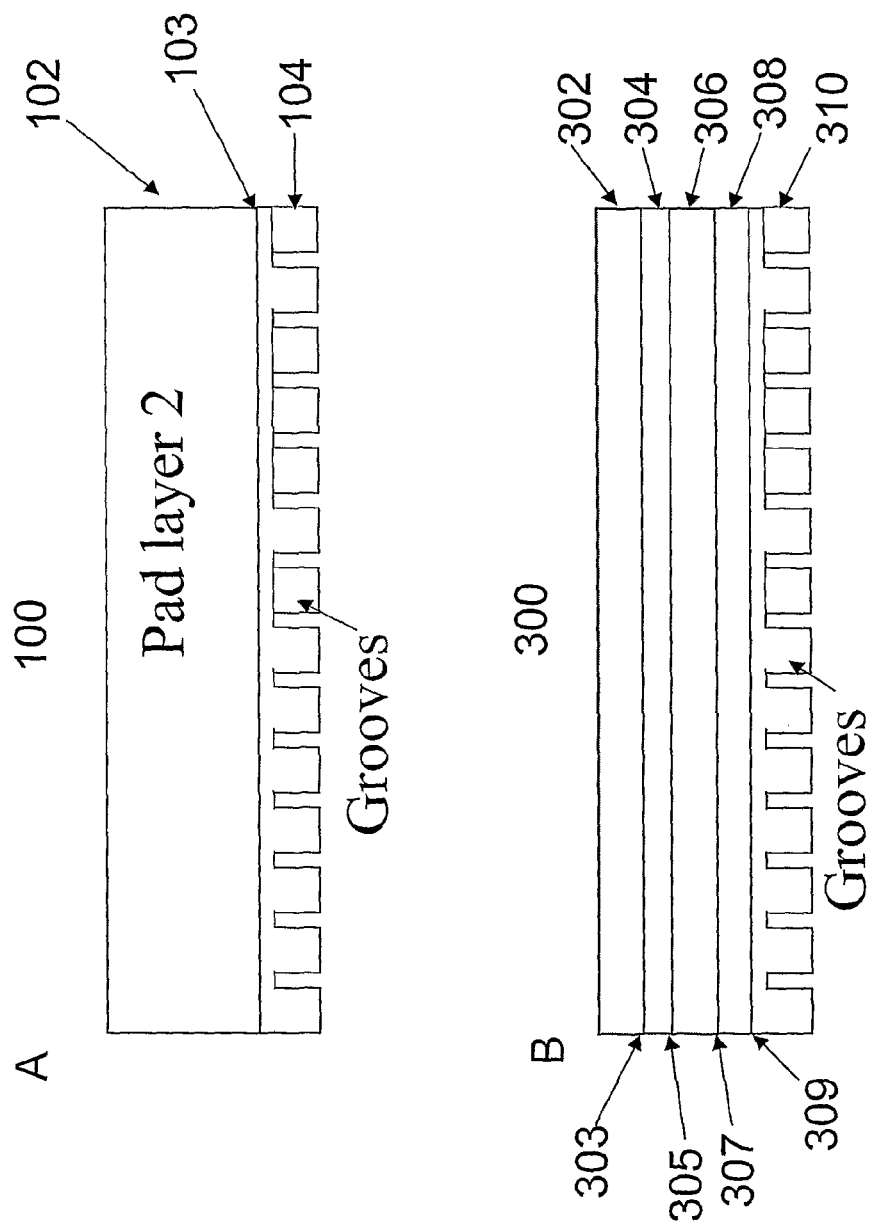
FIG. 11A-B is a schematic of low shear integral pad having one (A) or multiple (B) interfaces, with grooves on the surface.

FIG. 11A is a schematic of a two layer customized low shear stress pad 100, having layers 102 and 104, with interface 103. An integral pad with one interface would have two layers, while a pad with two interfaces would have 3 layers, and an integral pad of N layers would have N-1 interfaces.

This is evident in the subject low stress pad shown in FIG. 11B. In this exemplary pad 300, there are five layers of materials 302, 304, 306, 308, and 310, and four interfaces, 303, 305, 307, and 309. The material layers 302, 304, 306, 308, and 310, can be made from the same or different materials and have the same or different physical properties and characteristic such as porosity and gradation. The four interfaces 303, 305, 307, and 309, formed thereby act as a stress sinks, and effectively lower the shear force, and hence the COF.

Figure 12:
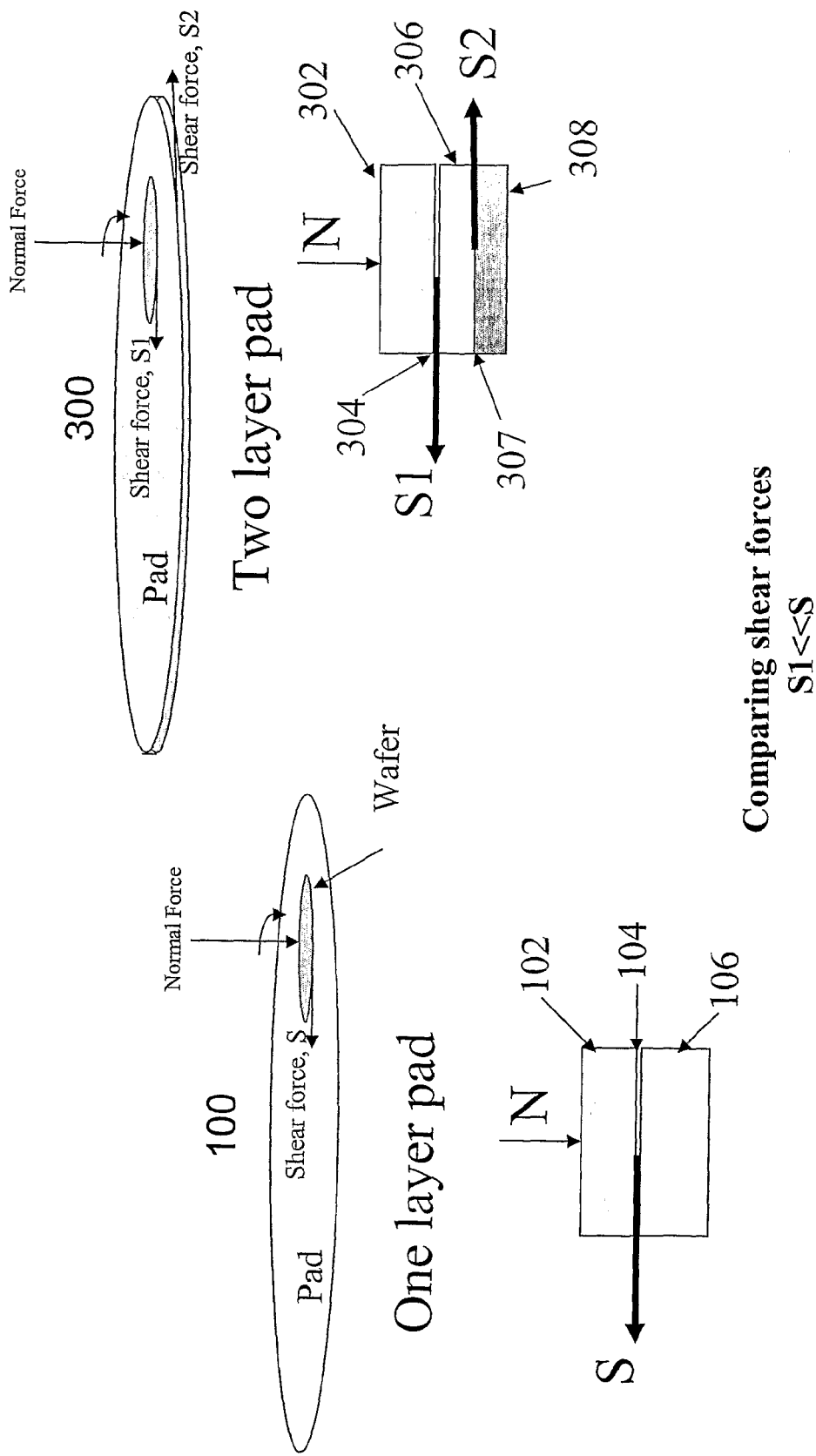
FIG. 12 depicts effect of an interface as a stress sink for CMP.

This effect of an interface acting as a stress sink is shown in a schematic in FIG. 12. In schematic 100 the shear force, S, at the pad/substrate boundary, 104, is orthogonal to the applied normal force, N, on the substrate 102, because in the single layer pad 106, there is no interface selected to act as a stress sink. In schematic 300, the polishing substrate 302; the pad having layers 306 and 308, is designed with interface 307, where the shear force S2 results at the interface 307 between pad layers 306 and 308. As a result of the shear force S2 at the interface 307 of the low shear integral pad 306 and 308, the shear force S1 at the pad/substrate interface 304 is reduced, so that S1 is considerably less than S.

V. Subsurface Engineered Pads

Still another family of customized polishing pads contemplated herein is the family of subsurface engineered pads. Various subsurface engineered pads described herein, have properties imparted through a combination of the structural properties designed into the polymer pad, in combination with the dispersion of a solid lubricant within at least about 1% of the pad depth from the polishing surface. The use of pads with solid lubricants dispersed throughout the polymer matrix effectively minimizes the COF, without sacrificing RR.

A solid lubricant is a material, such as a powder or thin film, which is used to provide protection from damage during relative movement and to reduce friction and wear. Some preferred characteristics of solid lubricants are that they are thermally stable, chemically inert, and nonvolatile, and mechanically stable, but having a hardness not exceeding about 5 on the Mohs scale. Solid lubricants meeting these criteria have the advantage over other types of lubricants generally due to greater effectiveness at high loads and velocities, high resistance to deterioration, and high stability in extreme temperature, pressure, radiation, and other reactive environments. There are many classes of solid lubricants that include inorganic solids, polymers, soft metals, and composites of materials represented in these classes. Further, subsurface engineered pads can be used in combination with previously described functionally graded, porosity controlled and low shear pads.

In addition to these general properties of solid lubricants previously mentioned, solid lubricants contemplated for use in the subject pads typically have a coefficient of friction of between about 0.001 to about 0.5, and particle size of between about 10 nm to about 50 µm. It is further contemplated that various customized pads would be fabricated having at least one solid lubricant within at least about 1% of the pad depth from the polishing surface. A combination of lubricants can be used instead of a single lubricant.

Examples of inorganic solid lubricants having the desired properties recited above include lamellar solids, such as graphite, graphite fluoride, niobium sulfide, tantalum sulfide, molybdenum sulfide, tungsten sulfide, magnesium silicate hydroxide (talc), hexagonal boron nitride, and cerium fluoride. Such lamellar solids are crystalline solids layered in sheets, in which slipping planes occur between the sheets. Other inorganic solids that are suitable as solid lubricants include calcium fluoride, barium fluoride, lead oxide, and lead sulfide. Though not lamellar in stricture, such solid lubricants have surfaces that slip easily along one another at the molecular level, thereby producing lubrication at the macroscopic level.

Examples of polymeric solid lubricants include: 1.) Polyhalogenated hydrocarbons, such as PTFE, and related members. 2.) Polyamides, such as nylon 6,6 and related members. 3.) Polyarylketones, such as PEK (polyether ketone), PEEK (polyetheretherketone), PEKK (polyetherketoneketone) and PEKEKK (polyetherketoneetherketoneketone). 4.) Boron nitride polymers, such as PBZ (poly (p-borazylene)) or PVZ (poly(p-vinyleneborazylene)). Such polymeric solid lubricants generally have low surface energy, are stable as unflocculated dispersion, have low coefficients of friction, and are thermally and chemically stable. For example, PTFE has substantially small static and dynamic coefficients of friction at about 0.04, is known to be chemically inert, and is stable to about 260° C. Like the calcium fluoride family of inorganic solid lubricants, the polymeric solid surfactants have surfaces that slip easily over one another.

Other solid lubricants contemplated for use include a variety of materials with suitable properties formed into nanospheres, nanotubes, or other nanoparticle structures useful for lubrication. As an example, such nanospheres of carbon, are known as buckminsterfullerenes, or "buckyballs." A variety of solid lubricant materials, for example inorganics, such as molybdenum sulfide, tungsten sulfide, or polymeric materials, such as PTFE or boron nitride polymers, can be made into nanostructures useful as solid lubricants. Since such structures generally have nanopores, they can include other solid or liquid lubricants, creating solid lubricants with a variety of properties. Additionally, solid lubricants made from polymeric, blends, networks, composites, and grafts, of polymer and copolymer molecules as well as composites and grafts made from inorganic and polymeric solid lubricants are also possible.

The customized subsurface engineered pads may be used for all processing steps in Cu CMP; including the bulk, the soft landing and the barrier removal steps. Particularly, the impact of the single pad solution for Cu CMP is to reduce the cost of consumables, so as to make the cost of ownership for processing the sub-90 nm technologies attractive.

Figure 13:
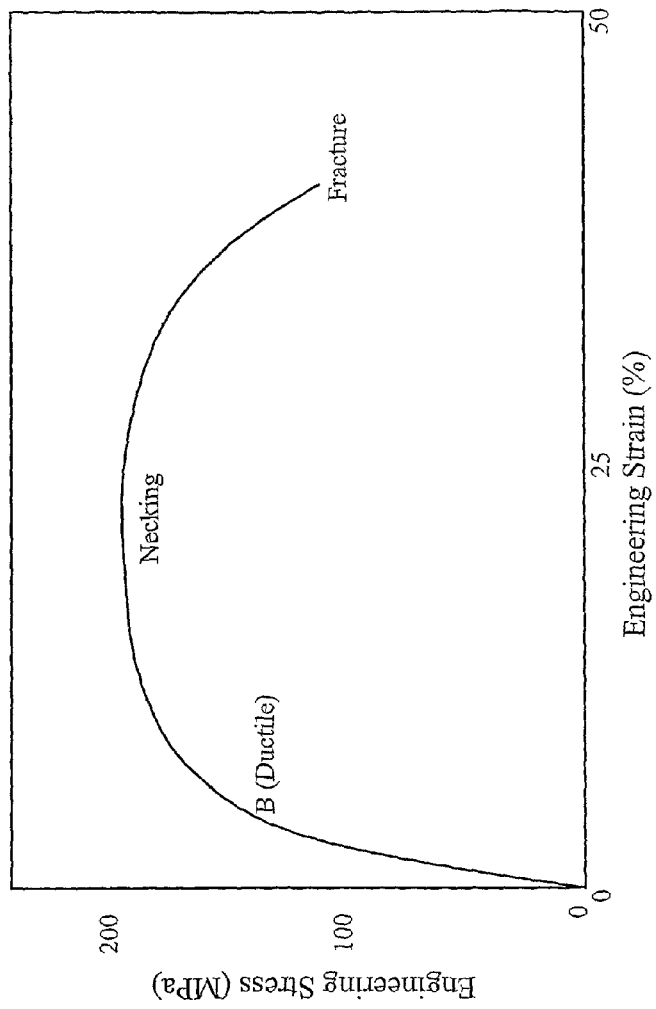
FIG. 13 depicts the stress-strain characteristics of polycrystalline copper.

As shown in FIG. 13, copper has a very high strain before failure occurs. Additionally copper undergoes substantial plastic deformation before fracture. In the case of strain-induced defects of dielectrics, the natural bonding characteristic of the material leads to brittle fracture. Such brittle fracture occurs at fairly low strain values, for example <2%. Due to the high plasticity of copper, several issues need to be addressed for Cu CMP. The first issue is the selective elongation of the material in the regions which are stressed leading to plastic deformation. As such this induced plastic deformation is a permanent deformation leading to long-term stress. Under conditions where selective elongation occurs due to the contact of regions of copper with the polishing pad, such regions will be plastically deformed and will have properties different from the inner copper regions. The second issue is the localized strain hardening of copper, which results just before fracture. All these issues of copper elongation and strain hardening are accentuated due to the confinement of the copper in vias and trenches. Finally, depending on how the pad interacts with the copper layers, copper residue may also be left behind after CMP is completed and can introduce defects into the substrate being polished. Minimizing stress incorporation can be attained through lowering the COF by lowering the effective shear force acting at the wafer/slurry/pad interface. For CMP in general, uniformity of pad properties, such as pad modulus, pore size distribution, and the chemical structure of the material, are known to be important in proving CMP processes operating in the highly stable boundary lubrication regime. Additionally, in order to achieve uniformity for Cu CMP processes, there is a requirement for significant reduction in shear force in order to reduce or eliminate stress-induced defects. In order to reduce the shear force, a high degree of lubrication uniformity is also required. For various customized subsurface engineered polishing pads described herein, the use of pads with solid lubricants dispersed in the polymer matrix within at least about 1% of the pad depth from the polishing surface, effectively minimizes shear force, without sacrificing RR, and can reduces or eliminate the strain hardening of copper thereby.

VI. Embedded Abrasive Chip Customized Pads

Unlike commercially available "fixed abrasive pads", the abrasives in the embedded abrasive pads disclosed herein are distributed throughout the polymer matrix and not only at the surface. If a multiple layer pad is desired the embedded abrasives may or may not be distributed in all of the layers. The advantage of an embedded abrasive pad over a fixed abrasive pad is the stability in the process over time. During polish, the pad wears out. In case of the embedded abrasive pads, the same conditions of polish can be expected since the abrasive distribution within the depth of the pad can be well designed and controlled. In contrast, the commercially available fixed abrasive pad sees a gradual wear in the shape, size and distribution density as the polish process progresses. This results in uneven polish rate, control of the process and therefore high cost of ownership due to the need for frequent pad replacement.

Pads for CMP can be embedded with ceramic or glass particles (alumina, silica, ceria). These particles can be between about 100 nm-30 μm in size, depending on the desired performance. In some cases the adhesion between the particles and the pad matrix would be at a minimum. This could allow the particles incorporated throughout the pad to be uncovered and released into the slurry. Such a polymer pad would allow for abrasive action without the use of a slurry containing abrasives. In fact, the entire process can be carried out using distilled water and the embedded abrasive pad.

A new class of abrasive materials called nano-abrasive particles have recently been developed as known in the field. These particles have a size range from a few 10's of nanometers to a few 100 nanometers. Polymer pads can be functionalized with such nano-abrasive slurry particles by incorporation into the pads directly using the fabrication methods previously discussed. Several classes of nano-abrasive particles can be utilized including ceramics and glasses like zirconia, silica, ceria and even materials like carbon nanotubes (fullerene rings) as well as clay particles.

The distribution of embedded abrasives in the pad can be customized to pattern density of the chip on the wafer through functional grading of the self abrasives in different regions on the polishing surface. Grading may also be achieved through the grading of abrasive characteristics, such as the size distribution, density, and shape of the abrasives. This can be done independently or in combination with other means for grading (i.e. the use of different pad materials (porosity, Both the micron scale particles and nano-abrasives discussed above may be added to the polymer dry or in an appropriate liquid vehicle such as a solvent. These particles may optionally have groups such as oligomeric or polymeric groups attached to their surfaces that aid the incorporation of particles selectively or preferentially into the polymer or one of the polymer phases if discontinuous phases are formed in the selected polymer. For two- or more-phase polymers, the groups bonded or otherwise adhered to the surfaces of particles may be sufficiently similar to one phase in which they prefer and sufficiently dissimilar to the other phase that the abrasive particles gather in the desired phase(s) as the polymer melt solidifies. The groups bonded or adhered to particle surfaces may also be selected to be dissimilar to the polymer in which they are placed. This aids release of abrasive particles from the polymer as the pad wears to expose new particles.

Block Copolymers to Make Self Abrasive Pads

A diblock copolymer can be used to make self abrasive pads where one block can act as a matrix and the second block can act as an abrasive material. The blocks are selected to provide the desired continuous phase, abrasive phase, and immiscibility so that the abrasive phase forms within the continuous phase. In one embodiment, the pad can consist of higher percentage (co-continuous matrix) of one block with the other block being discontinuous. The discontinuous block can be chosen such that it acts as an abrasive for the material to be abraded. In order to make the second phase abrasive, inorganic or metal particles can optionally be added into the block. For example, abrasive materials may be chemically bonded to some or all of the monomer molecules in the discontinuous phase of the block copolymer when it is formed into a pad or abrasive particles may be incorporated into the polymer melt. The abrasive particles have one or more properties (for example surface interactions and thermodynamic conditions) that favor the abrasive particles being preferentially incorporated into one of the phases. For instance, abrasive particles may be selected such that a higher concentration of abrasive particles is found in the discontinuous phase than in the continuous phase. Mixtures of abrasive particles may also be used. In some instances, each of the types of abrasive particles in the mixtures is found in greater concentration in one phase than the other (preferably the discontinuous phase, although particles may instead be selected so that there is a higher concentration in the continuous phase). However, mixtures of particles may be selected so that one or more types of particles are found in higher concentration in the discontinuous phase, one or more types of particles is found in higher concentration in the continuous phase, and/or one or more types of particles is distributed approximately evenly throughout both phases.

It may not be necessary to incorporate abrasive particles into one of the phases, since one of the blocks may itself be abrasive. Certain silicone blocks can be incorporated as part of a copolymer as the lower percentage material and a carbon backbone can act as the higher percentage material. When the pad is used for polishing, the silicone part of the polymer can be exposed and can act as an abrasive. This abrasive material made out of a silica polymer can be tailored to have a consistency similar to that of silica particles which are currently being used as abrasive particles in several technologies.

The polymer which incorporates the previously discussed embedded and nano-abrasive particles may be a polymer that forms one continuous phase, or alternatively the polymer may be a specialized block copolymer which forms discontinuous phases as discussed above. The nanoparticles can be selected to provide uniform dispersion or preferential accumulation in either the discontinuous phase or the continuous phase, and mixtures may be used as described above.

Flame Spraying

In addition to using previously discussed fabrication techniques another technique which can be potentially used to provide a polishing surface is the flame spraying technique used to make a polymer coating on a pad. Such a flame sprayed polymer can have ceramic or glass particles incorporated in the material at the time of the coating formation so that a self abrasive surface can be formed. The pad on which polymer and accompanying abrasive particles may be flame sprayed will typically be a polymer such as a polyurethane or polycarbonate that has no discontinuous phase(s). The pad may be one that has at least one discontinuous phase as described above if desired. In this event, the flame sprayed polymer/abrasive layer wears first, and once this layer has worn off, the pad that was beneath the polymer/abrasive layer wears. This type of construction may be used, for instance, to abrade a layer on a wafer that is particularly difficult to abrade or which has some other property that differs from another layer or layers to be abraded or where an initial abrasion rate when using the pad should differ from a later abrasion rate.

VII. In Situ Grooved Pads

Figure 14:
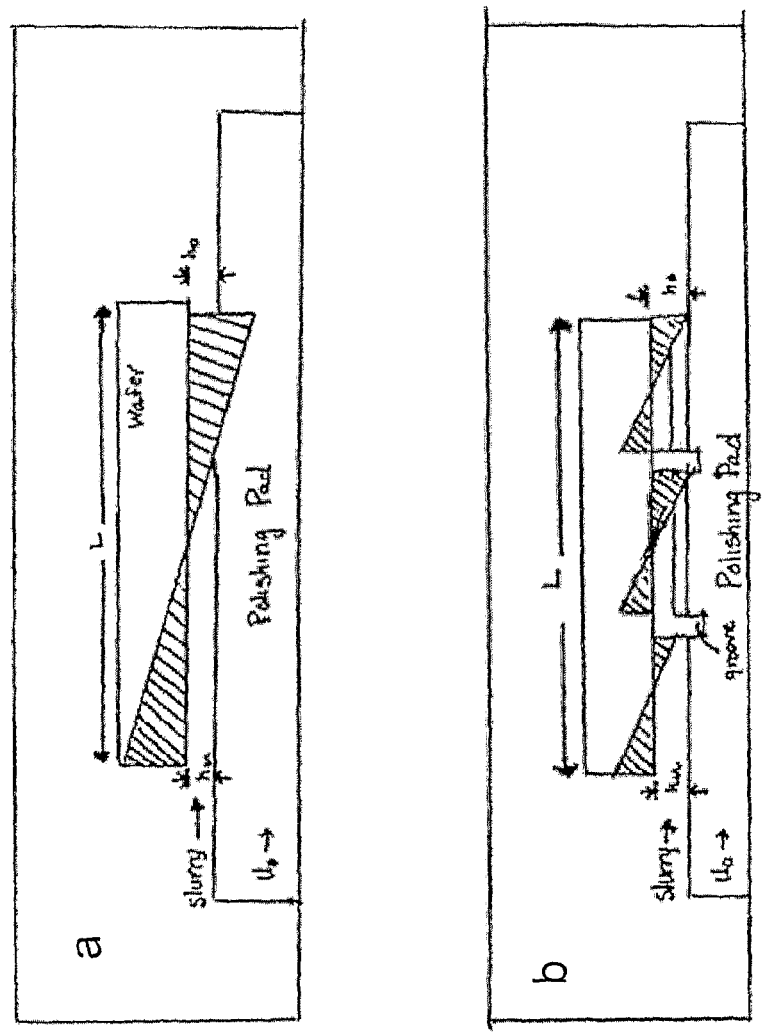
FIG. 14A-B depicts a wafer pressure profile for non-grooved (14A) and grooved (14B) pads.

Grooves in CMP pads are thought to prevent hydroplaning of the wafer being polished across the surface of the pad; to help provide distribution of the slurry across the pad surface; to help ensure that sufficient slurry reaches the interior of the wafer; to help control localized stiffness and compliance of the pad in order to control polishing uniformity and minimize edge effects; and to provide channels for the removal of polishing debris from the pad surface in order to reduce defectivity. FIGS. 14a and 14b provide a schematic representation of the impact of grooving on the hydrodynamic pressure generated around the pad/wafer region. For example, FIG. 14a, depicts a wafer pressure profile (indicated by the diagonally striped triangular regions) when a non-grooved polishing pad is used. FIG. 14b illustrates how the pressure around the periphery of the wafer is released along the grooves. That is, the grooves conform to the pressure generated at every groove pitch and, help provide Lmiform slurry distribution along the wafer/pad region.

In general, any suitable method of producing in-situ grooves on a CMP pad may be used. Unlike the current methods of ex-situ grooving, which are mainly mechanical in nature, the in-situ methods described here may have several advantages. For example, the methods of in-situ grooving described here will typically be less expensive, take less time, and require fewer manufacturing steps. In addition, the methods described here are typically more useful in achieving complex groove designs. Lastly, the in-situ methods described here are typically able to produce CMP pads having better tolerances (e.g., better groove depth, etc.)

In one variation, the methods for in-situ grooving comprise the use of a silicone lining placed inside a mold. The mold may be made of any suitable metal for molding. For example, the mold may be metallic, made from aluminum, steel, ultramold materials (e.g., a metal/metal alloy having "ultra" smooth edges and "ultra" high tolerances for molding finer features), mixtures thereof, and the like. The mold may be any suitable dimension and the dimension of the mold is typically dependent upon the dimension of the CMP pad to be produced, for example for a 20 inch pad a mold will have a 22 inch diameter and will be 2 inch thickness. The pad dimensions, in turn, are typically dependent upon the size of the wafer to be polished. For example, illustrative dimensions for CMP pads for polishing a 4, 6, 8, or 12 inch wafer may be about 12, 20, 24, or 30.5 inches respectively.

The silicone lining is typically made of a silicone elastomer, or a silicone polymer, but any suitable silicone lining may be used. The silicone lining can then be embossed or etched with a pattern, which is complementary to the desired groove pattern or design. The lining can then be glued or otherwise adhered to, or retained in, the mold. It should be noted that the lining may also be placed in the mold prior to it being patterned. The use of lithographic techniques to etch patterns into the silicone lining may help provide better accuracy in groove size. See, e.g., C. Dekker, Stereolithography tooling for silicone molding, Advanced Materials & Processes, vol. 161 (1), pp. 59-61, January 2003; and D. Smock, Modern Plastics, vol. 75(4), pp. 64-65, April 1998, which pages are hereby incorporated by reference in their entirety. For example, grooves in the micron to sub micron range may be obtained. Large dimensions in the millimeter range may also be obtained with relative ease. In this way, the silicone lining serves as the "molding pattern." However, in some variations, the mold may be patterned with a complementary groove design. In this way, the mold and the lining, or the mold itself, may be used to produce the CMP pad groove designs.

Figure 15:
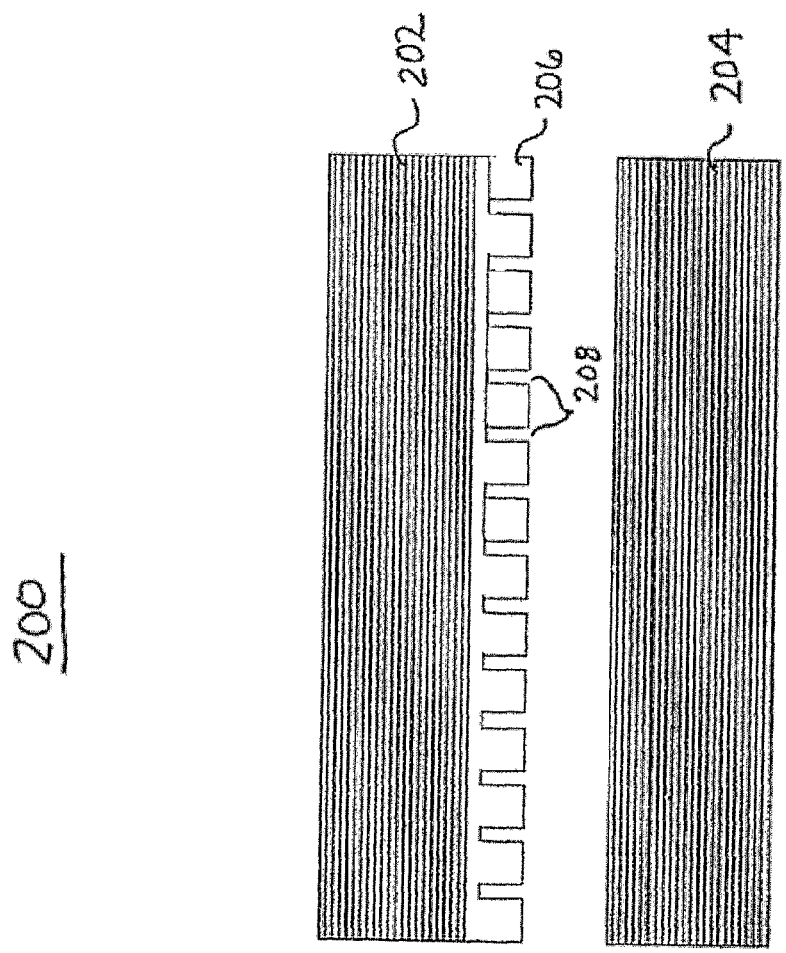
FIG. 15 provides a cross-sectional view of an illustrative silicone lined mold.

FIG. 15 provides a cross-sectional view of an illustrative silicone lined mold (200) as described herein. Shown there are an upper mold plate (202), lower mold plate (204) and silicone lining (206). The silicone lining (206) has embossed or etched patterns (208) therein. It should be understood that while the silicone lining (206) is depicted in FIG. 15 along the upper mold plate (202), it need not be. Indeed, the silicone lining (206) may also be adhered to, or otherwise retained in, the lower mold plate (204). The silicone lining may be adhered to, or retained in the mold plate using any suitable method. For example, the silicone lining may be glued, taped, clamped, pressure fit, or otherwise adhered to, or retained in, the mold plate.

Using this method, the CMP pad can be formed from a thermoplastic or a thermoset material, or the like. In the case of a thermoplastic material, a melt is typically formed and injected into the silicone lined mold. In the case of a thermoset material, a reactive mixture is typically fed into the silicone lined mold. The reactive mixture may be added to the mold in one step, or two steps, or more. However, irrespective of the material used, the pad can be allowed to attain its final shape by letting the pad material cure, cool down, or otherwise set up as a solid, before being taken out of the mold. In one variation, the material is polyurethane, and polyurethane pads are produced. For example, polyurethane pellets may be melted and placed into the silicone lined mold. The silicone lined mold can be etched with the desired pad pattern as described above. The polyurethane is allowed to cool, and is then taken out of the mold. The pad then has patterns corresponding to those of the silicone lined mold.

The potential advantages of producing in-situ grooves using this silicone lining method are several. For example, it may provide for a longer life of the mold because the silicone lining can be replaced easily if it breaks or if there is any wear or tear, and the silicone lining itself typically has a very long lifetime. Similarly, it is easier to remove the pad from the silicone lined mold as compared to a mold where the patterns are engraved therein. Hence, grooves produced using silicone lined molds may be more accurate, and damage to the pads during removal may be minimized. In a like manner, the groove sizes produced using silicone lined molds may be better controlled and better defined. For example, very small dimensions (e.g., lateral and horizontal grooves in the micron to submicron ranges) may be achieved. Better control and better definition of groove dimensions may be of particular interest in pads for specialized purposes such as low-K dielectrics, Cu removal, STI, SoC, and the like.

Figure 16A:
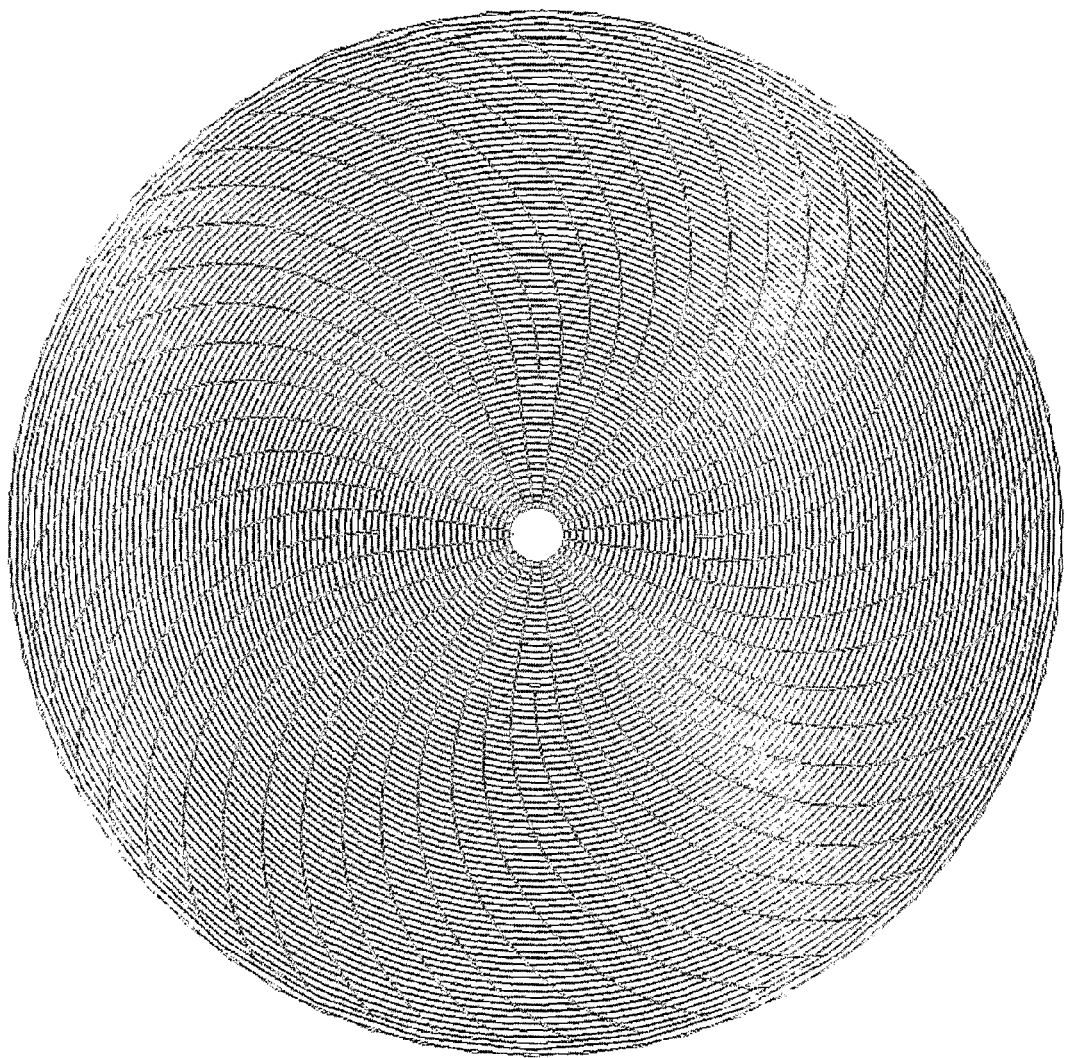
FIGS. 16A-16C depict novel groove designs for 20(16A), 24(16B), and 30(16C) inch pads.
Figure 16B:
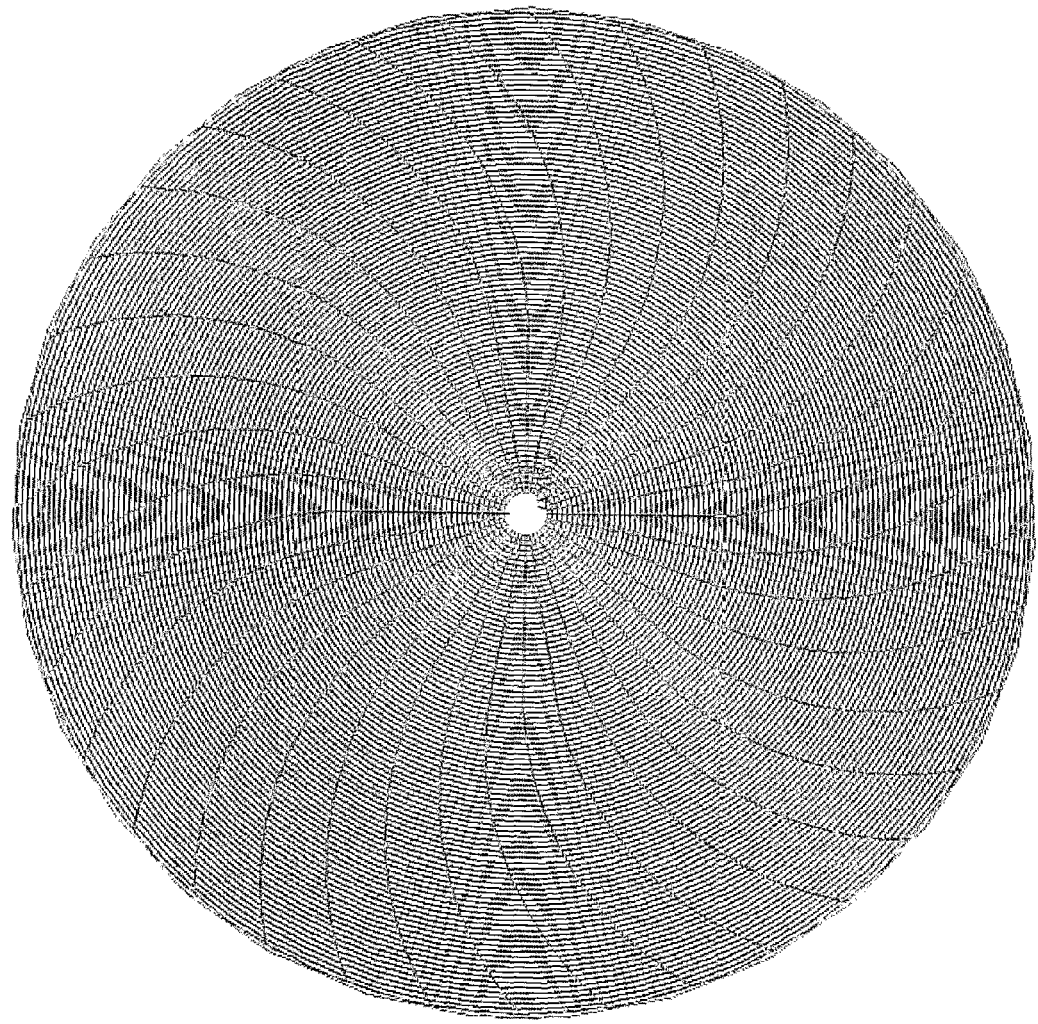
Figure 16C:
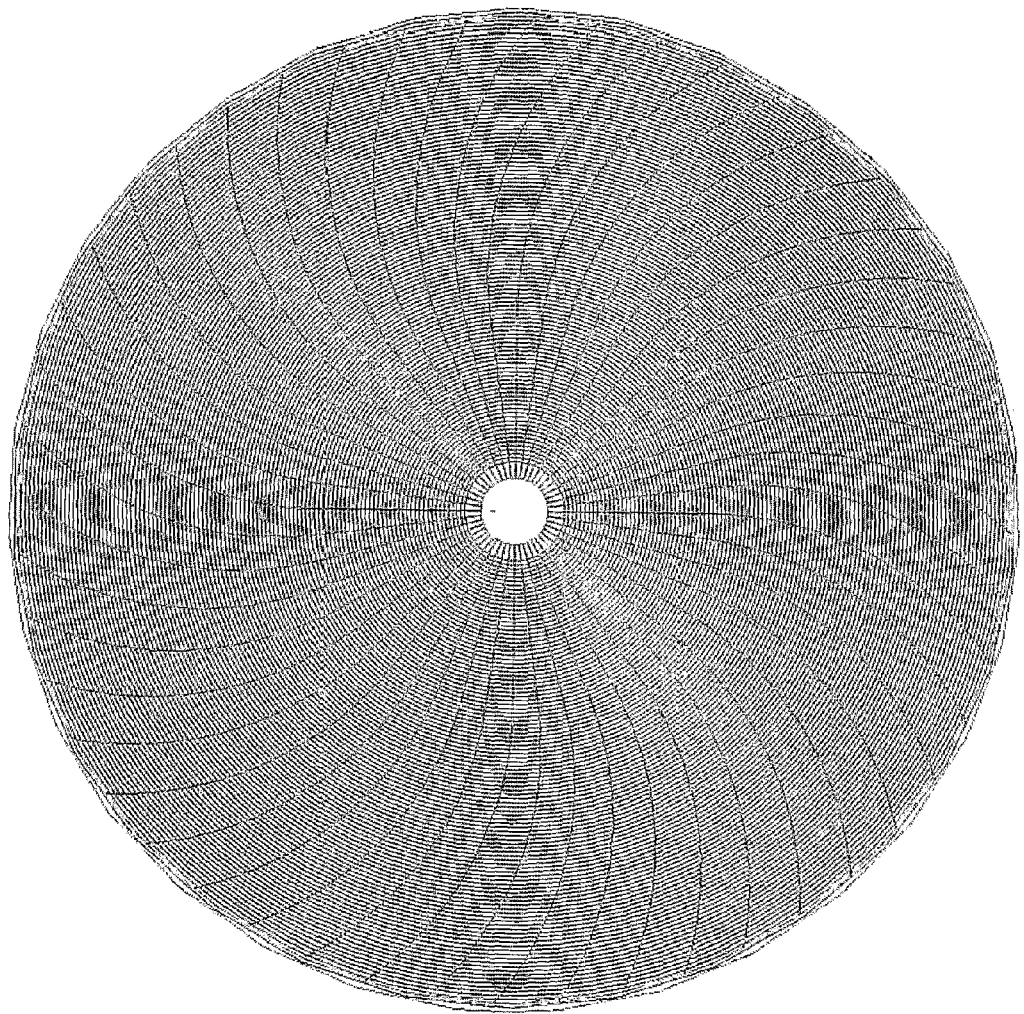

Novel groove designs are also described here. These novel groove designs were largely developed based on flow visualization studies. These studies helped to identify the flow patterns of the slurry on top of the pads. In this way, desirable trajectories of the grooves were calculated. FIGS. 16A-16C provides nonlimiting exemplary illustrations of suitable groove designs for a 20, 24, and 30 inch pad. As depicted, at smaller radius values (i.e., near the inner portion of the pads), grooves can be designed with concentric circular grooves and overlapping linear grooves which extend radially to follow the identified flow patterns. At higher radius values (i.e., near the outer portion of the pads), the radially extending grooves which were initially linear near the inner portion of the pad can be curved to prevent the slurry from flowing off of the pad and also to increase the density of the grooves near the periphery. The distribution of grooves on the polishing surface can also be used to control the distribution of slurry over the polishing surface, such as maintaining a constant slurry density over the polishing surface. The increase in the density of grooves near the periphery can be done to maintain an approximately constant groove density across the polishing surface which can be important for maintaining uniformity in polishing performance across the surface of the pad. In some cases as depicted in FIG. 16A additional radial grooves can be added which do not extend into the interior of the pad in order to maintain a constant groove density across the polishing surface. Typical groove widths can range from about 10 to about 500 microns, while typical groove depths can ranges from about 10 to about 1000 microns.

These novel groove designs may be produced by any suitable method. For example, they may be produced using the in-situ methods described above, or additionally they may be produced using ex-situ or mechanical methods, such as laser writing or cutting, water jet cutting, 3-D printing, thermoforming and vacuum forming, micro-contact forming, hot stamping or printing, and the like.

A. Laser Writing (Laser Cutting)

Laser writing or cutting may be used to make the novel groove designs described herein. Laser cutters typically consist of a downward-facing laser, which is mounted on a mechanically controlled positioning mechanism. A sheet of material, e.g., plastic, is placed under the working area of the laser mechanism. As the laser sweeps back and forth over the pad surface, the laser vaporizes the material forming a small channel or cavity at the spot in which the laser hits the surface. The resulting grooves/cuts are typically accurate and precise, and require no surface finishing. Typically, grooving of any pattern may be programmed into the laser cutting machine. More information on laser writing may be found in J. Kim et al, J. Laser Applications, vol. 15(4), pp 255-260, November 2003, which pages are hereby incorporated by reference in their entirety.

B. Water Jet Cutting

Water jet cutting may also be used to produce the novel groove designs described herein. This process uses a jet of pressurized water (e.g., as high as 60,000 pounds per square inch) to make grooves in the pad. Often, the water is mixed with an abrasive like garnet, which facilitates better tolerances, and good edge finishing. In order to achieve grooving of a desired pattern, the water jet is typically pre-programmed (e.g., using a computer) to follow desired geometrical path. Additional description of water jet cutting may be found in J. P. Duarte et al, Abrasive water jet, Rivista De Metalurgica, vol. 34(2), pp 217-219, March-April 1998, which pages are hereby incorporated by reference in their entirety.

C. 3-D Printing

Three Dimensional printing (or 3-D printing) is another process that may be used to produce the novel groove designs described here. In 3-D printing, parts are built in layers. A computer (CAD) model of the required part is first made and then a slicing algorithm maps the information for every layer. Every layer starts off with a thin distribution of powder spread over the surface of a powder bed. A chosen binder material then selectively joins particles where the object is to be formed. Then a piston which supports the powder bed and the part-in-progress is lowered in order for the next powder layer to be formed. After each layer, the same process is repeated followed by a final heat treatment to make the part. Since 3-D printing can exercise local control over the material composition, microstructure, and surface texture, many new (and previously inaccessible) groove geometries may be achieved with this method. More information on 3-D printing may be found in Anon et al, 3-D printing speeds prototype dev., Molding Systems, vol. 56(5), pp 40-41, 1998, which pages are hereby incorporated by reference in their entirety.

D. Thermoforming and Vacuum Forming

Other processes that may be used to produce the novel groove designs described here are thermoforming and vacuum forming. Typically, these processes only work for thermoplastic materials. In thermoforming, a flat sheet of plastic is brought in contact with a mold after heating using vacuum pressure or mechanical pressure. Thermoforming techniques typically produce pads having good tolerances, tight specifications, and sharp details in groove design. Indeed, thermoformed pads are usually comparable to, and sometimes even better in quality than, injection molded pieces, while costing much less. More information on thermoforming may be found in M. Heckele et al., Rev. on Micro Molding of Thermoplastic Polymers, J. Micromechanics and Microengineering, vol. 14(3), pp R1-R14, March 2004, which pages are hereby incorporated by reference in their entirety.

Vacuum forming molds sheet plastic into a desired shape through vacuum suction of the warmed plastic onto a mold. Vacuum forming may be used to mold specific thicknesses of plastic, for example 5 mm. Fairly complex moldings, and hence complex groove patterns, may be achieved with vacuum molding with relative ease.

E. Micro-Contact Printing

Micro contact printing is a high-resolution printing technique in which grooves can be embossed or printed on top of a CMP pad. This is sometimes characterized as "Soft Lithography." This method uses an elastomeric stamp to transfer a pattern onto the CMP pad. This method is a convenient, low-cost, non-photolithographic method for the formation and manufacturing of microstructures that can be used as grooves. These methods may be used to generate patterns and structures having feature sizes in the nanometer and micrometer (e.g., 0.1 to 1 micron) range.

F. Hot Stamping, Printing

Hot stamping can be used to generate the novel grooves designs describe here as well. In this process, a thermoplastic polymer may be hot embossed using a hard master (e.g., a piece of metal or other material that has a pattern embossed in it, can withstand elevated temperatures, and has sufficient rigidity to allow the polymer pad to become embossed when pressed into the hard master.) When the polymer is heated to a viscous state, it may be shaped under pressure. After conforming to the shape of the stamp, it may be hardened by cooling below the glass transition temperature. Grooving patterns of different types may be achieved by varying the initial pattern on the master stamp. In addition, this method allows for the generation of nanostructures, which may be replicated on large surfaces using molding of thermoplastic materials (e.g., by making a stamp with a nano-relief structure). Such a nano-structure may be used to provide local grading/grooving VIII. Integrated Optical Transparent Window for Endpoint Detection During CMP Polishing pads are provided having at least one region which is sufficiently transparent to one or more wavelengths of light used for endpoint detection and methods of making such polishing pads. The polishing pads may be used with optical detection or monitoring methods in any suitable chemical mechanical planarization system. Whether a polishing pad is mounted on a rotatable plate, as described, for example, in U.S. Pat. No. 6,280,289 hereby incorporated by reference, is a linear driven sheet, as described, for example, in U.S. Pat. No. 6,179,709 hereby incorporated by reference, or is some other configuration, it can be modified by methods of the invention to include a transparent region that allows for optical detection methods at or near the surface of the substrate being polished. Optical detection and monitoring methods are useful in end point determination, such as measuring of light reflected off of the substrate surface described in the above-mentioned patents. It is also possible to monitor the solution that is at the interface between the polishing pad and substrate surface. Optical measurements may be made on this solution, for example, to measure the distribution of the slurry layer between the substrate surface and polishing pad as described in U.S. Pat. No. 6,657,726 hereby incorporated by reference. This solution might also contain a luminescent material that is sensitive to the localized concentration of material being released by the substrate surface, such that detecting the light emitted by the luminescent material as a function of position below the substrate surface provides a map of the substrate surface composition that can be used to determine the end point. Such a system is described in U.S. provisional patent application No. 60/654,173 and is hereby incorporated by reference. All of these systems and methods require that at least a region of the polishing pad be sufficiently transparent, either to pass light from a light source through the pad to a substrate surface or the slurry interface, or to pass light from the substrate surface or slurry interface through the pad to a detector, or both.

In one instance, new methods include a process to make a localized area transparency pad. The method involves the sufficient removal of porosity by reducing or not adding porosity forming agents during the pad fabrication process in the area which needs to be made transparent, while preferably essentially maintaining the chemical (polymer) composition the same throughout the entire pad. This new method of making a localized area transparent window allows for much greater pad life and substantially improved polishing performance of windowed pads. Additionally, methods may be included to compensate for the difference in properties, such as hardness, between the window and the pad. For example the removal of micropores from a region on the pad to sufficiently increase transparency for optical end point detection can make the less porous region harder than, and thus a softer polymeric material can be used in the less porous region to account for the increased hardness. This compensation provides more controlled or uniform polishing of the wafer.

Another, property which can affect the transparency is the size and density of the hard domains within the CMP pad. Larger sized hard domains scatter light and thus make the pad less transparent to light used for endpoint detection. Thus a decrease in the size and the number of the hard-domain within the pad may be required to achieve sufficient transparency for endpoint detection.

This concept of 'local area transparency' can be easily implemented to form multiple windows during pad fabrication, such as by liquid casting or reaction injection molding, to provide suitable pads for the optical paths of multiple detector assemblies on a polishing platform. Such multiple window schemes can be used to provide accurate end point detection and instantaneous wafer polished surface profiles.

Figure 17:
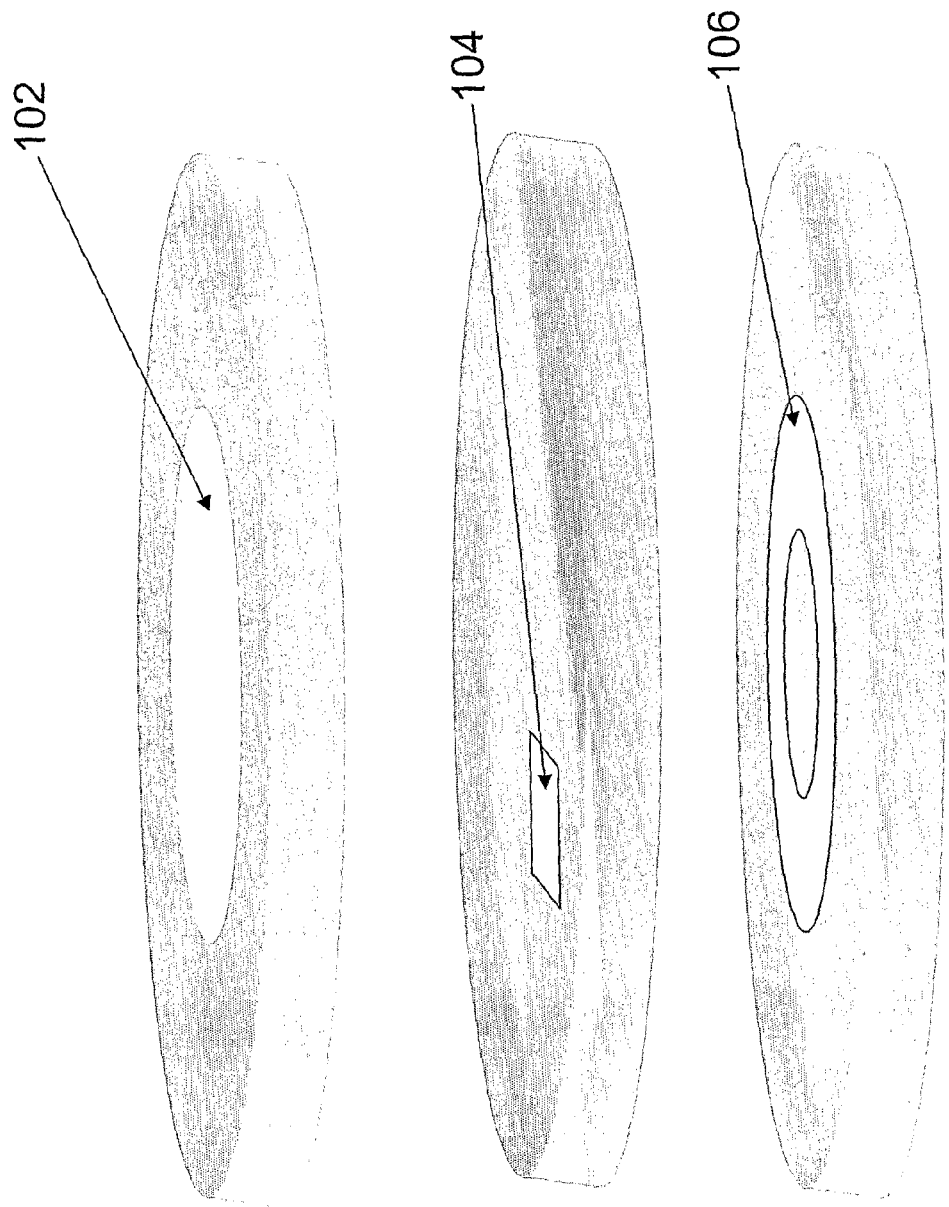
FIG. 17 is a schematic of examples of possible geometries for the transparent region.
Figure 18:
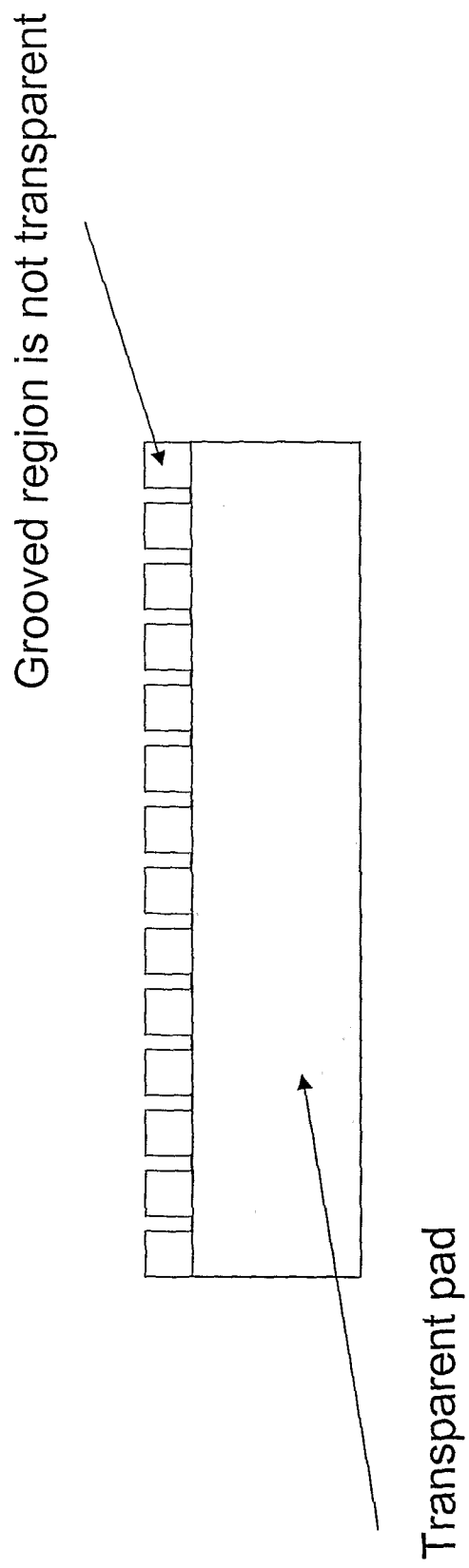
FIG. 18 shows a transparent base with less transparent grooves.
Figure 19:
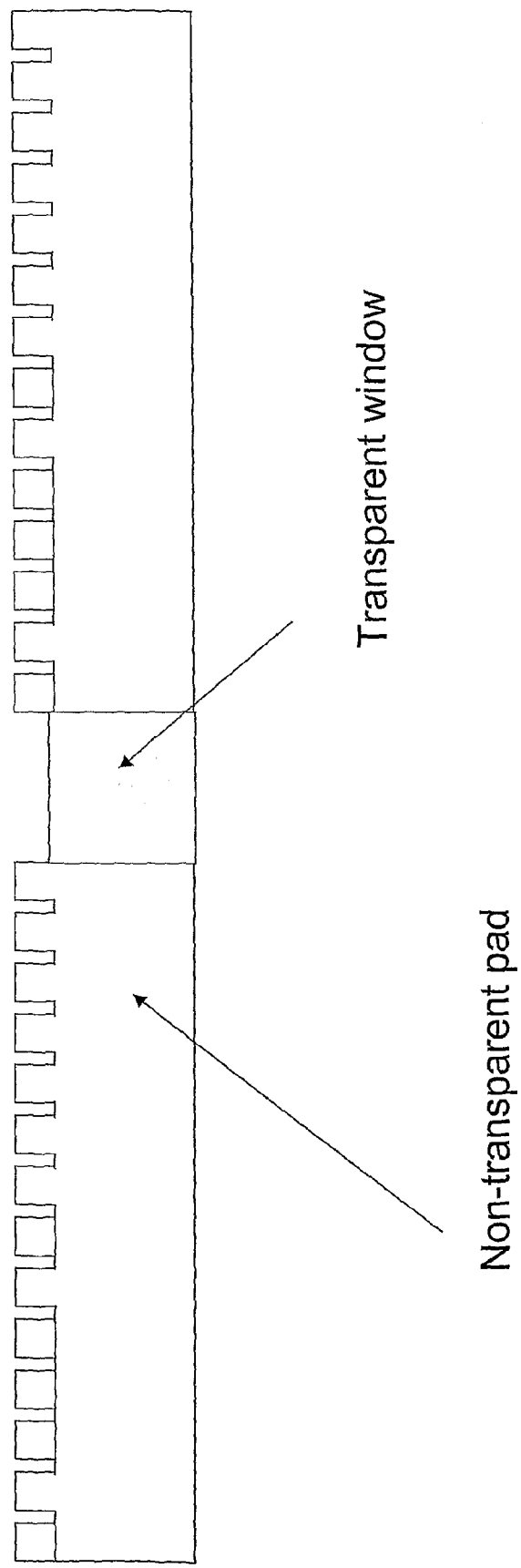
FIGS. 19 and 20 demonstrate examples where the window is the same thickness as the remainder of the pad (19), or is thinner than the remainder of the pad (20).
Figure 20:
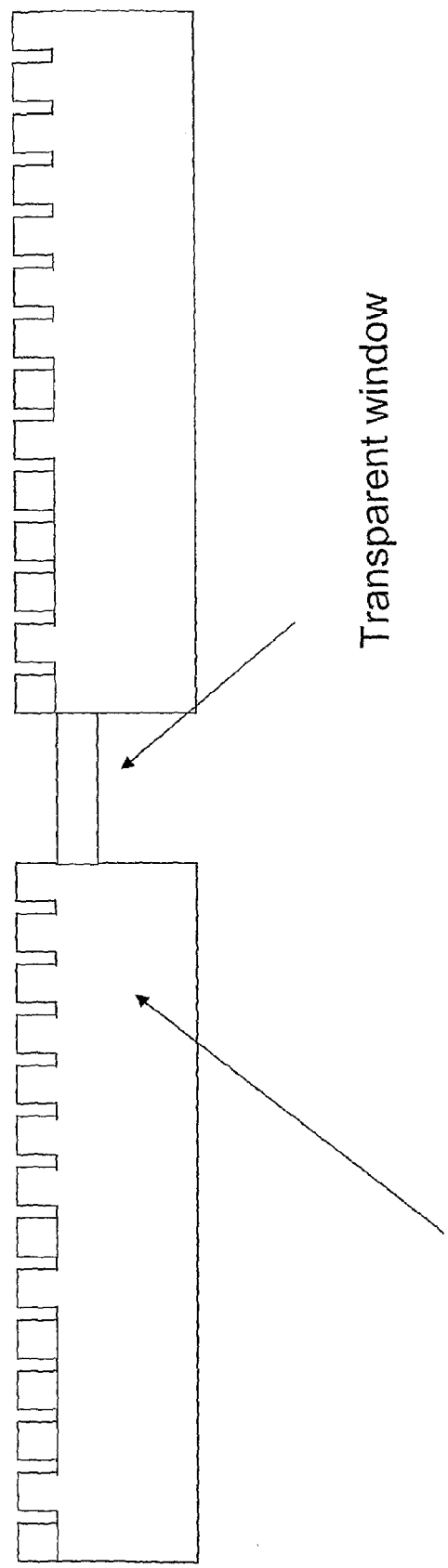

The polishing pads provided are described in terms of a transparent region and a less transparent region. While the entire pad may be transparent, this is less desirable since the transparent regions substantially lack properties of a porous structure as previously described. As such, typically the pad has transparent regions within the less transparent portion, which is not limited to any geometry. For example, within a circular pad, a variety of geometries may be used. FIG. 17 is a schematic of non-limiting examples of possible geometries for the transparent region within the less transparent region, where the region can be cylindrical (102), rectangular (104) or ring-shaped (106). Further, with a square or rectangular window, the direction of the window may be varied. Other configurations are also possible, such as a transparent base pad with less transparent grooves as shown in FIG. 18. The formation of grooves is discussed in section VII. FIGS. 19 and 20 demonstrate examples where the window is the same thickness as the remainder of the pad, or is thinner than the remainder of the pad. The transparent region may be of any size and shape, and the total transparent area may be anywhere up to 100% of the total pad area, and is typically less than the total less transparent area, i.e. about less than 50% of the total area. In some aspects, the total transparent area is about less than 40%, about less than 30%, about less than 20%, about less than 10% or about less than 5% of the total area. The polishing pad may have multiple transparent regions, where the total area of all transparent regions is typically less than the total area of the less transparent region or regions. There is typically one continuous less transparent region with one or more transparent regions within, although one or more transparent regions could divide the pad into two or more less transparent regions.

A transparent region is a region or portion of the pad that is sufficiently transparent to light of desired wavelengths. The region is sufficiently transparent if light is transmitted through the pad region in an amount sufficient to allow the necessary optical monitoring or detection described herein. The transparent region need not be completely transparent and some scattering or absorption of incident light is acceptable. Preferably, the region transmits light over a broad range of wavelengths, although the transmission may vary as a function of wavelength across the desired range. When desired, the region may also transmit only a single wavelength. Light comprising a spectrum of wavelengths is not necessarily transmitted at all wavelengths, but only as needed to use the appropriate optical detection methods. As such, the transparent region is sufficiently transparent to some or all of the wavelengths from ultra-violet to infrared. For example, the transparent region is sufficiently transparent to some or all of the wavelengths in the range of 100 to 1,000 nm, also about 200 to 800 nm, or about 250 to 700 nm, where in one aspect, sufficiently transparent means at least about 20%, also at least about 50% or at least about 75% of light of a given wavelength is transmitted through the region.

The transparent region comprises a suitably transparent polymer, where the region sufficiently lacks porosity. The pores scatter light so that if the pore density is too high, much of the light is scattered and the region is not sufficiently transparent. The remainder of the pad is less transparent and may sufficiently transmit light useful for optical end point detection. The remainder is less transparent because it has a pore density such that the pores scatter the incoming light and thus make the region less transparent. In one instance, the less transparent portion has substantial porosity, or is substantially micro-porous, such that it will transmit less than about 20%, also less than about 10%, also less than about 5% or less than about 1% of light that is transmitted by the transparent region. The pore density may vary across the less transparent portion, such that different regions of the less transparent portion of the pad may not block the same amount of light, but all regions block sufficient light due to the porosity, as discussed herein.

The following examples set forth certain examples of new polishing pads and methods of making such pads.

EXAMPLE 1

Process for Forming a Windowed Pad

Figure 21:
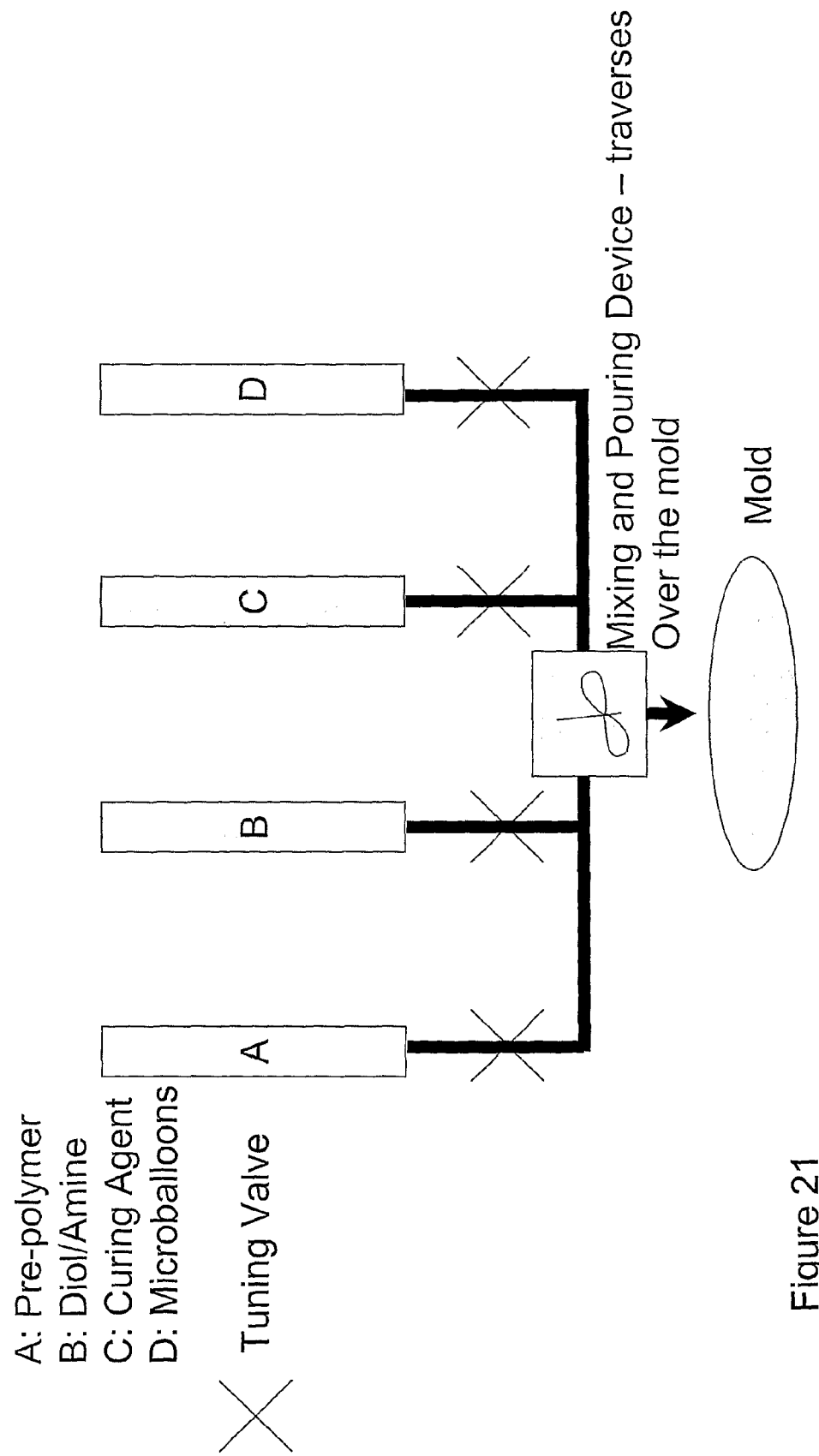
FIG. 21 is a schematic of a manufacture process which can be used to make transparent regions in a CMP pad.

An situ window formation manufacturing process may be used. The manufacturing process is designed such that each of the product streams: curing agent, diol, pre-polymer, and microballoons are added separately in a continuous process prior to or during mixing. This is demonstrated schematically in FIG. 21 Using such a manufacturing process, each of the required feed streams can be easily controlled to deliver the desired amount of curing agent, diol, pre-polymer, and microballoons.

While this process provides remarkable tunability and flexibility, one of the other goals which can be achieved using such a manufacturing process is the formation of a window in-situ. During the manufacturing process, each part of the mold which needs to be filled in order to make the pad can be traversed by the insertion nozzle at a pre-defined speed. In order to achieve transparency for a certain local region, the microballoons stream can be shut off or the flow rate reduced while the feeder is traversing that particular region. Transparency is achieved since the inherent polymer matrix, which is composed of a polyurethane formed by the reaction of the curing agent, diol (or amine) and pre-polymer, is transparent. The opacity of the pad is due to the introduction of the microballoons in the non-window region.

Figure 22:
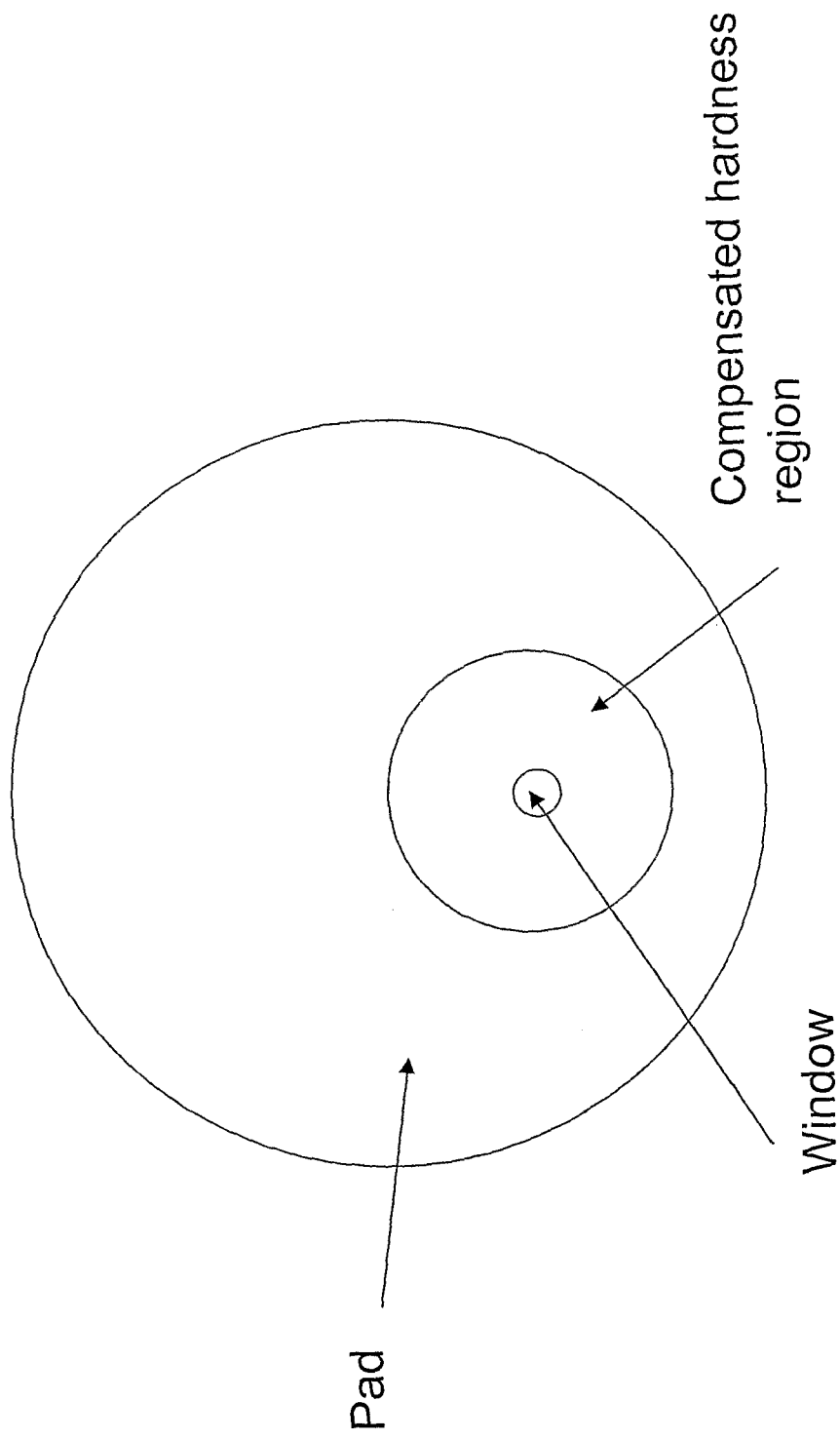
FIG. 22 is an example of compensation grading to nullify any adverse effects due to the changed hardness in the transparent region.

Although the absence of microballoons to achieve transparency in the entire pad is possible, such a transparent pad may not have the desired flexibility for polishing purposes. The absence of microballoons can increase the hardness by about 5-10 shore D. It is thus preferable to make local regions transparent for end-point detection purposes and then create a compensation grading scheme for the pad in order to nullify any adverse effects due to the changed hardness in the transparent region. An example of such a pad is shown in FIG. 22. Such compensation grading would be very efficiently achieved with pre-defined grading schemes. Such grading schemes can be achieved by the tunability allowed in the manufacturing process described in this example. For example, the hardness in the transparent region can be accommodated through the addition of a softer material. Such a manufacturing process can also be used to make more than one window if desired.

EXAMPLE 2

Properties of Polishing Pad with Window Transparent to Visible Light

Figure 23:
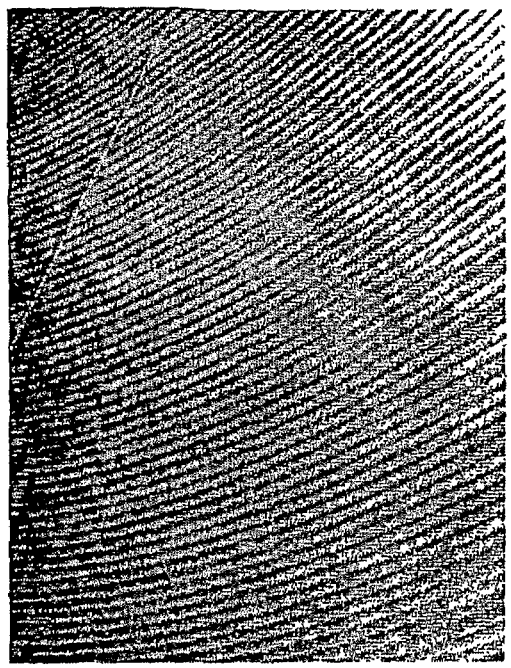
FIG. 23 is a picture of a transparent pad.
Figure 23:
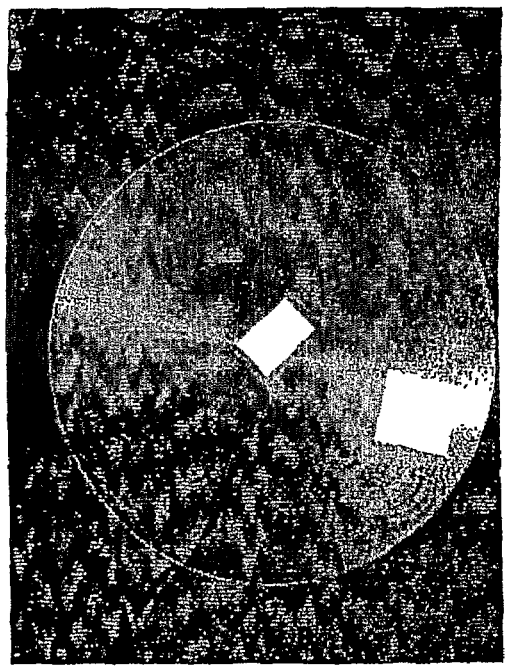

As an example, the present formulation is specified for making a graded CMP polyurethane pad with window of dimensions 0.75×2.25 inches used for polishing the wafers. A polyurethane-polishing pad is made with predetermined hardness, pore size and porosity. The pad has a hardness ranging from about 65 D to 75 D and has a pore density ranging from about 25% to 15% of the pad material, respectively with the pore size 35-55 µm. The hardness value for the pad is typically in the 45D-75D shore hardness range, and in one instance is preferably approximately 70D for a window. In order to achieve the desired goal of optical end point detection using commercially available CMP equipment, the pad window is preferably transparent to visible light, since visible light is used in such detection schemes. FIG. 23 shows a fully transparent pad.

Aspects of the characteristics, described in sections II-VIII of the customized pads for CMP, which can be made by the process described and materials described in section I can be combined achieve the desired properties of the pad. Table 10 lists the characteristics described in sections II-VIII.

TABLE 10

Pad characteristics described in sections II-VIII.

| Number | Characteristic |
|---|---|
| 1 | Controlled Porosity Pads |
| 2 | Functionally Graded Pads |
| 3 | Low Shear Pads |
| 4 | Sub Surface Engineered Pads |
| 5 | In Situ Grooved Pads |
| 6 | Embedded Abrasive Pads |
| 7 | Pads with transparent window for optical end point detection |

In addition to the polymer formulations described in section I the characteristics listed in table 10 can be combined to form customized pads with controlled microstructure along with the additional characteristics listed in table 10. The combinations of characteristics which can be combined with the controlled microstructure are as follows (the number represents the characteristic in table 10): 1, 2, 3, 4, 5, 6, 7, 1&2, 1&3, 1&4, 1&5, 1&6, 1&7, 2&3, 2&4, 2&5, 2&6, 2&7, 3&4, 3&5, 3&6, 3&7, 4&5, 4&6, 4&7, 5&6, 6&7, 1&2&3, 1&2&4, 1&2&5, 1&2,&6, 1&2,&7, 1&3&4, 1&3&5, 1&3&6, 1&3&7, 1&4&5, 1&4&6, 1&4&7, 1&5&6, 1&5&7, 1&6&7, 2&3&4, 2&3&5, 2&3&6, 2&3&7, 2&4&5, 2&4&6, 2&4&7, 2&5&6, 2&5&7, 3&4&5, 3&5&6, 3&5&7, 3&6&7, 4&5&6, 4&5&7, 4&6&7, 5&6&7, 1&2&3&4, 1&2&3&5, 1&2&3&6, 1&2&3&7, 1&2&4&5, 1&2&4&6, 1&2&4&7, 1&2&5&6, 1&2&5&7, 1&2&6&7, 1&3&4&5, 1&3&4&6, 1&3&4&7, 1&3&5&6, 1&3&5&7, 1&3&6&7, 1&4&5&6, 1&4&5&7, 1&4&6&7, 1&5&6&7, 2&3&4&5, 2&3&4&6, 2&3&4&7, 2&3&5&6, 2&3&5&7, 2&3&6&7, 2&4&5&6, 2&4&5&7, 2&4&6&7, 2&5&6&7, 3&4&5&6, 3&4&5&7, 3&4&6&7, 3&5&6&7, 4&5&6&7, 1&2&3&4&5, 1&2&3&4&6, 1&2&3&4&7, 1&2&3&5&6, 1&2&3&5&7, 1&2&3&6&7, 1&2&4&5&6, 1&2&4&5&7, 1&2&4&6&7, 1&2&5&6&7, 1&3&4&5&6, 1&3&4&5&7, 1&3&4&6&7, 1&3&5&6&7, 1&4&5&6&7, 2&3&4&5&6, 2&3&4&5&7, 2&3&4&6&7, 2&3&5&6&7, 2&4&5&6&7, 3&4&5&6&7, 1&2&3&4&5&6, 1&2&3&4&5&7, 1&2&3&4&6&7, 1&2&3&5&6&7, 1&2&4&5&6&7, 1&3&4&5&6&7, 2&3&4&5&6&7, 1&2&3&4&5&6&7.

IX. Methods for Customization

Customization of pads can be based on the desired pad property. For example, creation of urethane hard pads is achieved through the use of a higher degree of crosslinking, the use of a TDI based system instead of MDI and the use of shorter polyol and polyamine chains. Lower glass transition temperature pads can be made using polyether polyols, and by decreasing the size and increasing the number of the hard segments. Pads with improved tear strength can be made using polyester polyols. Transparent pads can be made by increasing the number of hard segments, not allowing for the phase separation of the shorter soft chains, by reducing the size of the pores, using polyols with less aromaticity, and having linearity in the molecules (i.e. the stoichiometry should be approximately. Hydrophilic pads can be made through the addition of select hydrophilic and low molecular weight polyols.

A. Methods for Customizing Pads According to Material to be Polished

Polishing of oxides, such as $SiO_2$, can be achieved through the addition of embedded abrasives, such as $SiO_2$ particles within the polymeric material of the polishing pad.

Figure 24:
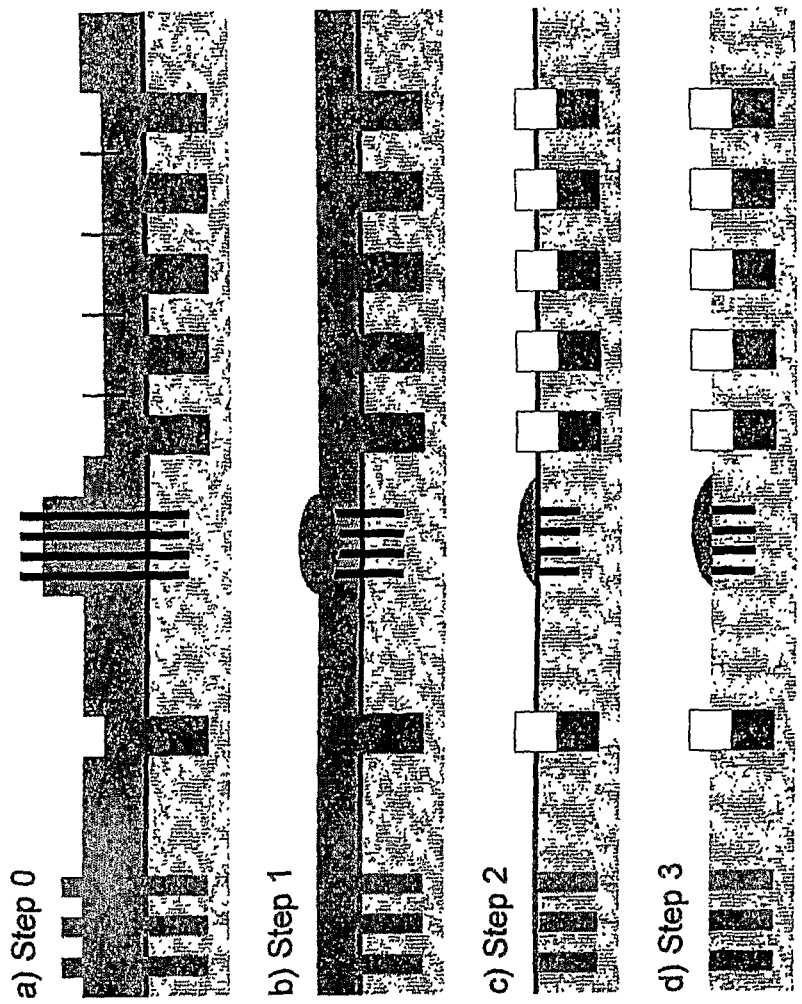
FIG. 24 is a schematic of the multiple steps in copper CMP.

Copper polishing involves a three step process. FIG. 24 is a schematic of the copper polishing process. The first step is bulk copper removal. The second step in the removal of the low K barrier which can require low a COF. Finally the third step is the removal of the tantalum/tantalum nitride barrier layer. Typically three different pads are used for the individual steps. With some of Neopad's pads, as described herein single pad functionality can be achieved (i.e. a single pad can be used for all three steps). This can be achieved through the addition of solid lubricants, such as boron nitride and/or Teflon® and the use of low shear integral pads. Low shear integral pads and pads containing solid lubricants such as Boron nitride or Teflon®, which can be a solid lubricant for copper polishing, allow for a lower COF which can be desired for the copper polishing process.

STI (nitride and oxide stack) can be polished through the addition of embedded abrasives such as cerium oxide as well as by the use of low shear integral pads. The cerium oxide can allow for selectivity in the polishing process, because cerium oxide can selectively polish nitride. The interfaces in the low shear integral pads can allow for lower COF. Functional grading of the abrasives can also be used to polish STIs.

A softer pad with a higher compressibility than pads used for polishing oxide can be used to polish tungsten, which is a soft brittle material. The reduction in pad hardness can be achieved by using soft polymers, such as one manufactured using a longer chain polyol material, and by increasing the porosity in the pad.

Optical material, which are extremely brittle and can require a low removal rate, can desire methods such as whisper or cluster polishing which has a very low COF. This can be achieved by the addition of solid lubricants and/or the use of low shear integral pads with multiple interfaces.

As with optical material, strained silicon, vertical gates, FinFet structures, or SOIs, present in the substrate are extremely brittle and can require a low removal rate, can desire methods such as whisper or cluster polishing which has a very low COF. This can be achieved by the addition of solid lubricants and/or the use of low shear integral pads with multiple interfaces.

If SoCs are present, polishing can be achieved with the addition of solid lubricants such as Boron nitride or Teflon® and the use of low shear integral pads. Functional grading may be needed if large pattern densities are present.

B. Methods for Customizing Pads According to IC Characteristics to be Polished

For a high IC pattern density, greater than 70%, on the substrate, a tighter control of the pad properties, such as long range order, pore size, and distribution, is desired. Tighter control of these properties can be achieved through control of the pad fabrication process, such as controlling the uniformity of the temperature during the manufacture process and having homogenized mixtures of the polymeric starting components.

For a high IC pattern density range on the substrate, functional grading of the pads can be desired to accommodate the density range. For a high pattern density range, such as about 50%-100% of the substrate, continuous or discontinuous radially symmetric functional grading, as schematically depicted in FIGS. 7 and 10 respectively, can be used. For an even higher pattern density range, such as about 80%-100% of the substrate, non-radially symmetric grading, as schematically depicted in FIG. 9, can be used for a more customized distribution of the pad properties on the polishing surface.

For a smaller line width of the IC, a smaller COF of the pads is desired. This can be achieved with the addition of solid lubricants and/or the use of low shear integral pads.

The chip size can determine the desired properties of the CMP pad. For a large the chip, such as SoC's, functional grading can be important for high chip yield.

The size of technology nodes, such as transistors and metal lines, can determine the desired properties of the polishing pads. For lower technology nodes, below 90 nm, the use of solid lubricant within pad material, and low shear integral pads can be critical because they provide a low COF. A low COF can be critical, because as structures get smaller the chances they may break during polishing increases, and hence a low COF can be required. Some of Neopad's pads can be designed to accomplish highly uniform polishing performance at all the technology nodes at 90 nm and above as well as technology nodes such as 65 nm, 45 nm, 32 nm and lower.

C. The Properties of Customized Pads for CMP

Pad Thermal Properties (Temperature Transient)

The temperature transient during a polishing operation can affect the polishing performance. The temperature transient depends on several variables which include the slurry flow rate as well as the loss modulus (E") and storage modulus (E') of the pad. A smaller temperature transient is desirable since a fluctuation in the polishing temperature can lead to a variation in the removal rate and consequently affect the polishing rate and hence the uniformity of the process. For example, it has been shown that a change in 2° C. of the polishing temperature can lead to change in approximately 20% in the removal rate. In this invention, new methods are developed to reduce the temperature transient during polishing. A low temperature transient can be maintained by maintaining a uniform distribution of the type, size and density of hard domains within the polymeric matrix of the pad, having high E' and E" values, having a small loss in storage modulus $\Delta E'$ (20° C.-40° C.), which should be about less than 20%, smaller tan δ values, and decreasing the size of hard domains and increase the density of hard domains (can cause increases E' and E" values).

Figure 25:
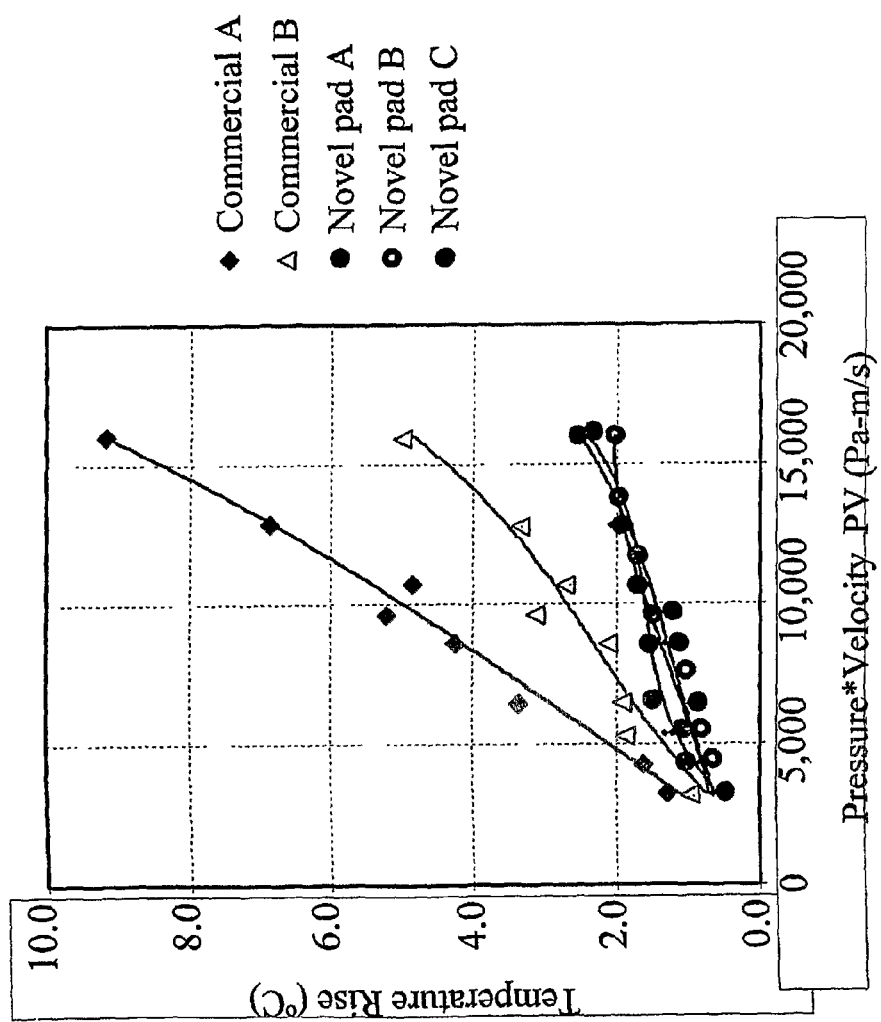
FIG. 25 is a thermal transient comparing two commercial pads and three novel Neopad pads.

Neopad's novel customized pads have a thermal transient within 3° C. (maximum) while the commercial pads have a thermal transient which is greater than 10° C. The temperature as a function of pxV for three customized Neopad's pads and two commercial pads are shown in FIG. 25.

DMA/TMA Properties

The thermo-mechanical properties of the pad can be important for the polishing performance of the CMP pads. The key properties are the glass transition temperature ($T_g$), the loss modules (E"), the storage modulus (E'), the tan δ (E"/E'), KEL(tan $\delta*10^{12}(E'(1+\tan^2\delta))$), the surface tension, compressibility and the thermal transient properties described above. For uniform and improved polishing a lower glass transition temperature is desirable. Higher E" and E' values are desired because they lead to an increase in polishing performance. Higher E" and E' values can be achieved by reducing the size and increasing the density of hard domains within the CMP pad. Further, a lower tan δ value is desirable in the polishing temperature range because lower values allow for a lower temperature transient.

The DMA/TMA properties are shown in Table 1. The storage modulus (E') is greater than about 400 MPa for Neopad's novel customized pads compared with less than 300 MPa for commercial pads. The loss modulus (E") is greater than about 250 MPa for Neopad's novel customized pads compared with less than 250 MPa for commercial pads. The novel pads have a $T_g$ below about −30° C. as compared to the $T_g$ of the commercial pads which have a $T_g$ of greater the −20° C. A lower $T_g$ is desirable because when $T_g$ is further away from the working temperature, the effect of the temperature, on the pad properties is reduced. At or near $T_g$, the polymer properties undergo drastic changes and have a large temperature dependence.

Further, the lowering of the change in storage modulus ($\Delta E'$) as function of temperature can be important. Lower values can suggest the change in the properties of the polymer is at a minimum (ie. that the material properties remain the same and clearly this property is desirable). A smaller change in storage modulus between 40° C. and 20° C. is obtained for the Neopad pads (19%) as compared to the commercial pads (30% and higher) as shown in Table 11. The reduction in the storage modulus can be achieved by maintaining a uniform distribution of the type, size and density of hard domains within the polymeric matrix of the pad

TABLE 11

| Pad properties | | |
|---|---|---|
| Property | Typical Value (Neopad) | Typical Value (Commercial) |
| Storage Modulus 20° C. (E') | >400 Mpa, typically >700 MPa | <300 MPa |
| Loss Modulus 20° C. (E") | >250 Mpa, typically >400 Mpa | <250 Mpa |
| tanδ 20° C. (E"/E') | 0.4-0.8, typically <.7 | >1.0 |
| $\Delta E'$(%) (40° C.-20° C.) | <20%, typically <15% | >50% |
| $T_g$(° C.) | <−30° C., typically <−35° C. | >−20° C. |
| KEL(1/Pa) | <100 | 100-1000 |
| Thermal Transient (° C.) | <5° C., typically 2-3° C. | >15° C. |
| Surface Tension | <25 mN/m | >34 mN/m |
| Compressibility | <1% | 1-5% |

Other properties shown in table include tan δ, which is typically less than about 0.7 for Neopad's pads and greater than 1 for commercial pads, KEL(tan $\delta*10^{12}(E'(1+\tan^2\delta))$, which is less than about 100 (1/Pa) for Neopad's pads and range from 100-1000 for commercial pads, the surface tension, which is less than about 25 mN/m for Neopad's pads and greater than 34 mN/m for commercial pads, and the compressibility which is less than about 1% for Neopads pads and ranges between 1%-5% for commercial pads. The desired characteristics of the polishing pads are shown in table 12.

TABLE 12

| Desired pad characteristics | |
|---|---|
| Pad customization for | Achieved by |
| Uniform removal rate (i.e. that a Prestonian behavior is achieved with minimal deviation of $K_p$) | a. Uniform distribution of the type, size and density of hard domains with the polymeric matrix of the pad.<br>b. Having a low temperature transient<br>c. Uniform size and distribution of asperities on the polishing surface<br>d. Uniform groove density on the polishing surface<br>e. Functional grading of pad<br>f. Tighter molecular weight distribution and uniformity of polymeric starting material<br>g. Higher value of E' and E'' (can be achieved by adjusting polyurethane/polyureas ratio) |
| Stable coefficient of friction in the boundary lubrication regime and extending the boundary lubrication regime (Tuning the Stribeck Curve) | a. Uniform distribution of the type, size and density of hard domains with the polymeric matrix of the pad.<br>b. Having a low transient<br>c. Uniform size and distribution asperities on the polishing surface<br>d. Functional grading of pads<br>e. Higher E' (>400 Mpa) and E'' (>250 Mpa) values<br>f. Tighter molecular weight distribution and uniformity of individual polymeric starting components |
| Low coefficient of friction(COF) | a. Addition of solid lubricants within the polymeric material<br>b. Low shear integral pads |
| Low temperature transient | a. Uniform distribution of the type, size and density of hard domains with the polymeric matrix of the pad.<br>b. High E' and E''<br>c. Loss in storage modulus ($\Delta E'$) should be less (<20%)<br>d. Decrease size and increase the density of hard domains within the pad(can cause increases in E' and E'' values) |
| Low slurry flow rate during polishing | a. Uniform distribution of the type, size and density of hard domains with the polymeric matrix of the pad.<br>b. Pore shape such as oblong pores.<br>c. Approximately constant groove density throughout the pad |
| Uniform Size and distribution of asperities | a. Uniform distribution of the type, size and density of hard domains with the polymeric matrix of the pad.<br>b. Tight distribution of prepolymer chain length and molecular weight.<br>c. Uniform distribution of size and shape of pores |
| Outer edge yield increase | a. Radially symmetric functional grading of pad material across the polishing surface. |
| Defectivity | a. Uniform distribution of the type, size and density of hard domains with the polymeric matrix of the pad.<br>b. Use of low shear integral pads<br>c. High values of E' and E'' (decrease amount of dishing and erosion)<br>d. Constant COF<br>e. Addition of solid lubricants |
| Planarization efficiency | a. Uniform distribution of the type, size and density of hard domains with the polymeric matrix of the pad.<br>b. Low compressibility<br>c. Functional grading of polymeric material and/or embedded abrasives in the pads<br>d. Higher value of E' and E'' |
| Local area transparency | a. No phase separation should take place, with shorter soft chain.<br>b. Small hard domains.<br>c. Reduction in pore size or removal of pores from window region.<br>d. Less aromaticity in the polymer being used, since aromatic materials lead to light scattering |
| Pad break-in | a. Control of skin thickness (<2 μm) |
| Increase pad life | a. Uniform distribution of the type, size and density of hard domains with the polymeric matrix of the pad.<br>b. Higher E' and E'' values |
| Step height control(oxide) | a. Uniform distribution of the type, size and density of hard domains with the polymeric matrix of the pad.<br>b. Higher E' and E'' values<br>c. Uniform distribution of the size and shape of pore within pad |

Customization can also be used to account for the type of slurry used during the polishing process. Depending on the slurry used, the surface tension of the pad can be adjusted to accommodate the wetting properties and viscosity of the slurry. Accommodation of the wetting properties can be achieved through the use of polymeric material which is more miscible with the type of slurry being used. Viscous slurry can require a pad which can allow for greater slurry retention and a pad that is slightly softer.

The equipment platform on which polishing occurs can also effect the customization. Different equipment platforms (i.e. AMAT, Ebara) have different regions of the pad exposed to different regions of the wafer for different amounts of time. Functional grading can be used to accommodate different regions of higher and lower pressure resulting from the different equipment platforms. The size of the pad may also be adjusted to accommodate different equipment platforms.

X. Exemplary Pad Performance

A description of non limiting exemplary methods of fabrication and comparison of some key aspects of CMP performance for the subject pads compared to commercially available pads is provided below.

EXAMPLE 1

Customized pad A, designed for polishing oxides, contains a urethane with 70D hardness. Pads are molded using liquid casting and are formulated using methods previously described. Amongst the components a 70D isocyanate, a polyol chain extender, a curative agent, a stabilizer, used for UV protection, and a porosity agent are used for pad manufacture. The pour is carried out at about 150-160° F. After the pour the material is allowed to settle and cure for approximately 15 minutes. Then the pad is removed from the mold and put in an oven for approximately 12 hours for post-cure at a uniform temperature between about 100° F.-200° F. The thickness of the pad is 80 mils and the diameter of the pad is 20 inches. A double side tape is adhered to the backside to get the pad ready for polishing. Customized pad B is similar to customized pad A in terms of formation but the hardness is lower at 65D.

Figure 26:
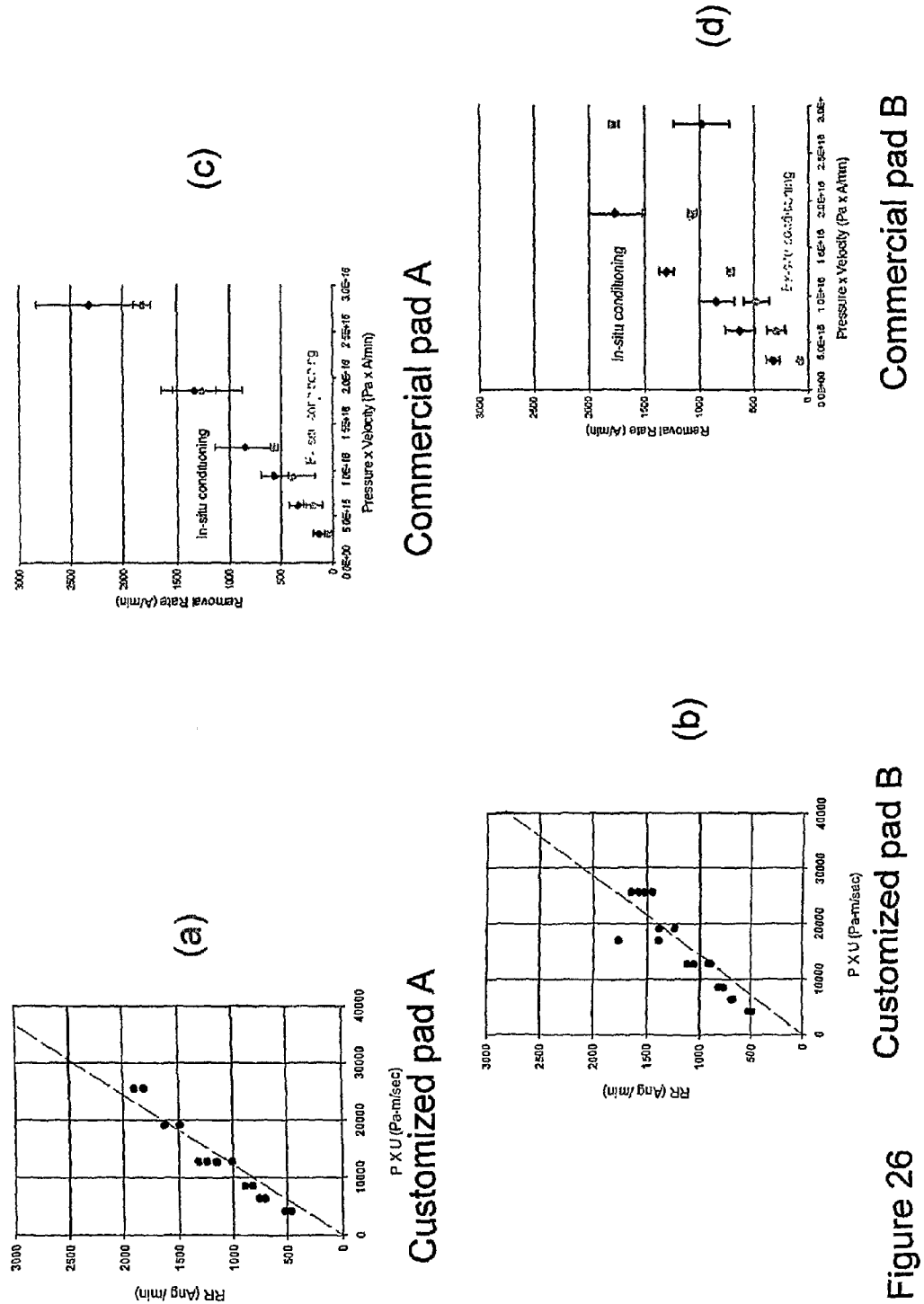
FIGS. 26a-26d are prestonian plots for two customized pads (26a-26b) and two commercial pads (26c-26d).
Figure 27:
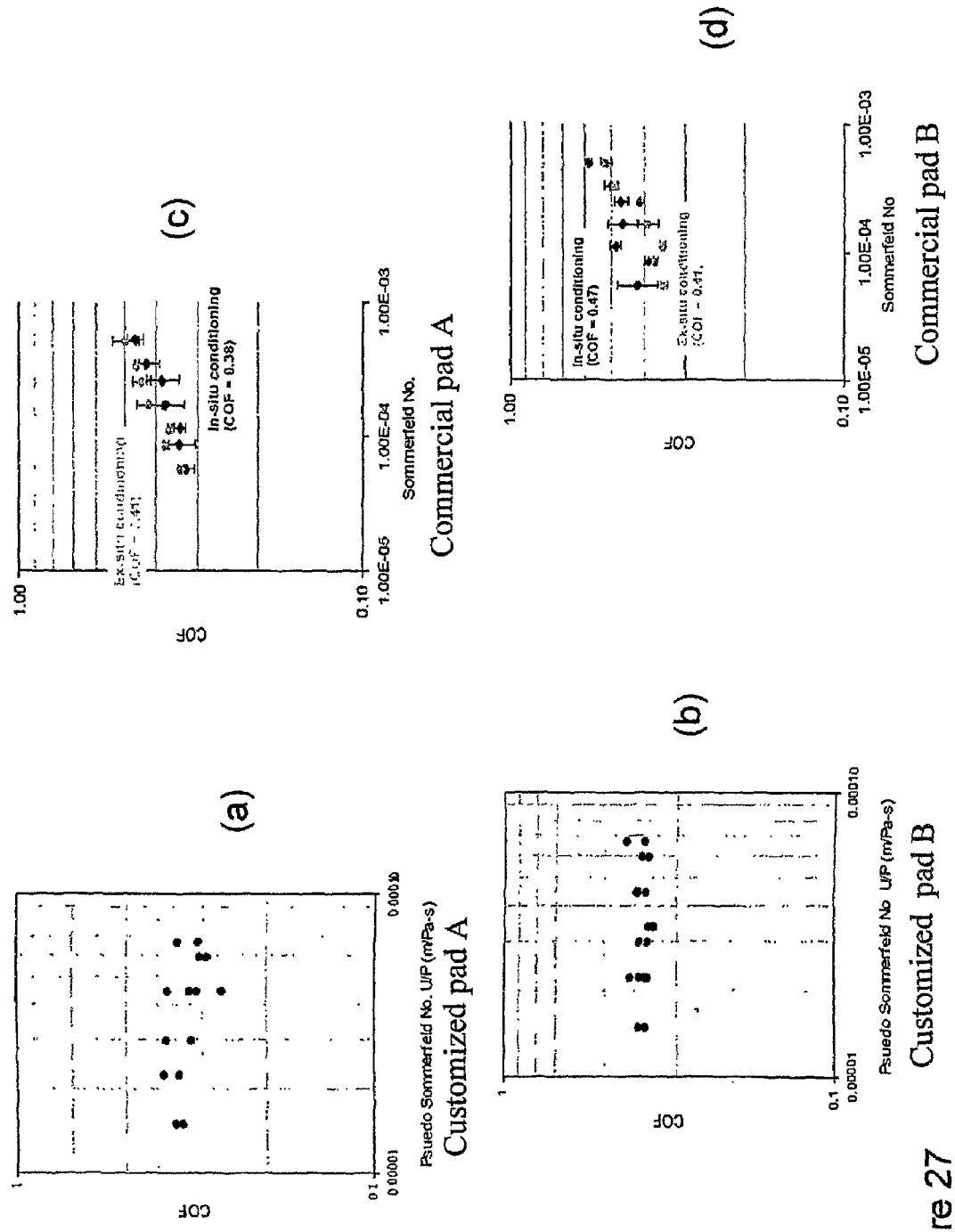
FIGS. 27a-27d are Stribeck curves for two customized pads (27a-27b) and two commercial pads (27c-27d).

Prestonian plots are presented for the two subject pads described above (FIGS. 26a and 26b), and for two commercially available pads (FIGS. 26c-26d). During polishing of the interlayer dielectric layers, the RR data as a function of varying pressure and velocity is obtained. As previously mentioned, a straight-line relationship is expected for ideal Prestonian behavior. Comparing these plots for the subject pads (FIGS. 26a and 26b) to the commercially available pads (FIGS. 26c and 26d) one finds that the commercially available pads do not show the high degree of linearity in comparison to the subject pads. The major difference between the subject pads and the commercially available pads is that the subject pads are made in a fashion that controls the size, density, and shape of the pores via fabrication methods previously discussed.

Stribeck curves for two examples of customized pads in comparison with two commercially available pads are presented in FIGS. 27a-27d. As previously discussed, a constant relationship is obtained in the desired boundary lubrication regime. For the customized pads it can be seen from these graphs that highly uniform boundary lubrication behavior is obtained. In comparison, the commercially available pads (FIGS. 27c-27d), show deviation from the ideal boundary lubrication behavior. As noted above in the discussion of the data for the Prestonian plots, the major difference between the subject pads and the commercially available pads is that the subject pads are made in a fashion that controls the porosity of these pads

EXAMPLE 2

Figure 28:
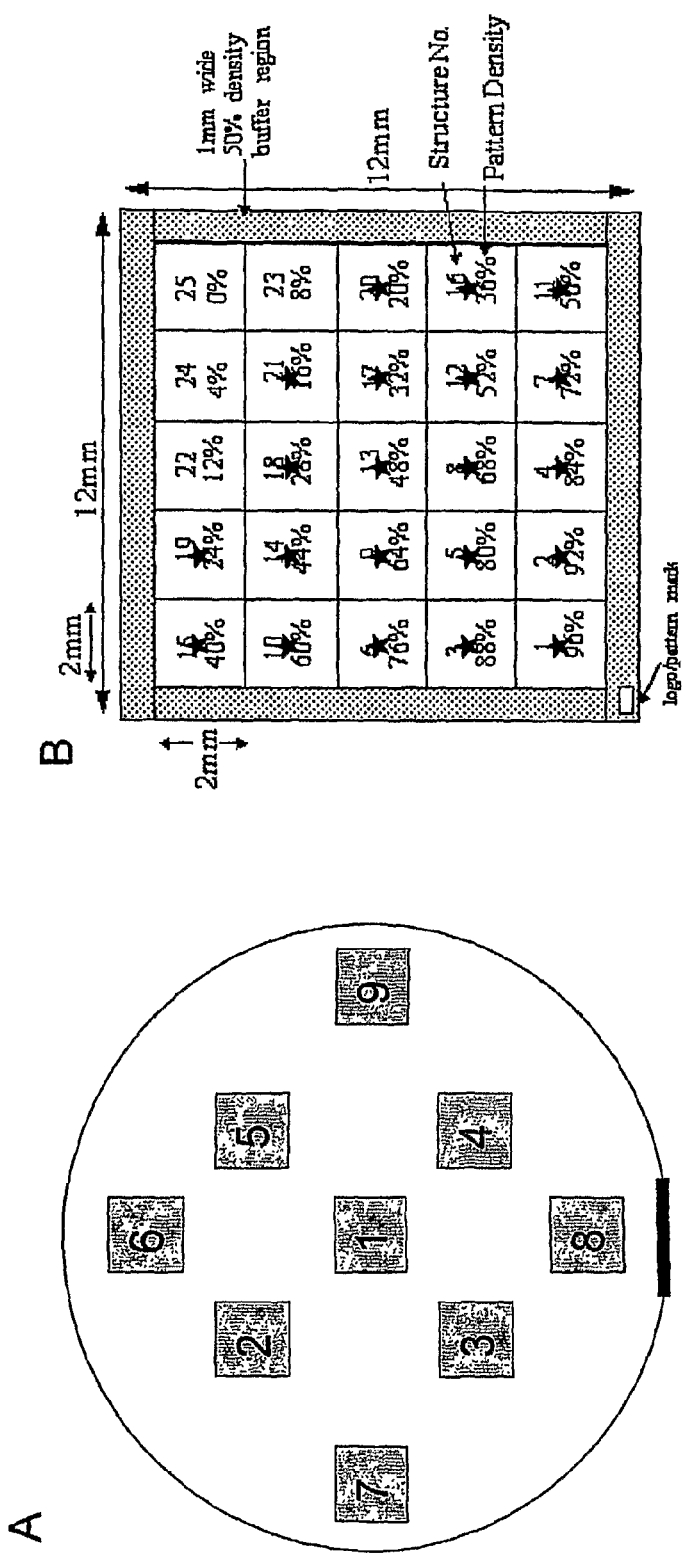
FIG. 28A-28B shows the die measurement plan where 9 dies are chosen per wafer measurement (28A) and depicts the structural elements within each of the individual dies (28B).
Figure 29:
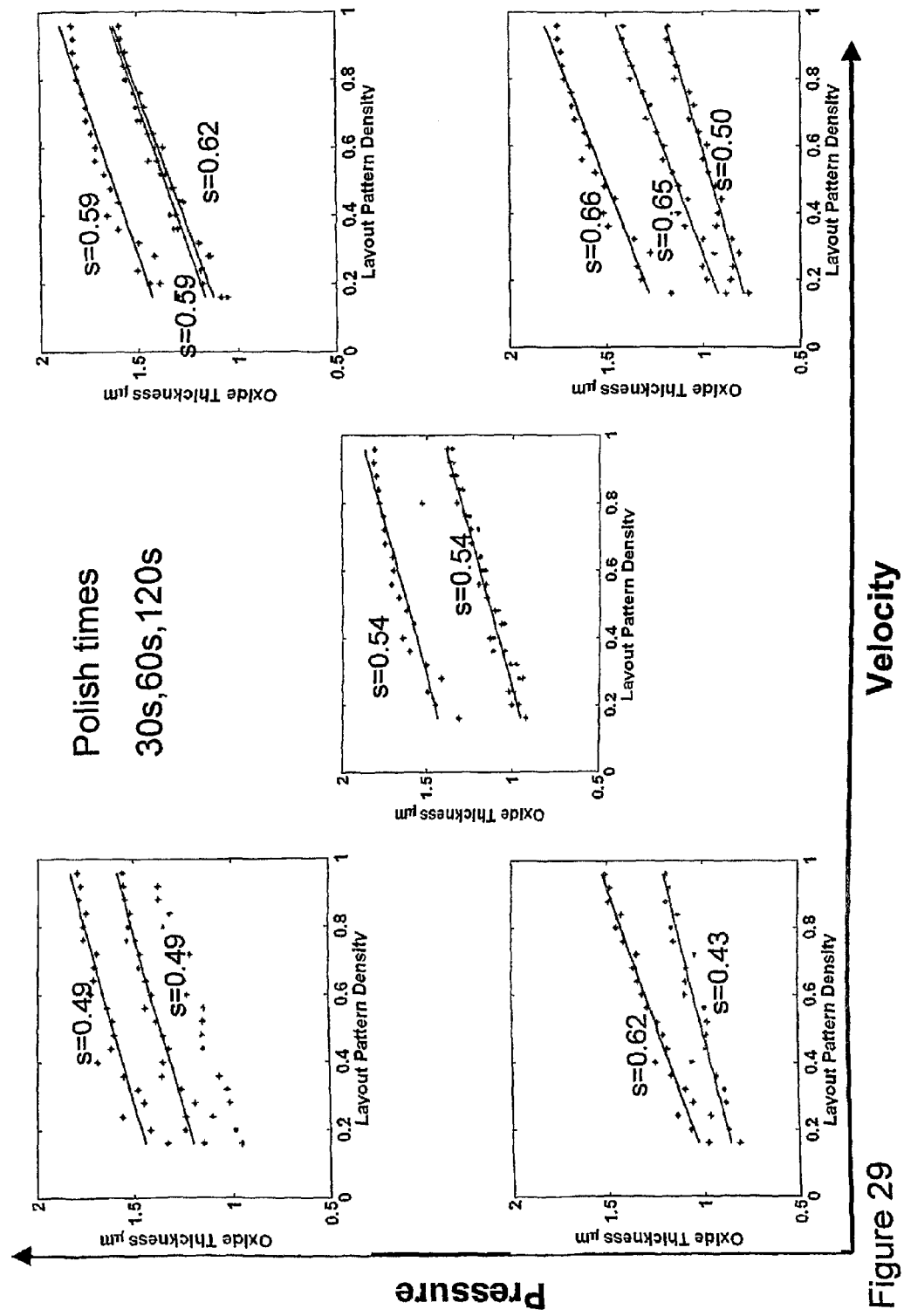
FIG. 29 compares the oxide thickness as a function of the layout pattern density within one dies for three polishing times (30 s, 60 s, and 120 s) for commercial pads, as a function of pressure and velocity.
Figure 30:
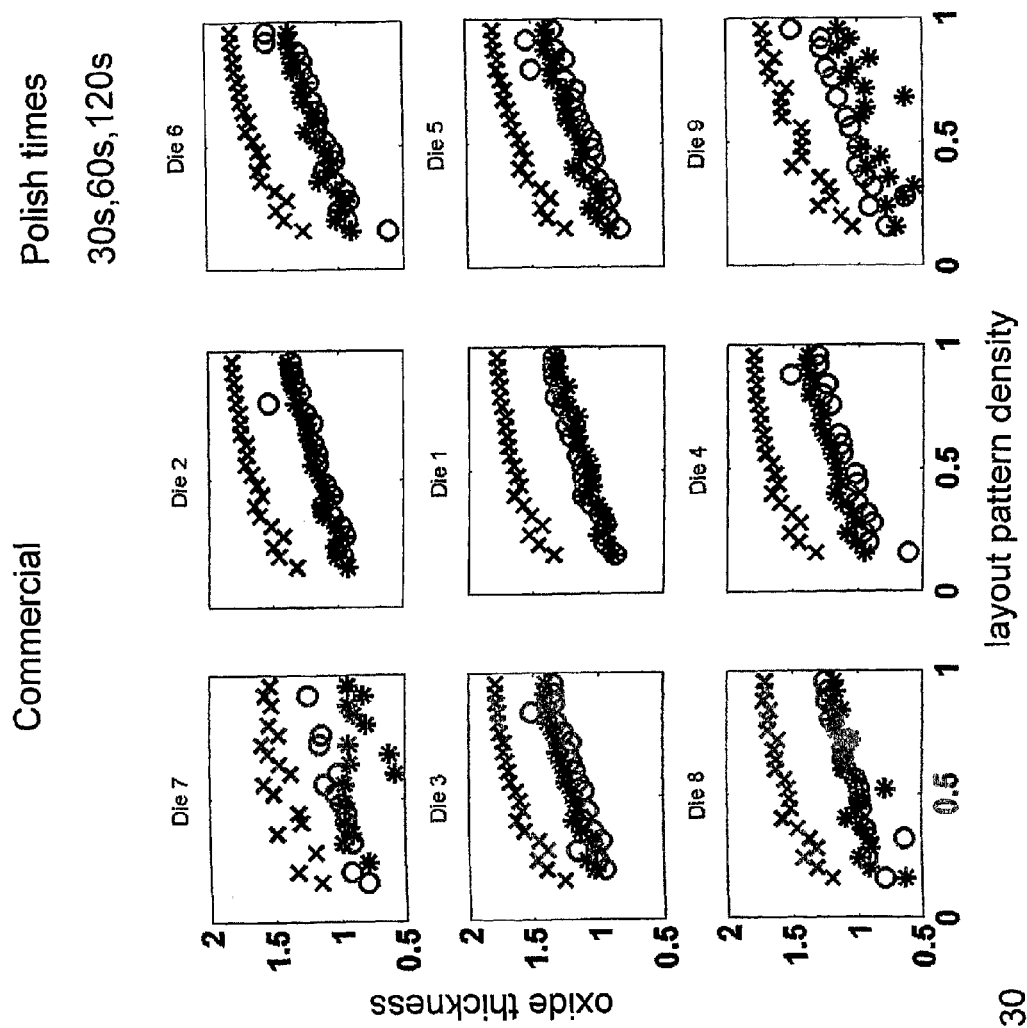
FIG. 30 compares the oxide thickness as a function of the layout pattern density within all 9 dies in FIG. 28A for three polishing times (30 s, 60 s, and 120 s), for commercial pads.
Figure 31:
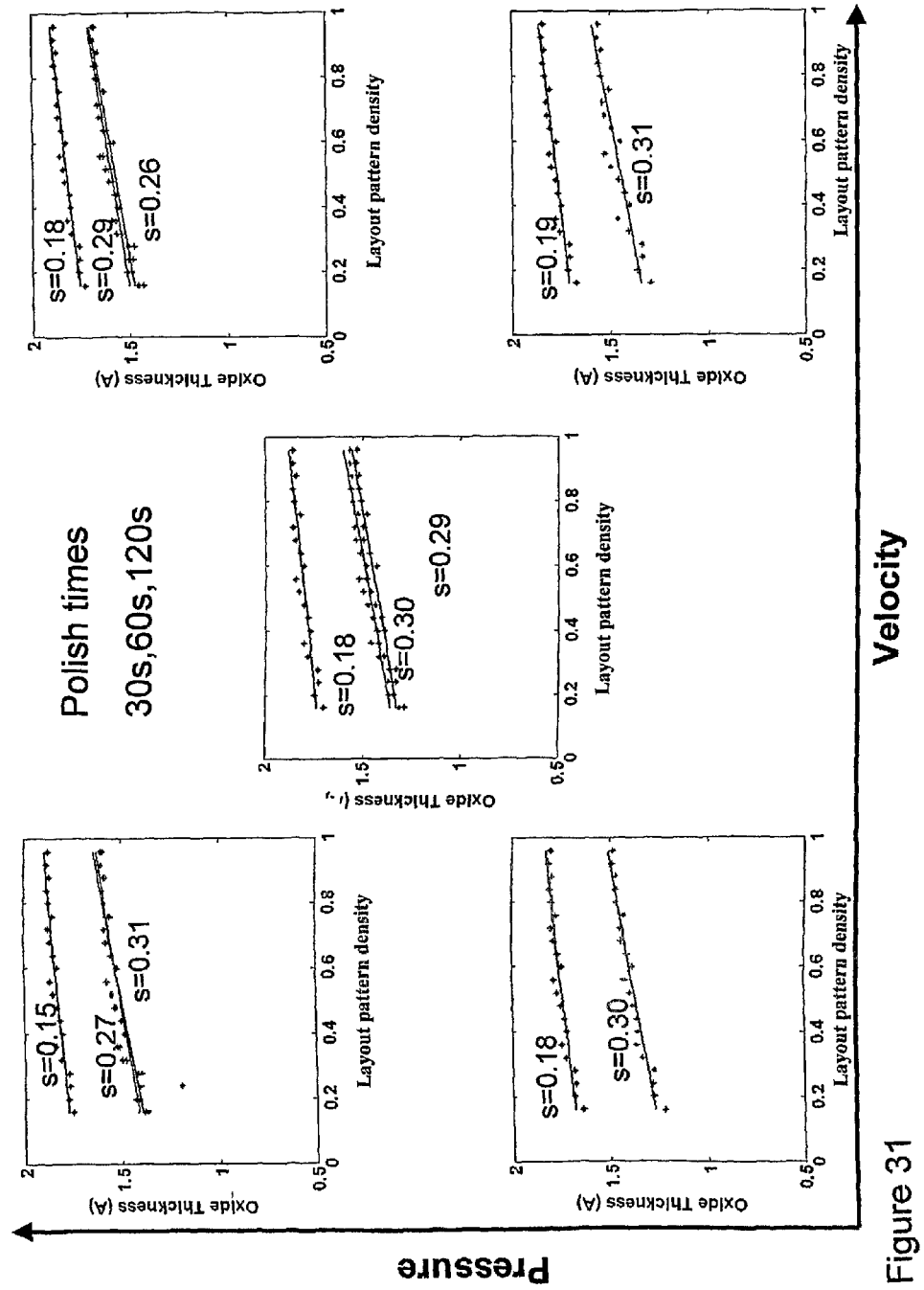
FIG. 31 compares the oxide thickness as a function of the layout pattern density within one dies for three polishing times (30 s, 60 s, and 120 s) for customized pads, as a function of pressure and velocity.
Figure 32:
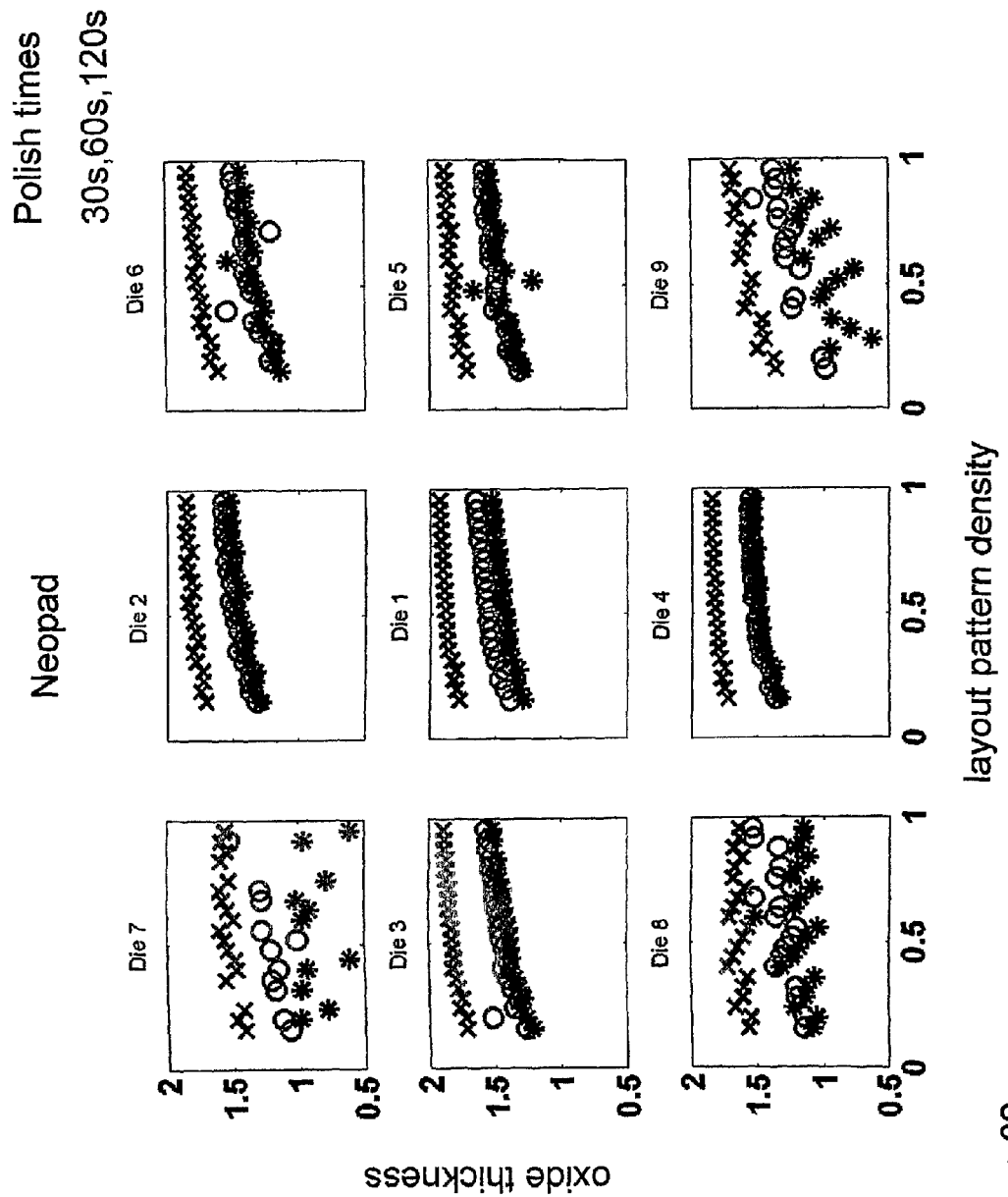
FIG. 32 compares the oxide thickness as a function of the layout pattern density within all 9 dies in FIG. 28A for three polishing times (30 s, 60 s, and 120 s), for customized pads.

Pads for polishing oxides are manufactured in a similar fashion as described in example 1. Further, the pads have been functionally graded to improve polishing performance. In FIGS. 28-32 planarization efficiency of Neopad's customized and planarization length comparisons are made using patterned wafers. FIG. 28A shows the die measurement plan where 9 dies are chosen per wafer measurement. FIG. 28 B depicts the structural elements within each of the individual dies. Results are shown in FIGS. 29 and 31, which compares the oxide thickness as a function of the layout pattern density within one dies for three polishing times (30 s, 60 s, and 120 s) for commercial and Neopad's customized pads respectively. The global axis in FIGS. 29 and 31 is for polishing done as a function of pressure and velocity. Die 2 is chosen since it is in the middle of the wafer and sees an effect both from the outer edge of the pad as well as the inner edge of the pad. The slope is approximately 0.5-0.6 for the commercial pads and is approximately 0.2-0.3 for Neopad's customized pads, indicating Neopad's pads have a larger planarization length. Comparing FIGS. 29 and 31 in which the oxide thickness as a function of the layout pattern density for the all the dies are compared, the planarization length for Neopad's customized graded pads, FIG. 32, is again much higher than for the commercial pads, FIG. 30, as reflected by a smaller slope of the line for Neopad's pads.

EXAMPLE 3

Three pads are fabricated for copper CMP. All three novel pads have a novel micro-structure, are radially graded, can be are sub surface engineered with boron nitride as the solid lubricant, and can be low shear integral pads. (The three novel pads are: 1) a surface engineered pad (novel pad A), 2) a low-shear pad (novel pad B) and 3) a low-shear surface-engineered pad (novel pad C).

Additionally, copper lines in wafers subjected to the performance testing were analyzed using x-ray diffraction (XRD) and compared to unprocessed wafers to monitor whether or not substantial changes in the copper had occurred, due to stress.

Figure 33:
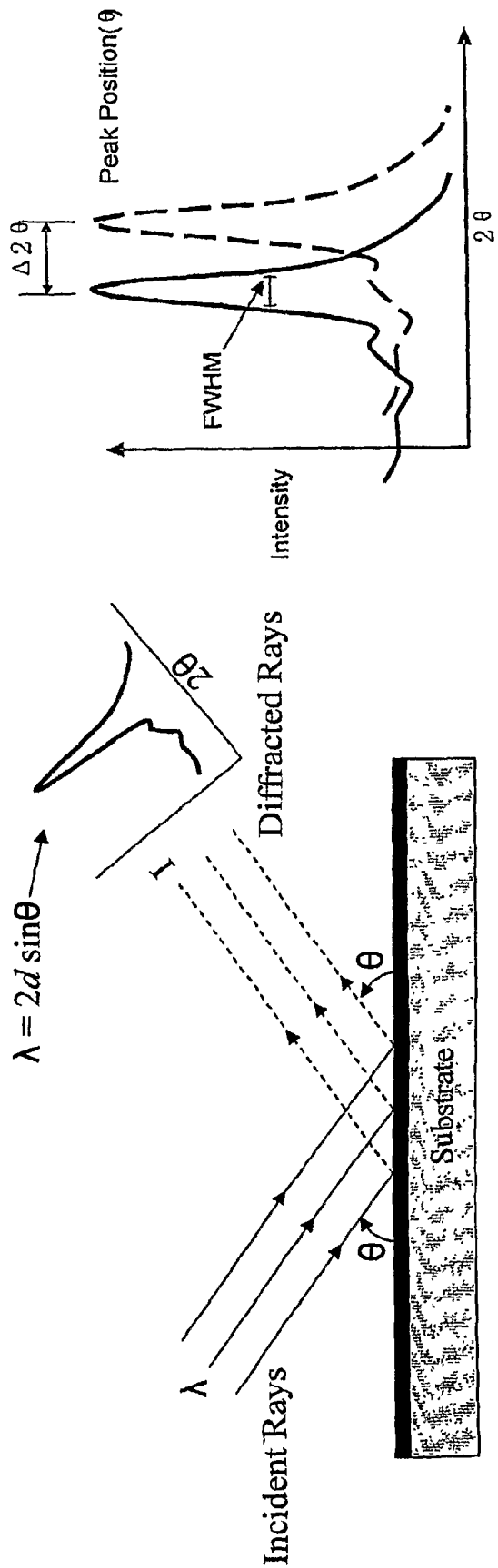
FIG. 33 depicts XRD data.

In FIG. 33 XRD data are displayed. Lattice constant measurements are carried out on wafers polished using each of the five experimental pads (commercial A and B) and novel pads (A, B, and C) and compared to measurements obtained from an unpolished wafer. The lattice constant of the unpolished copper films is 3.6086 Å. The measured lattice constant for wafers polished using the Fujimi slurry and Cabot slurry are presented alongside. The measurement error range for all XRD experiments is approximately ±0.0001 Å. To compare experimentation error, the error range for the unpolished film is labeled across the entire plot as a shaded rectangle.

For both slurries, the measured lattice constant values of the copper films polished using commercial pads are much higher in comparison to the measured lattice constant of the unpolished film. The shift direction indicates a tensile stress. The measured lattice constant values of films polished using the novel pads are lower than what is obtained in films polished using commercial pads. For films polished with novel pad A (surface-engineered) the measured value of the lattice constant is less than 3.6091 Å (both slurries). A similar result is obtained for films polished using novel pad B. For films polished using novel pad C (low-shear and surface engineered), the measured lattice constant (3.6086 Å), in the case Fujimi slurry is used, matches the lattice constant value for the unpolished films hence indicating stress free polishing. When Cabot Slurry is used with novel pad C, the measured value of the lattice constant for the polished films is 3.6090 Å. For Cabot slurry, comparing lattice constant results of films polished using novel pad C vis-à-vis novel pad A/novel pad B indicates that the effects surface engineering and use of low shear integral pads are not directly additive. Nonetheless, both these design techniques of making surface-engineered and low-shear pads can independently lower process induced stress in copper CMP. Further these techniques can possibly eliminate process induced stress when employed individually or in a synergistic fashion for design of pads In FIG. 34, the lattice constants generated from the XRD data are compared for the unprocessed wafer (BULK), and for wafers processed using the commercially available pads A and B, as well as for a low shear integral pad (Novel Pad A), a low shear integral pad in combination with a pads having solid lubricants (Novel Pad B), and a pad having solid lubricants and is not a low shear integral pad (Novel Pad C). The data is presented for both commercially available slurry A (fujimi) and commercially available slurry B (cabot). The lattice constant is a fundamental property that gives the average distance between atoms in crystalline arrangements. If a material is fundamentally altered at the atomic or molecular level, shifts in lattice constant can be detected. It is clear from the lattice constant data that the copper in the wafer processed with the subject customized pads is comparable to the copper in the unprocessed wafer, indicating no substantial changes in the copper in wafers processed with the subject customized subsurface engineered pad have occurred. In contrast, the wafers processed with the commercially available pads A and B do not compare favorably with the control wafer, indicating that material changes in copper in the wafers processed using the commercially available pads have occurred.

Figure 34:
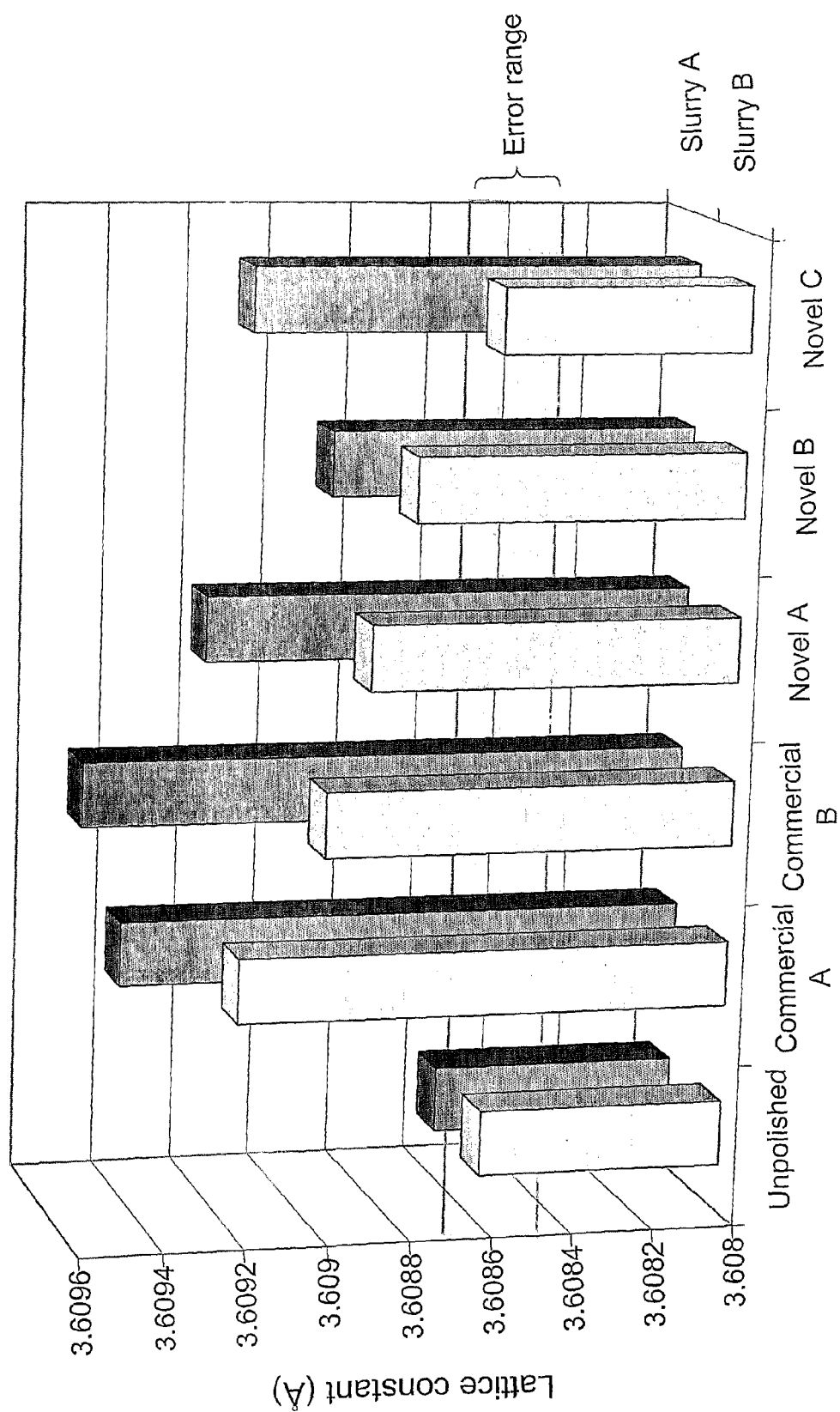
FIG. 34 compares the lattice constants generated from the XRD data are compared for the unprocessed wafer (BULK).
Figure 35:
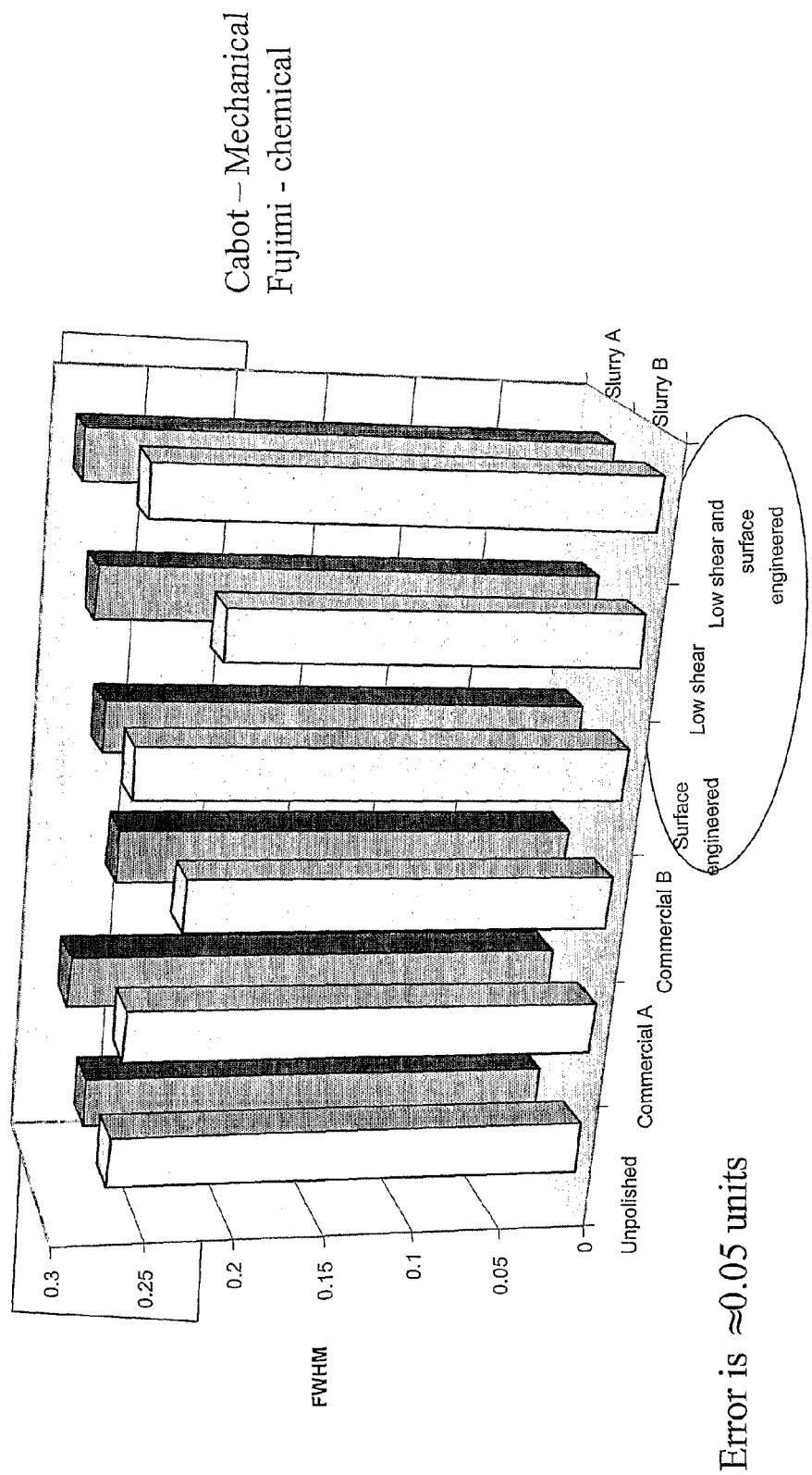
FIG. 35 compares the full width at half maximum height (FWHM) of the 222 peak is compared for the unprocessed wafer (BULK).

In FIG. 34, the full width at half maximum height (FWHM) of the 222 peak is compared for the unprocessed wafer (BULK), the wafers processed using commercially available pads A and B, as well as for Novel Pad A, Novel Pad B, and Novel Pad C. In FIG. 34, commercially available slurries A and B. It is known that if the polishing process induces non-uniform strain on copper, the peak either narrows or broadens, and so FWHM is an indication of whether or not copper has undergone non-uniform strain during the polishing process. It can be seen in FIG. 34 that both the low shear customized pad in combination with solid lubricants (Novel Pad B), a and a pad having solid lubricants and is not a low shear integral pad (Novel Pad C) compare very favorable, regardless of the type of slurry with respect to alleviating non-uniform strain in copper.

Figure 36:
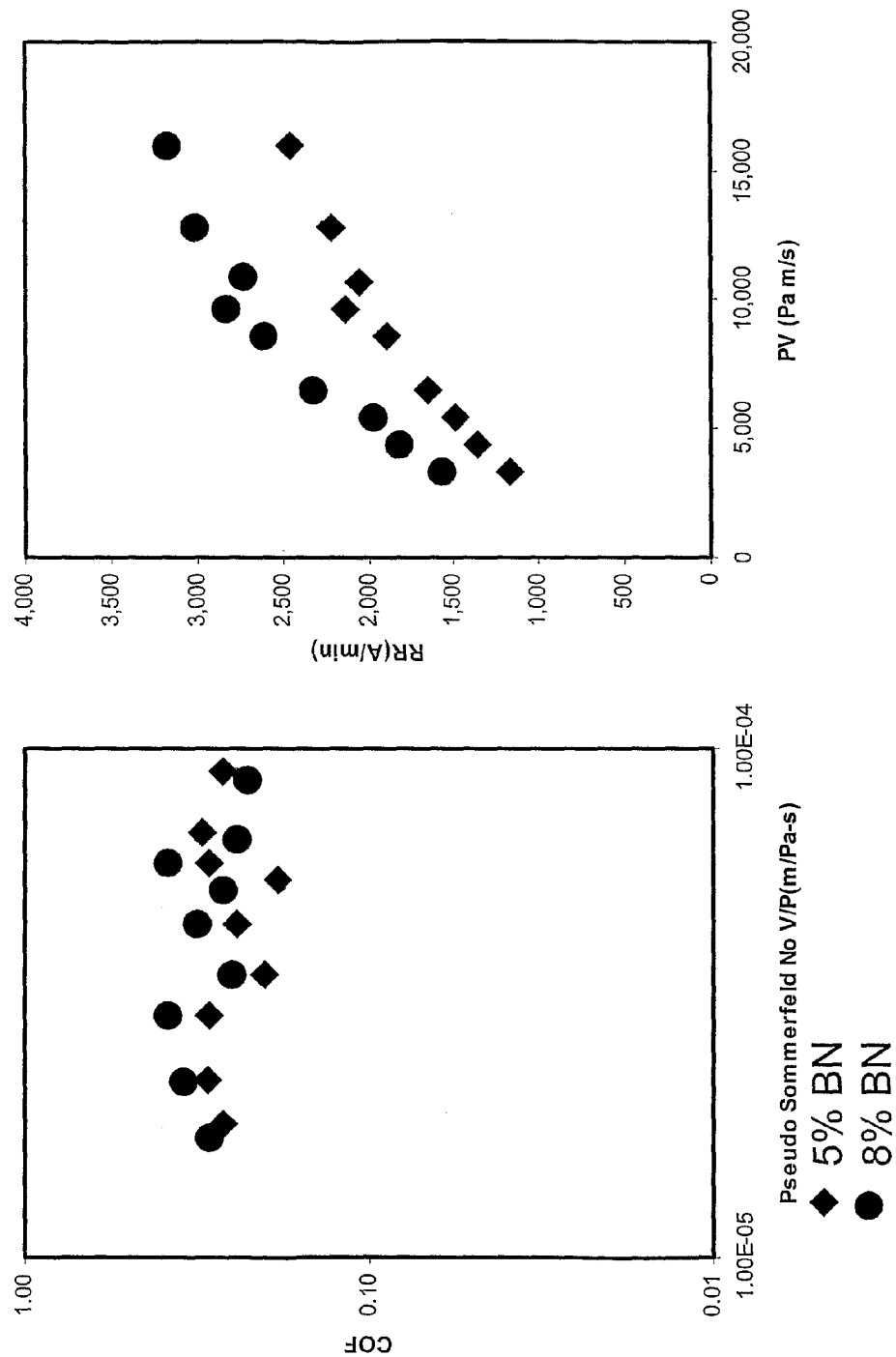
FIG. 36 depicts the Stribeck curve data, and the Prestonian plot for two subject pads used for copper CMP having solid lubricants and are not a low shear integral pads.

In FIG. 36, the Stribeck curve data, and the Prestonian plot are compared for two subject pads used for copper CMP having solid lubricants and are not a low shear integral pads. The difference between the two subject pads is the amount of boron nitride. For the first pad, 5 wt % boron nitride has been included in the pad, and in the second pad, 8 wt % boron nitride has been included in the pad. In the Stribeck curve, it is clear that both pads are operating in the boundary lubrication regime, and appear to be equivalent in that representation. However, in the Prestonian plot, the RR for the pad having 8% of solid lubricant is significantly greater than for the pad having 5% solid lubricant. This clearly demonstrates how the addition of a solid lubricant in the subsurface of the pad can increase the removal rate while maintaining a low coefficient of friction. Taken with the XRD data, which supports that no significant damage has occurred to the copper structures in the wafer, this demonstrates the desirable features of the subject pads described herein. These features include a pad performing with low shear, and high removal rates, allowing for efficient processing of Cu CMP, without the undesirable stress-induced damage to the copper structures in the wafer.

Figure 37:
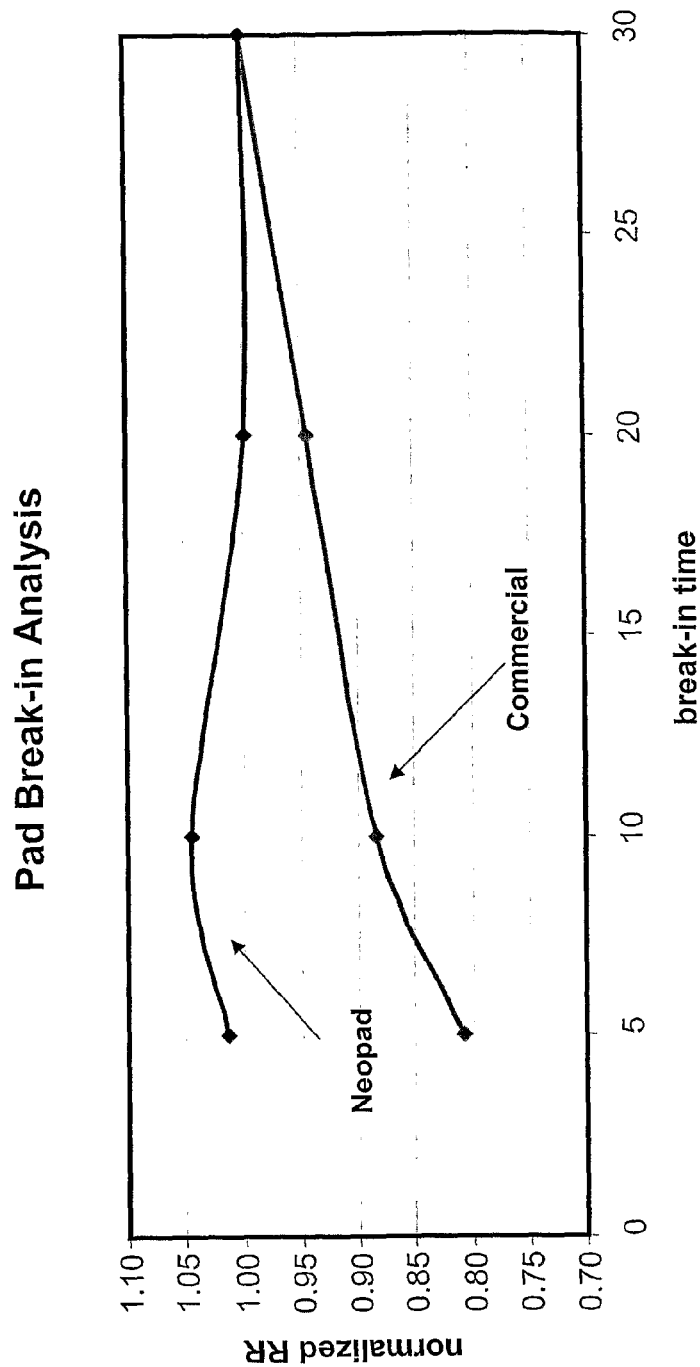
FIG. 37 depicts pad break in analysis for a Neopad and commercial pad.

In FIG. 37, a quantitative analysis of pad break-in is presented which compares commercial pad A vis-à-vis novel pad C. The normalized removal rate is monitored as a function of time. It takes commercial pad A about 30 minutes to achieve steady state. In comparison, novel pad C achieves steady state in significantly lesser time, about 10-15 minutes. This result is directly attributed to the pad microstructure. It is believed that the uniform and numerous hard segments allow the formation of consistent size micro-reservoirs. These micro-reservoirs are created in a relatively short time span and are able to provide a continuous supply of slurry once they are formed.

Figure 38:
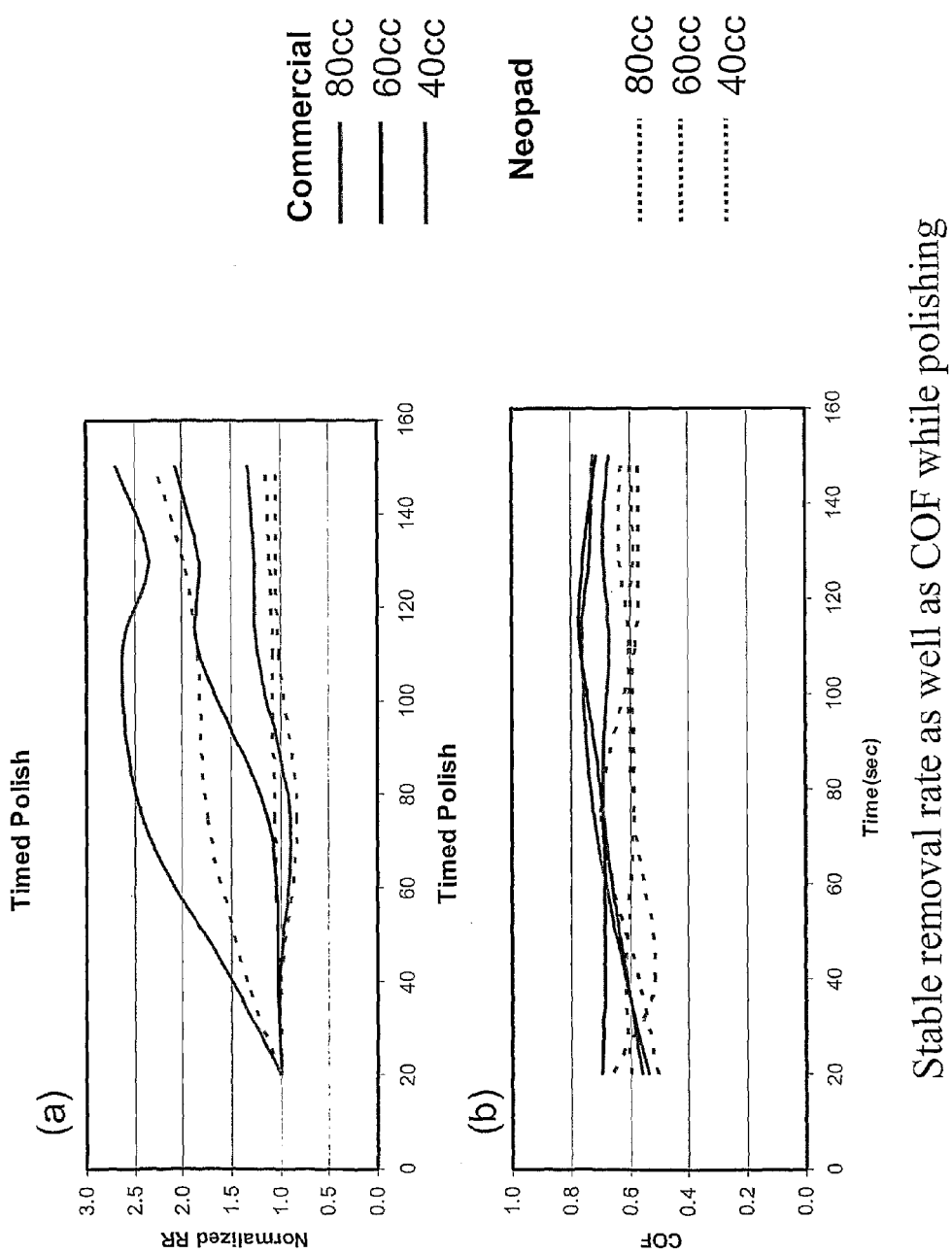
FIG. 38 depicts temporal process stability analyses for commercial pad A and novel pad C.

Temporal process stability analyses are performed on commercial pad A and novel pad C for three slurry flow rates: 40 cc/minute, 60 cc/minute and 80 cc/minute (Cabot slurry). The parameters studied are removal rate (FIG. 38($a$)) and COF (FIG. 38($b$)) in a single wafer run of 150 seconds. The removal rate of commercial pad A exhibits a significant variation with time. Specifically, the variation is over a factor of 2.5 at the lowest slurry flow rate (40 cc/minute). Novel pad C exhibits significantly smaller variation in removal rate. Although the variation is about a factor of 2 for a slurry flow of 40 cc/minute, for the higher slurry flow rates the variation in removal rate is minimal. The COF measurements (FIG. 38($b$)) indicate that commercial pad A exhibits a much higher variation in COF (0.5-0.8) as opposed to the COF values obtained from the novel pad C (0.5-0.65). The consistent frictional characteristics and the uniform removal rates for novel pad C are characteristic of a pad having subsurface engineered solid lubricants.

Figure 39:
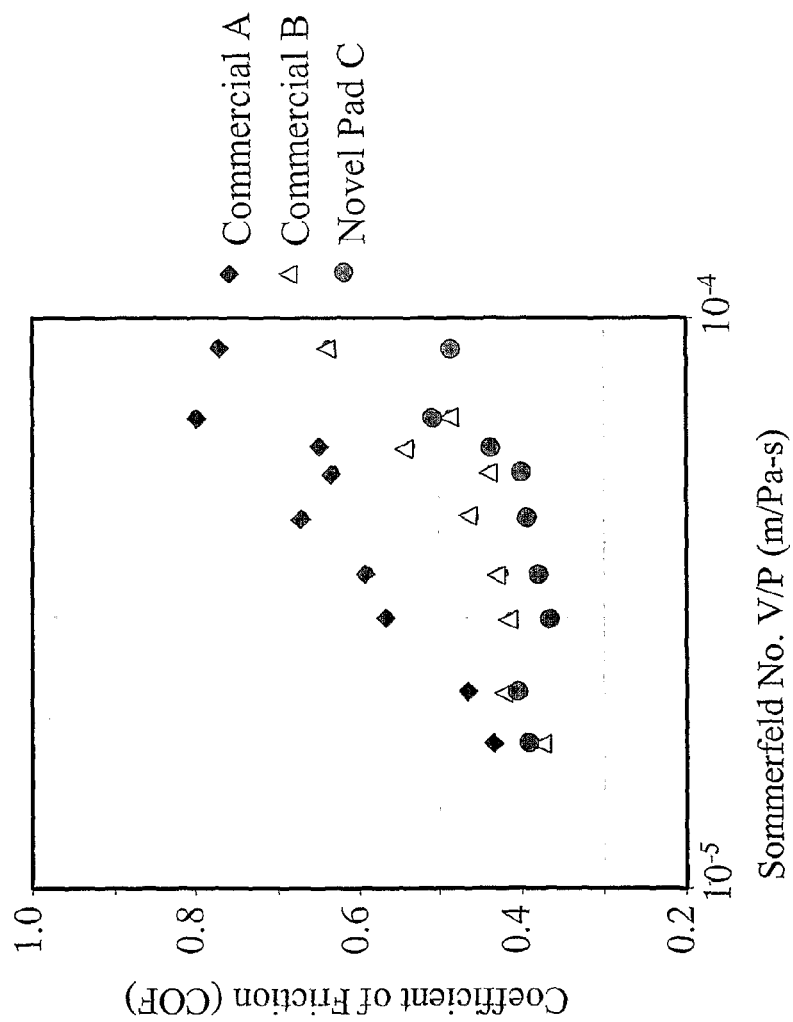
FIG. 39 depicts Stribeck curves for two commercially available pads and novel pad C.

In FIG. 39, the Stribeck curves are shown for two commercially available pads A and B, and novel pad C. For novel pad C uniform lubricating behavior is observed, indicating operation in the desired boundary lubrication regime. In comparison, the Stribeck curves for the two commercially available pads A and B do not show a linear trend expected for performance in the desired boundary lubrication regime The major difference between the subject customized pad used for generating the data shown in FIG. 38 and the commercially available pads is the difference in the uniformity of pore sizes, and the addition of a solid lubricant in the subsurface region of the pads. The combination of the pad properties, and the solid lubricant provides a smaller and more uniform COF, which provides a desirable result, as shown in the Stribeck curves.

Figure 40:
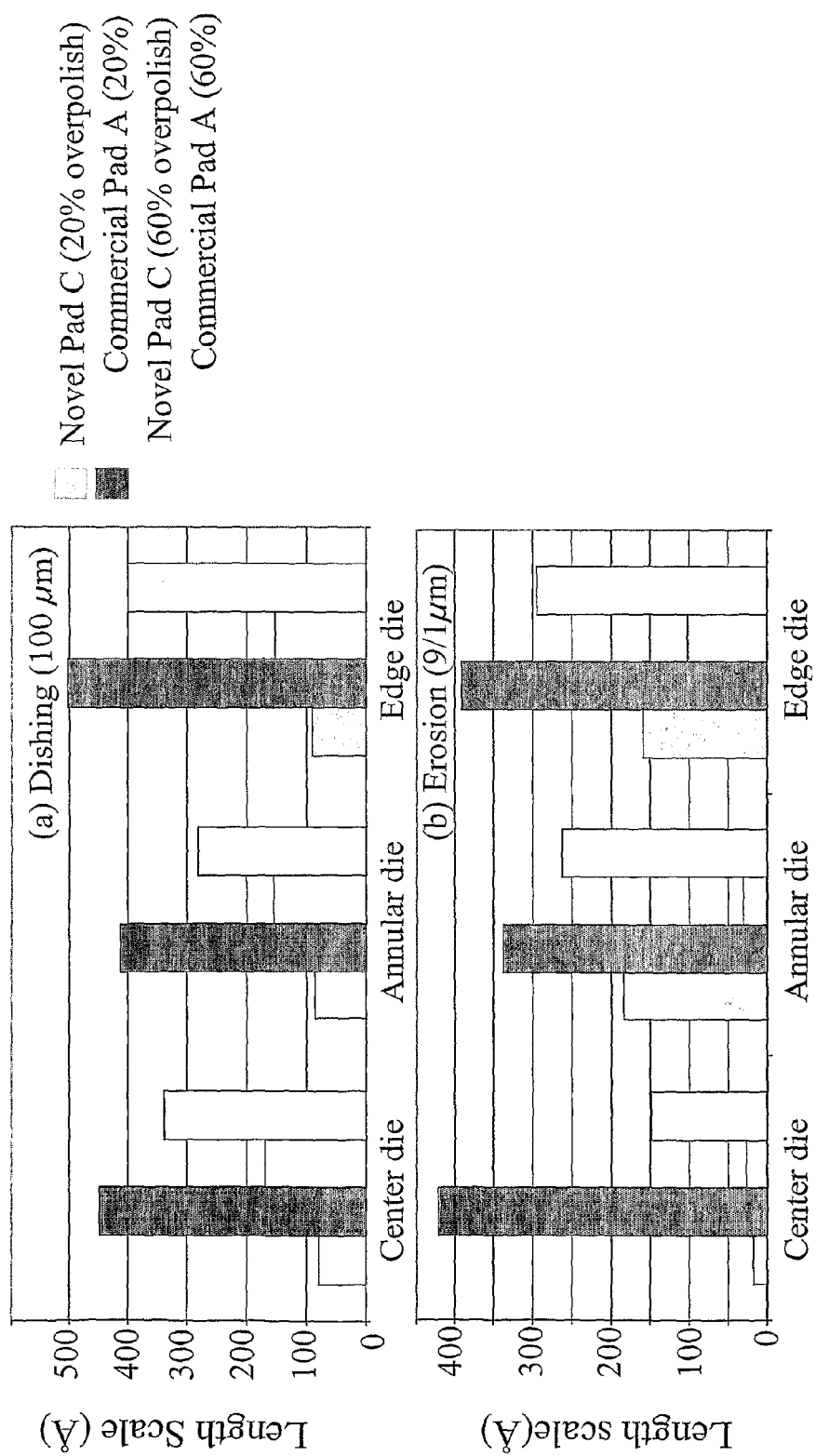
FIG. 40a-40b depicts copper dishing (40a) and copper erosion (40b) results.

In FIG. 40, bulk copper polishing results on 854 mask patterned copper wafers are presented for commercial pad A and novel pad C using commercial slurry (JSR slurry). Within die uniformity is studied through quantitative characterization of dishing and erosion. To understand global effects measurements are performed for a center die, an annular die and an edge die. In FIG. 39($a$), copper dishing results are presented for a 100 μm line structure of the maskset. Two sets of measurements are made: wafer at 20% overpolish and another wafer at 60% overpolish. The dishing numbers for the 20% overpolish wafer obtained using commercial pad C are in excess of 400 Å for all three dies. In contrast, results obtained using novel pad A show significantly lower dishing numbers (<100 Å) on all dies for the 20% overpolish wafer indicating superior within die uniformity. Superior dishing performance for novel pads is directly attributed to the pad micro-structure. Furthermore, comparing dishing numbers for the three dies of the 20% overpolish wafer polished using novel pad C, it is observed that the die to die variation is rather insignificant (~10 Å). The improved center-edge performance is a consequence of the radial symmetric functional grading of the pad in which the outer ring of the pad is softer then the inner portion. Similar comparative results are obtained for dishing numbers on wafers with 60% overpolish. In FIG. 40(*b*) erosion results are presented for a 9/1 μm feature within the maskset. For commercial pad A, erosion numbers (20% overpolish wafer) obtained are significantly higher (300-500 Å) compared to the erosion numbers for novel pad C (<150 Å). Erosion numbers show similar comparative trends for the 60% overpolish wafer as well.

In Table 13, comparative trends for several critical planarization parameters including dishing, erosion, and planarization efficiency indicate that the novel pad C performs superior to the commercial pad A. In addition to studying the bulk polishing, barrier layer polishing parameters are obtained for novel pad C are compared to commercial pad C. Commercial pad C is the industry standard for tantalum barrier layer polishing. Results indicate that novel pad C performs far superior to commercial pad C for all the critical planarization parameters. These results indicate that the novel pad can be used for both bulk polishing as well as barrier layer polishing and hence single pad functionality is achievable.

TABLE 13

Data summary (1) Novel pad C and commercial pad A for bulk copper polishing (platform P1). (2) Novel pad C and commercial pad C (Politex) for barrier layer polishing (platform P3).

| Metric | Novel pad C | Commercial pad A | Metric | Novel pad C | Commercial pad C |
|---|---|---|---|---|---|
| P1 RR | ~5,500 | ~6,000 | P3 Cu RR | 0 | ~100 |
| P1 WIWNU | 2.5% | ~5% | P3 Ta RR | 350 | ~500 |
| P1 DCO Post | ~110 | ~1,100 | P3 TEOS RR | 365 | ~700 |
| P1 DWO Post | ~100 | ~1,000 | P3 DCO Post | 698 | 5,411 |
| P1 DNO Post | ~35 | ~600 | P3 DWO Post | 502 | 5,347 |
| Planarization Efficiency | 87% | 80% | P3 DNO Post | 266 | 3,016 |
| 100 μm dishing | ~270 | ~500 | 100 μm dishing* | 137 | ~250 |
| 10 μm dishing | ~75 | ~250 | 10 μm dishing* | 44 | ~250 |
| 90% erosion | ~25 | ~275 | 90% erosion* | 108 | ~300 |

*post barrier

Further, A quantitative measure of the accumulated stress ($\sigma_{acc}$) within the film can be obtained using the following equation:

$$\sigma_{acc} = E/(1-v)\in \quad (4)$$

where
E=modulus of elasticity
v=Poisson's ratio
∈=lattice strain

In Equation 4, the lattice strain is calculated as a unit change in lattice constant based on a reference value. In the present calculations, the unpolished film lattice constant serves as the reference. Using Equation 4 to calculate the accumulated stress ($\sigma_{acc}$), with modulus of elasticity (E=120 MPa) and Poisson's ratio (v=0.34) for copper, a range from about 25 MPa to about 50 MPa is obtained. For films polished using novel pads, the accumulated stress is significantly lower with the lowest value achieved for a film polished using a low-shear surface engineered pad ($\sigma_{acc}$<~2 MPa). Further, the magnitude of the accumulated stress as measured for commercial pads ($\sigma_{acc}$>25 MPa) is high and can affect mechanical integrity as well as electrical properties of copper films.

The DMA properties of pads used for copper CMP are shown in table 14. Neopad's customized pads have both a larger loss and storage modulus at 20° C. and 40° C., a much lower change in the storage modulus between 40° C. and 20° C., a lower glass transition temperature and greater wettability, as determined by the contact angle.

TABLE 14

Copper CMP DMA properties

| Pad | Storage Modulus (20 C.) | Storage Modulus (40 C.) | Decay in Storage Modulus | Glass Transition Temperature | Contact Angle |
|---|---|---|---|---|---|
| Neopad | 666 MPa | 540 MPa | 19% | −32.5° C. | 80° |
| IC1010 | 296 MPa | 210 MPa | 30% | −18.5° C. | 85° |
| JSR | 875 MPa | 127 MPa | 86% | 25.0° C. | N/A |

EXAMPLE 4

Figure 41A:
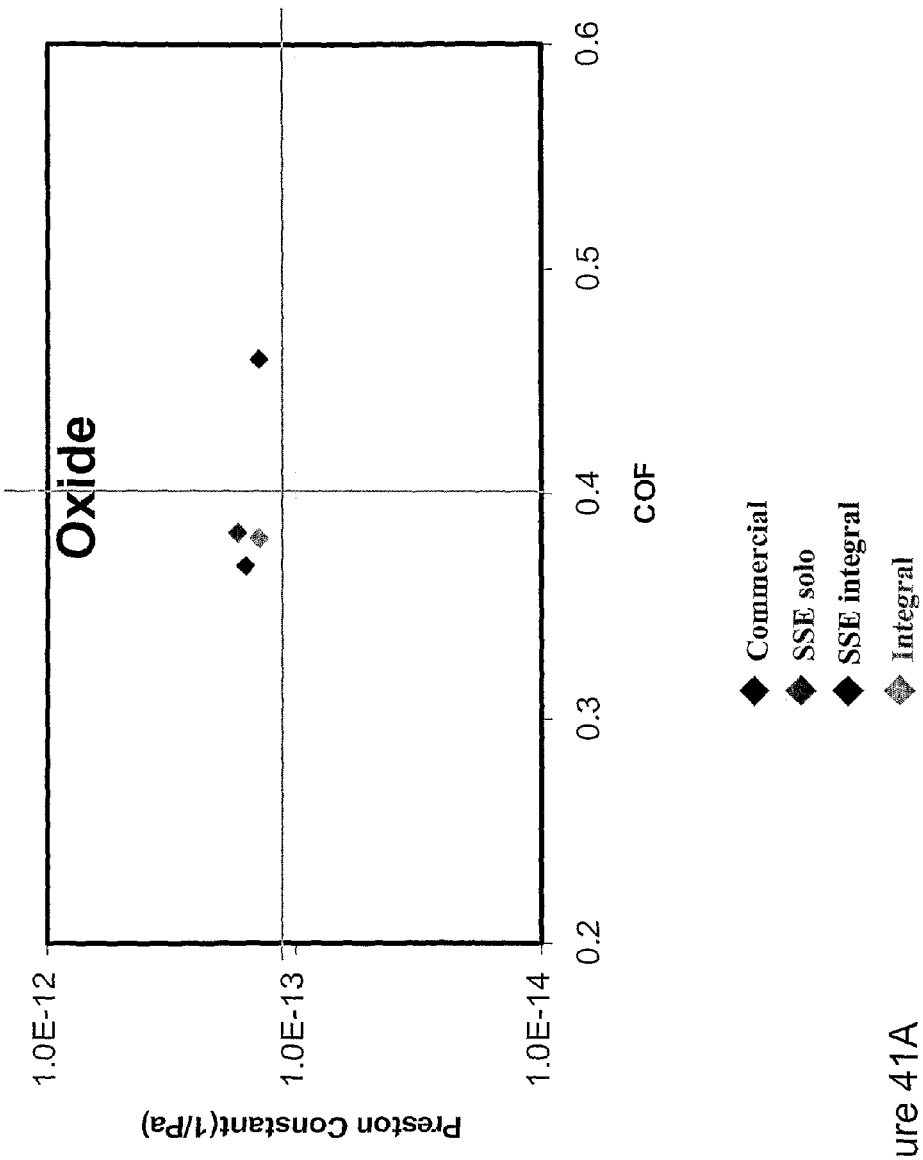
FIGS. 41a-41c compare polishing performance of a commercial one layer pad with a sub-surface engineered pad, a subsurface engineered and low shear integral pad, and a low shear integral pad for polishing oxide (41a), for polishing nitride (41b), and for selectively removing nitride and oxide (41c).
Figure 41B:
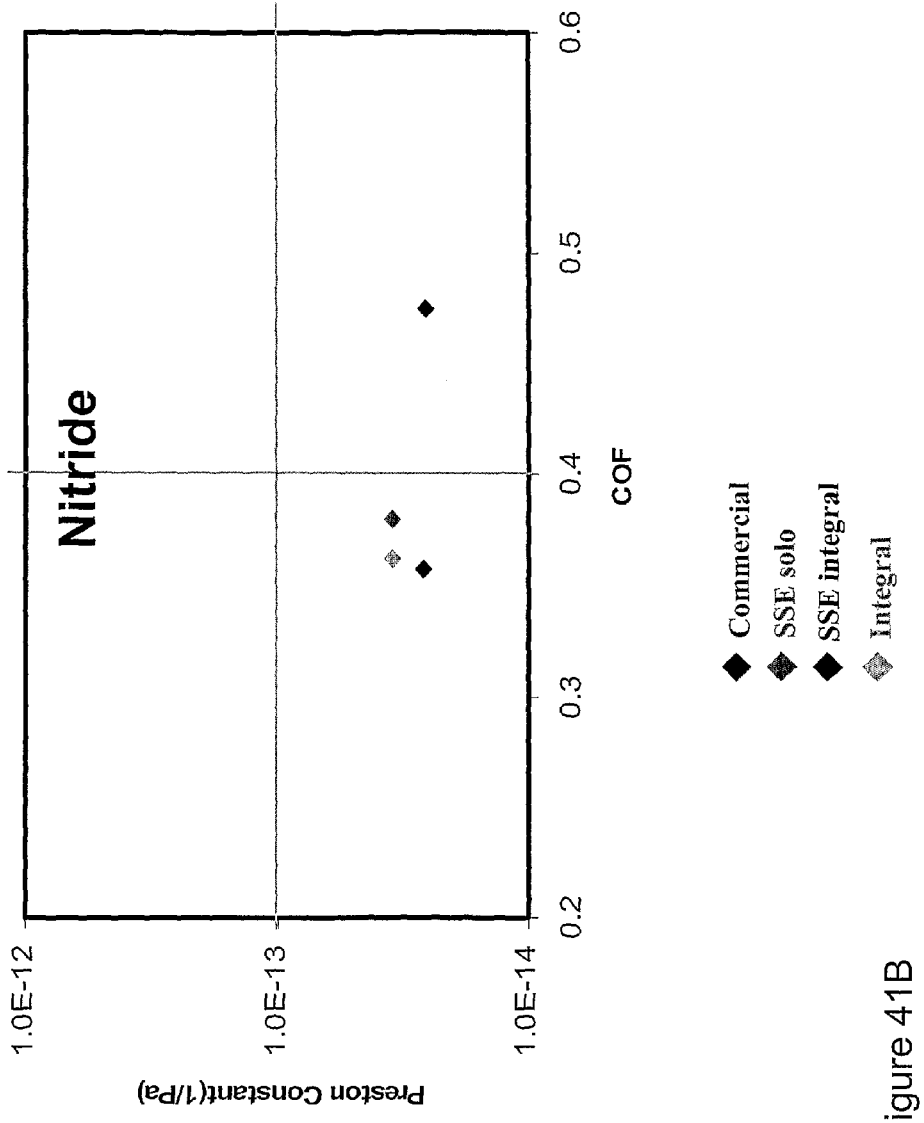
Figure 41C:
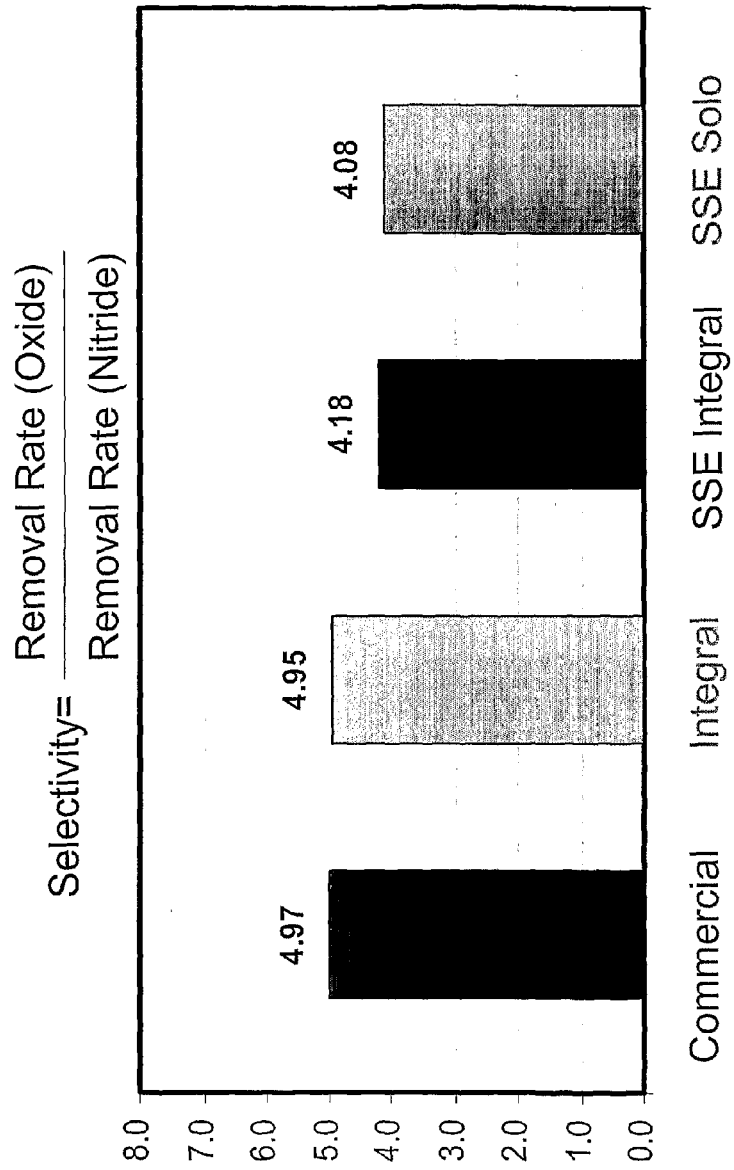

A subsurface engineered pad having solid lubricants and is not a low shear integral pad, a two layer integral pad, and subsurface engineered having solid lubricants in combination with a two layer integral pad used for STI polishing is compared to a commercially available single layer pad. Both two layer integral pads have one interface acting as a stress sink. Two commercially available slurries, slurry A (FIGS. 41 *a-c*) and slurry B (FIGS. 42 *a-c*), were used in the comparisons. These results are compared for STI polishing steps shown in FIGS. 40*a* and 40*b*, and FIGS. 41*a* and 41*b*, which show the comparison for the Preston constant, as an indicator of RRs vs. the COF. The comparison is done for both oxide (41*a* and 42*a*) and nitride (41*b* and 42*b*), and the selectivity is compared for the two pads (FIGS. 41*c* and 42*c*).

In FIG. 40A, using slurry A, it is shown that the COF for the three customized pads is close to half that of the conventional pad whereas the removal rate is maintained at about the same level for oxide polishing. Similarly in FIG. 42*b*, which shows the results for nitride processing, the COF of the customized pads is about 33% less than that of the single layer pad whereas the removal rate is approximately the same for each pad. FIG. 41*c* demonstrates that the selectivity of the customized pad is comparable to the conventional pad.

Figure 42A:
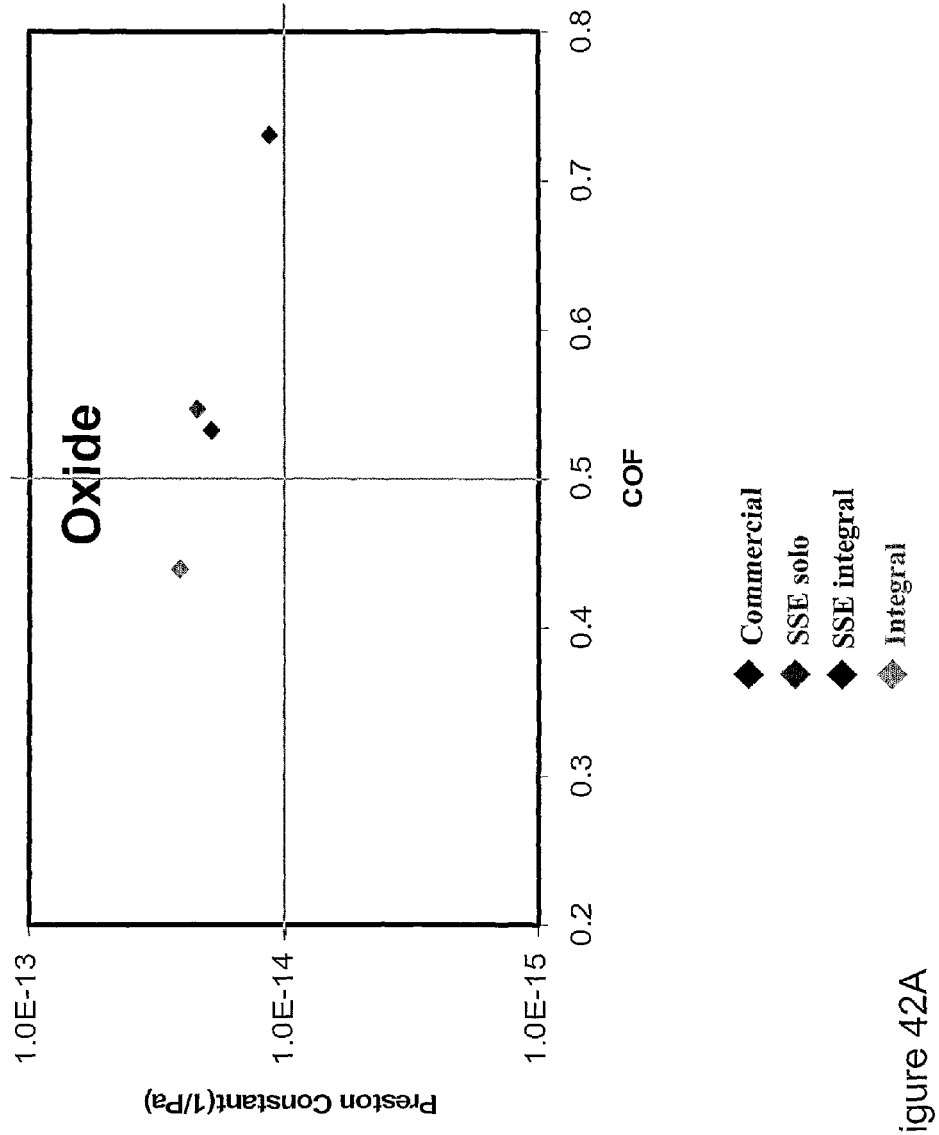
FIGS. 42a-42c compare polishing performance of a commercial one layer pad with a sub-surface engineered pad, a subsurface engineered and low shear integral pad, and a low shear integral pad for polishing oxide (42a), for polishing nitride (42b), and for selectively removing nitride and oxide (42c).
Figure 42B:
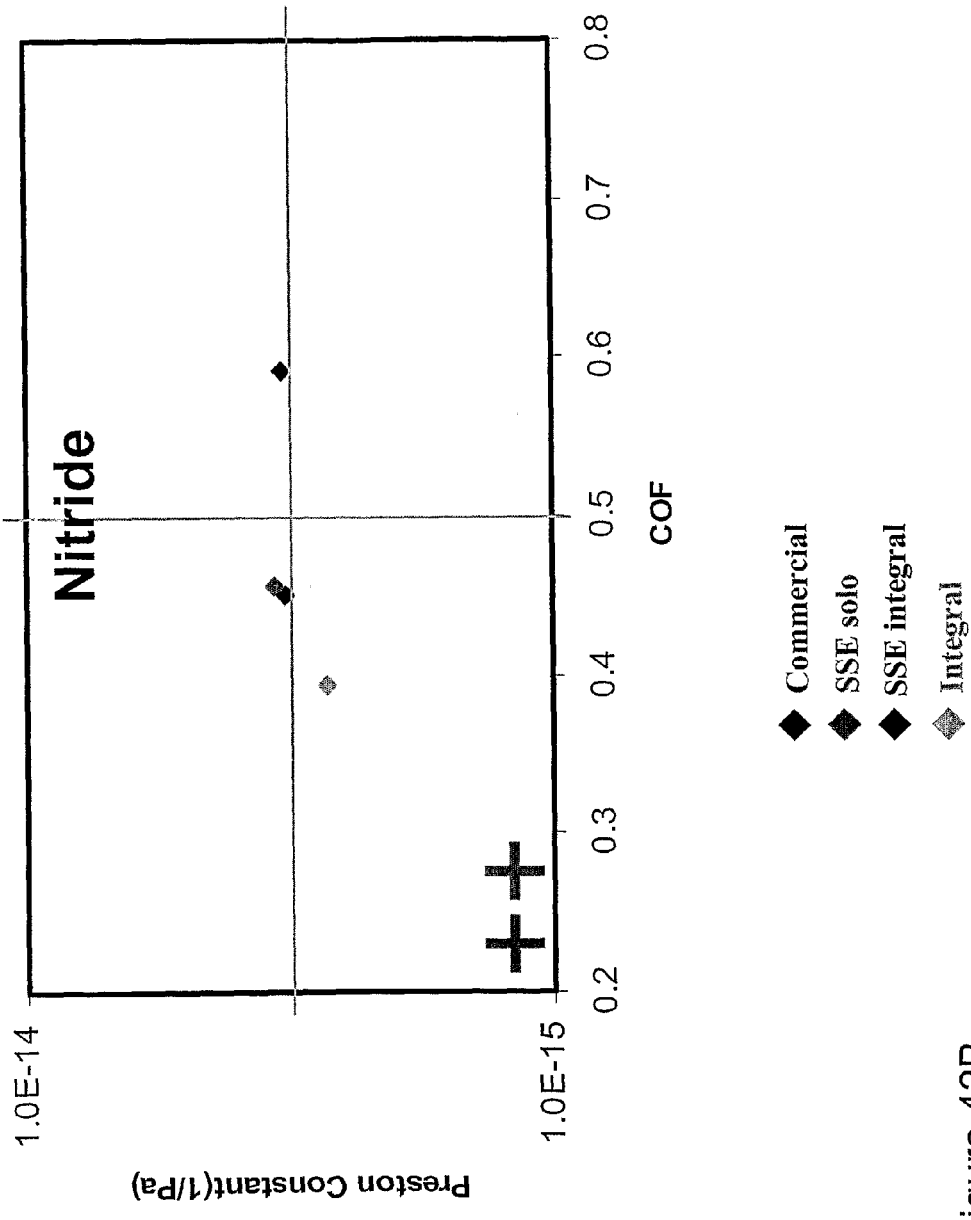
Figure 42C:
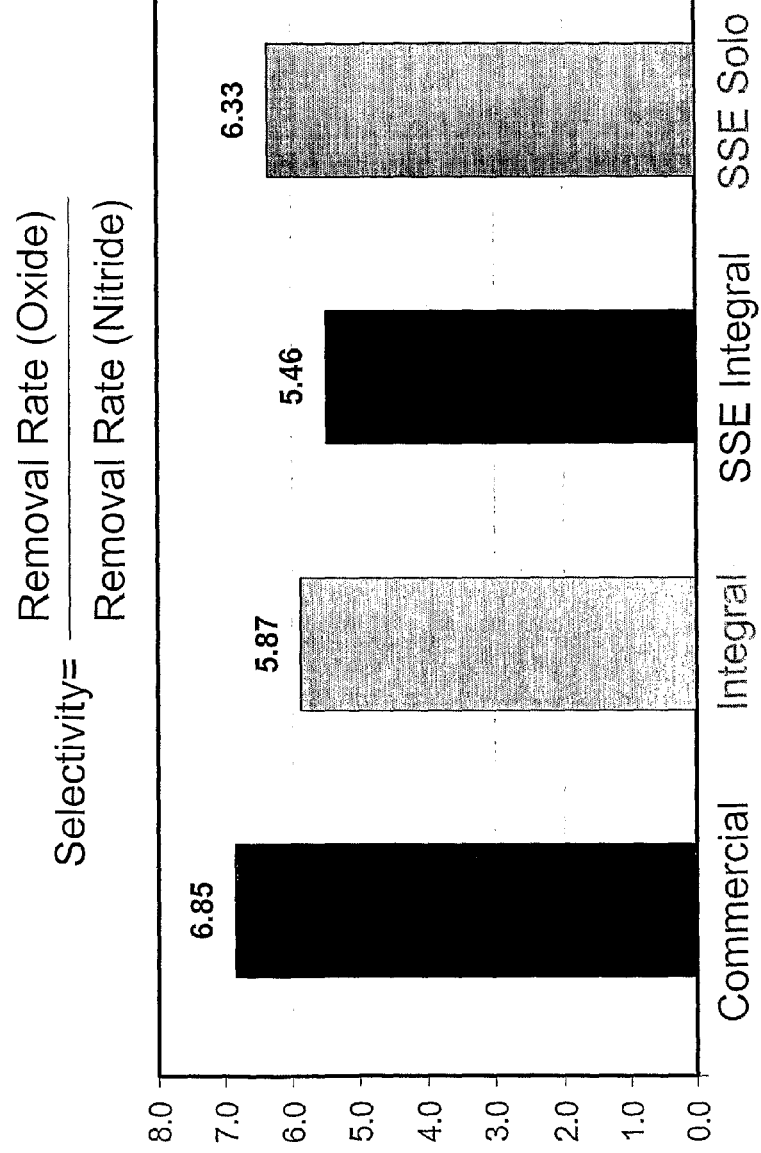

Similarly, in FIGS. 42a and 42b, using slurry B, it is shown that the COF for the polishing of both the oxide and the nitride using the customized pads is about 20% less than that of the conventional pad whereas the RR is comparable. FIG. 42c demonstrates that the selectivity of the customized pads is comparable to the conventional pad.

These results demonstrate that examples of the subject integral pad that were fabricated and tested having at least one interface acting as a stress sink reduced the COF, while maintaining desired RRs.

Disclosed above are various features that may be combined into the following examples of various devices and methods, which examples of course supplement the disclosure and do not limit the scope of the invention:

1. An article comprising a unitary polishing pad for polishing a substrate, said pad comprising a polymer having a property that differs at first and second regions within the pad, said pad providing increased planarity or yield for said substrate when compared to a comparative unitary pad under identical operating conditions that is uniform in regions corresponding to said different regions for said unitary polishing pad but is otherwise identical to said unitary polishing pad.

2. An article according to paragraph 1 wherein said property is porosity.

3. An article according to paragraph 2 wherein said polymer has a second property that differs in third and fourth regions and said second property is hardness.

4. An article according to paragraph 3 wherein said first and third regions are the same region, and said second and fourth regions are the same region.

5. An article according to paragraph 1 wherein said property is hardness.

6. An article according to paragraph 5 wherein said pad has a circular profile and an axis of rotation, wherein the first region has a circular profile about the axis of rotation, wherein the second region has a ring profile and adjoins the first region, and wherein the first region has a hardness greater than a hardness of the second region.

7. An article according to paragraph 6 wherein a difference in the hardness of the first region and the second region is at least about 5 Shore D.

8. An article according to paragraph 7 wherein said difference is at least about 10 Shore D.

9. An article according to paragraph 6 wherein the circular profile of said pad has an area measure, and said first region occupies at least about 75% of said area measure of the circular profile of said pad.

10. An article according to paragraph 9 wherein said second region and an interface between said first and second regions occupy said remaining area measure of the circular profile of the pad.

11. An article according to paragraph 5 wherein said polymer has a second property that differs in third and fourth regions, and said second property is continuity of said polymer.

12. An article according to paragraph 11 wherein said third region includes an interface within said unitary polishing pad and said fourth region is located away from said interface.

13. An article according to paragraph 12 containing a solid lubricant in a polishing surface of said pad.

14. An article according to paragraph 13 wherein the solid lubricant has a coefficient of friction between about 0.0001 and about 0.5.

15. An article according to paragraph 13 wherein said pad contains greater than about 5% by weight of said solid lubricant.

16. An article according to paragraph 1 wherein said first and second regions are located within said unitary polishing pad.

17. An article according to paragraph 16 wherein said first and second regions are additionally located at a polishing surface of said unitary polishing pad.

18. An article according to paragraph 17 wherein said property is porosity.

19. An article according to paragraph 18 wherein said polymer has a second property that differs in third and fourth regions and said second property is hardness.

20. An article according to paragraph 17 wherein said property is hardness.

21. An article according to paragraph 1 wherein said first and second regions are located at a polishing surface of said unitary polishing pad.

22. An article according to paragraph 21 wherein said property is hardness.

23. An article according to paragraph 22 wherein the unitary polishing pad said first region is near a rotational axis of said unitary polishing pad and said second region is near an outer edge of said pad, and where the hardness of said second region is less than the hardness of said first region.

24. An article according to paragraph 1 wherein said property is compressibility.

25. An article according to paragraph 1 wherein said property is coefficient of restitution.

26. An article comprising a polishing pad having a first nonuniform property along a radius normal to a rotational axis of the pad, wherein said polishing pad provides improved planarization for a semiconductor wafer due to a difference in values of said first nonuniform property along the radius.

27. An article according to paragraph 26 wherein the difference in values is determined by a device density on said substrate.

28. An article according to paragraph 27 wherein the difference in values is additionally determined by a size of technology nodes on said substrate.

29. An article according to paragraph 26 wherein the difference in values is determined by a size of technology nodes on said substrate.

30. An article according to paragraph 26 wherein the property is hardness.

31. An article according to paragraph 30 wherein a second property of porosity differs along a second radius that is different from or the same as the first radius.

32. An article according to paragraph 26 wherein the property is porosity.

33. An article according to any of the paragraphs above containing a solid lubricant in a polishing surface of said pad.

34. An article according to any of the paragraphs above wherein said property is not transparency.

35. An article according to paragraph 34 wherein said pad additionally has an area that is less opaque than an adjoining area.

36. An article according to any paragraph above wherein the property is pore density.

37. An article according to any paragraph above wherein the property is pore size.

38. An article according to any paragraph above wherein the property is selected based on the material to be polished.

39. An article according to paragraph 38 wherein the material comprises copper.

40. An article according to any paragraph above wherein the property is selected based on a slurry used in conjunction with the article.

41. An article according to any paragraph above wherein the property is selected based on polishing equipment used in conjunction with the article.

42. An article according to any paragraph above wherein said substrate is a semiconductor wafer and said pad comprises a chemical mechanical planarization pad.

43. A method of planarizing a layer of a semiconductor wafer having patterned features that cause high areas and lower areas in said layer, said method comprising contacting the layer with a polishing pad having a porosity, hardness, compressibility, and/or coefficient of restitution that varies along one or more radii from a rotational axis of the pad, and planarizing the layer of the semiconductor wafer by removing the layer in the high areas at a rate that is faster than a rate at which the polishing pad removes the layer in the lower areas.

44. A method of planarizing a layer of a semiconductor wafer having patterned features that cause high areas and lower areas in said layer, said method comprising contacting the layer with an article according to any of paragraphs 1-37 and planarizing the layer.

45. A polymeric polishing pad formed of a synthetic polymer and having an integral interface between a first polymeric layer and a second polymeric layer of the pad.

46. A pad according to paragraph 45 wherein the first polymeric layer and the second polymeric layer are the same polymer.

47. A pad according to paragraph 46 wherein the first polymeric layer has a first porosity, the second polymeric layer has a second porosity, and the first porosity and the second porosity are not identical.

48. A pad according to paragraph 46 wherein the first polymeric layer has a first porosity, the second polymeric layer has a second porosity, and the first porosity and the second porosity are identical.

49. A pad according to any of paragraphs 45-48 wherein the first polymeric layer and the second polymeric layer are formed of the same reactants but are reacted under different conditions to provide different polymers in the first and second polymeric layers.

50. A pad according to any of paragraphs 45-49 wherein the pad additionally comprises a solid lubricant.

51. A pad according to any of paragraphs 45-50 wherein the pad is a unitary pad.

52. A pad according to any of paragraphs 45-51 wherein said interface is effective to reduce a coefficient of friction of said pad as compared to a comparative pad otherwise identical to said polymeric polishing pad but lacking said interface.

53. A polymeric chemical mechanical planarization pad comprising a polyurethane thermoset and having a tan delta less than about 1.0.

54. A pad according to paragraph 53 wherein the tan delta is less than about 0.5.

55. A pad according to paragraph 53 or paragraph 54 wherein the pad has a value of E' greater than about 400 Mpa.

56. A pad according to any of paragraphs 53-55 wherein the pad has a value of E" greater than about 250 Mpa.

57. A pad according to any of paragraphs 53-56 wherein the polyurethane has a value of Tg less than about −30° C.

58. A pad according to any of paragraphs 53-57 wherein the polyurethane additionally has urea linkages.

59. A pad according to any of paragraphs 53-58 wherein the pad has a $\Delta E'$ (20° C.-40° C.) of less than about 20%.

60. A pad according to any of paragraphs 53-59 wherein the pad has a compressibility of less than about 1%.

61. A pad according to any of paragraphs 53-60 wherein the pad has a surface tension of less than about 25 mN/m.

62. A pad according to any of paragraphs 53-61 wherein the pad has a value of KEL less than about 100.

63. A polymeric chemical mechanical planarization pad comprising a polyurethane thermoset and having a value of E' greater than about 400 Mpa.

64. A polymeric chemical mechanical planarization pad comprising a polyurethane thermoset and having a value of E" greater than about 250 Mpa.

65. A polymeric chemical mechanical planarization pad comprising a polyurethane thermoset and having a value of Tg less than about −30° C.

66. A polymeric chemical mechanical planarization pad comprising a polyurethane thermoset and having a compressibility of less than about 1%.

67. A polymeric chemical mechanical planarization pad comprising a polyurethane thermoset and having a surface tension of less than about 25 mN/m.

68. A polymeric chemical mechanical planarization pad comprising a polyurethane thermoset and having a value of KEL less than about 100.

69. A pad according to any of paragraphs 53-68 wherein said pad contains an interface.

70. A pad according to paragraph 69 wherein said interface is an integral interface.

71. A pad according to any of paragraphs 53-70 wherein said pad contains a solid lubricant in a polishing surface of said pad.

72. A pad according to any of paragraphs 53-71 wherein said pad has an area on a polishing surface of said pad that has a property that differs in value from a value of the same property in a different area of said polishing surface.

73. A pad according to any of paragraphs 53-72 wherein said pad contains an area that is more transmissive to light than an adjacent area.

74. An article comprising a unitary chemical mechanical polishing pad formed of a thermosetting polymer, wherein said pad contains hard polymeric domains and soft polymeric domains in a polishing surface of said pad, wherein said polymer contains hard segments and soft segments, the hard segments forming the hard polymeric domains and the soft segments forming said soft polymeric domains upon curing, and wherein said polymer comprises poly(urethaneurea).

75. An article according to paragraph 74 wherein said hard domains have a size of less than about 20 nm.

76. An article according to paragraph 74 or paragraph 75 wherein said soft domains have a size of less than about 100 nm.

77. An article according to any of paragraphs 74-76 wherein said soft domains have a size greater than 10 nm.

78. An article according to any of paragraphs 74-77 wherein said soft domains are larger than said hard domains.

79. An article according to any of paragraphs 74-78 wherein said hard domains have a total of between one and about twenty urethane and urea groups.

80. An article according to paragraph 79 wherein said hard domains have a total of between two and about six urethane and urea groups.

81. An article according to any of paragraphs 74-80 wherein said pad is a unitary chemical mechanical polishing pad formed by placing a polymer melt or mixture of reactants that form a polymer or both in a mold having dimensions suitable to form said unitary chemical mechanical polishing pad.

82. An article according to any of paragraphs 74-81 wherein said pad has first and second polymeric regions on the polishing surface of the pad, the first and second regions including both said hard and said soft domains, and wherein said first region has a property having a value different from a value for said property in said second region.

83. An article according to paragraph 82 wherein said property is one selected from hardness, porosity, pore size, compressibility, coefficient of restitution, and continuity.

84. An article according to any of paragraphs 74-83 wherein said pad contains an integral interface.

85. An article according to any of paragraphs 74-84 wherein said pad contains a solid lubricant.

86. An article according to any of paragraphs 74-85 wherein said pad contains an abrasive.

87. A method of making a chemical mechanical polishing pad comprising forming a polymer melt or mixture of reactants that form a polymer, placing said melt or mixture into said mold, and curing said melt or mixture to form said chemical mechanical polishing pad having hard polymeric domains and soft polymeric domains.

88. A polishing pad formed of a porous closed-cell polymer and having a polishing surface of said pad in which a majority of the pores are elongated in a direction parallel to the polishing surface of said pad.

89. A polishing pad according to paragraph 88 wherein cells of said closed-cell porous polymer are elongated in a direction parallel to the polishing surface of the pad.

90. A polishing pad according to paragraph 88 or paragraph 89 wherein cells of said closed-cell porous polymer are formed of microballoons.

91. A polishing pad according to any of paragraphs 88-90 wherein said elongated pores have a length to width ratio greater than about 2.

92. A method of making a polishing pad having a closed-cell porous polymer comprising incorporating microballoons into a polymer melt or mixture of reactants that form a polymer, and compression molding said melt or mixture using a pressure sufficient to compress said microballoons.

93. An article comprising a chemical mechanical polishing pad formed of a thermosetting polymer, wherein said pad contains hard polymeric domains and soft polymeric domains in a polishing surface of said pad, wherein said polymer contains hard segments and soft segments, the hard segments forming the hard polymeric domains and the soft segments forming said soft polymeric domains upon curing, and wherein said polymer comprises poly(urethaneurea) containing repeating alkoxy units.

94. An article according to paragraph 93 wherein said hard domains have a width of less than about 100 nm in any direction.

95. An article according to paragraph 94 wherein said hard domains have a width of less than about 20 nm.

96. An article according to any of paragraphs 93-95 wherein said soft domains are larger than about 100 nm.

97. An article according to any of paragraphs 93-96 wherein said hard domains have a total of between one and about twenty urethane and urea groups.

98. An article according to paragraph 97 wherein said hard domains have a total of between two and about six urethane and urea groups.

99. An article according to any of paragraphs 93-98 wherein said pad is a unitary chemical mechanical polishing pad formed by placing a polymer melt or mixture of reactants that form a polymer or both in a mold having dimensions suitable to form said unitary chemical mechanical polishing pad.

100. An article according to any of paragraphs 93-99 wherein said pad has first and second polymeric regions on the polishing surface of the pad, the first and second regions including both said hard and said soft domains, and wherein said first region has a property having a value different from a value for said property in said second region.

101. An article according to paragraph 100 wherein said property is one selected from hardness, porosity, pore size, compressibility, coefficient of restitution, and continuity.

102. An article according to any of paragraphs 93-101 wherein said pad contains an integral interface.

103. An article according to any of paragraphs 93-102 wherein said pad contains a solid lubricant.

104. An article according to any of paragraphs 93-103 wherein said pad contains an abrasive.

105. An article according to paragraph 1 wherein the unitary polishing pad said first region is near a rotational axis of said unitary polishing pad and said second region is near an outer edge of said pad.

106. An article according to paragraph 105 containing a solid lubricant in the polishing surface.

107. An article according to paragraph 106 wherein the solid lubricant is Boron Nitride.

108. An article according to paragraph 105 containing a local transparent region in the polishing pad which is configured for endpoint detection.

109. An article according to paragraph 105 having in situ grooves on the polishing surface.

110. An article according to paragraph 109 wherein the grooves have a depth in the range of 10 µm-100 µm.

111. An article according to paragraph 109 wherein the grooves have a depth in the range of 25 µm-40 µm.

112. An article according to paragraph 109 wherein the grooves have a width in the range of 10 µm-100 µm.

113. An article according to paragraph 109 wherein the grooves have a width in the range of 25 µm-40 µm.

114. An article according to paragraph 109 wherein the grooves near the rotational axis are concentric circular grooves and overlapping linear grooves which extend radially wherein the grooves which are linear near the rotational axis, away from the rotational axis and near the outer edge of the polishing pad, are curved, wherein the curved grooves intersect the concentric circular grooves.

115. An article according to paragraph 114 containing additional curved grooves away from the rotational axis near the periphery of the polishing surface.

116. An article according to paragraphs 114 or 115 wherein the grooves are configured to have a constant groove density across the polishing surface.

117. An article according to paragraphs 114 or 115 wherein the grooves are configured to maintain a constant slurry density across the polishing surface.

118. An article according to paragraph 105 wherein the pad contains micropores through out the polishing pad.

119. An article according to paragraph 118 where in the density of micropores is different in the first region than second region.

120. An article according to paragraph 105 wherein the hardness of said second region is less than the hardness of said first region.

121. An article according to paragraph 105 wherein the pad contains an integral interface normal to the polishing surface wherein the interface is between two polymeric layers.

122. An article according to paragraph 121 where the first polymeric layer and the second polymeric layer are the same polymer.

123. An article according to paragraph 121 where the first polymeric layer and the second polymeric layer are different polymers.

124. The article according to paragraph 105 wherein the polymer is formed from thermoset materials.

Any of the above combinations may of course have any of the physical, chemical, and/or DMA properties discussed above.

Although exemplary variations of customized polishing pads have been described, various modifications of the subject pads described can be made without departing from the scope or spirit of what is disclosed herein. Disclosure of various customized polishing pads herein should not be construed to be limited by the specific examples and drawings described above. Moreover, one of skill in the art would realize a variety equivalent customized polishing pads that can be taken from such examples and drawings there from.

What is claimed is:

1. An article comprising a unitary polishing pad for polishing a substrate, said pad comprising a first region of a polishing surface composed of a first polymer and a second region of the polishing surface composed of a second polymer, the first polymer and the second polymer having a hardness that differs in Shore D, wherein a boundary of the first and second regions comprises a mixture of the first and second polymers.

2. An article according to claim 1 wherein said pad has a circular profile and an axis of rotation, wherein the first region has a circular profile about the axis of rotation, wherein the second region has a ring profile and adjoins the first region, and wherein the first region has a hardness greater than a hardness of the second region.

3. An article according to claim 2 wherein a difference in the hardness of the first region and the second region is at least about 5 Shore D.

4. An article according to claim 3 wherein said difference is at least about 10 Shore D.

5. An article according to claim 2 wherein the circular profile of said pad has an area measure, and said first region occupies at least about 75% of said area measure of the circular profile of said pad.

6. An article according to claim 5 wherein said second region and an interface between said first and second regions occupy said remaining area measure of the circular profile of the pad.

7. An article according to claim 1 wherein said hardness differs along a radius normal to a rotational axis of the pad, wherein said polishing pad provides improved planarization for a semiconductor wafer due to a difference in values of said hardness along the radius.

8. An article according to claim 7 wherein the difference in values is determined by a device density on said substrate.

9. An article according to claim 8 wherein the difference in values is additionally determined by a size of technology nodes on said substrate.

10. An article according to claim 7 wherein the difference in values is determined by a size of technology nodes on said substrate.

11. An article according to claim 1 containing a solid lubricant in a polishing surface of said pad.

12. An article according to claim 7 wherein the hardness is selected based on the material to be polished.

13. An article according to claim 12 wherein the material comprises copper.

14. An article according to claim 7 wherein the hardness is selected based on a slurry used in conjunction with the article.

15. An article according to claim 7 wherein the hardness is selected based on polishing equipment used in conjunction with the article.

16. An article according to claim 7 wherein said substrate is a semiconductor wafer and said pad comprises a chemical mechanical planarization pad.

17. A method of planarizing a layer of a semiconductor wafer having patterned features that cause high areas and lower areas in said layer, said method comprising contacting the layer with a polishing pad according to claim 7, and planarizing the layer of the semiconductor wafer by removing the layer in the high areas at a rate that is faster than a rate at which the polishing pad removes the layer in the lower areas.

18. A method of planarizing a layer of a semiconductor wafer having patterned features that cause high areas and lower areas in said layer, said method comprising contacting the layer with an article according to claim 1 and planarizing the layer.

19. A polymeric polishing pad according to claim 1 formed of a synthetic polymer and having an integral interface between a first polymeric layer and a second polymeric layer of the pad.

20. A pad according to claim 19 wherein the first polymeric layer has a first porosity, the second polymeric layer has a second porosity, and the first porosity and the second porosity are not identical.

21. A pad according to claim 19 wherein the first polymeric layer has a first porosity, the second polymeric layer has a second porosity, and the first porosity and the second porosity are identical.

22. A pad according to claim 19 wherein the first polymeric layer and the second polymeric layer are formed of the same reactants but are reacted under different conditions to provide different polymers in the first and second polymeric layers.

23. A pad according to claim 19 wherein the pad additionally comprises a solid lubricant.

24. A pad according to claim 19 wherein said interface is effective to reduce a coefficient of friction of said pad as compared to a comparative pad otherwise identical to said polymeric polishing pad but lacking said interface.

25. A polymeric chemical mechanical planarization pad according to claim 1 comprising a polyurethane thermoset and having a tan delta less than about 1.0.

26. A pad according to claim 25 wherein the tan delta is less than about 0.5.

27. A pad according to claim 25 wherein the pad has a value of E' greater than about 400 Mpa.

28. A pad according to claim 25 wherein the pad has a value of E" greater than about 250 Mpa.

29. A pad according to claim 25 wherein the polyurethane has a value of Tg less than about −30° C.

30. A pad according to claim 25 wherein the polyurethane additionally has urea linkages.

31. A pad according to claim 25 wherein the pad has a ΔE' (20° C.-40° C.) of less than about 20%.

32. A pad according to claim 25 wherein the pad has a compressibility of less than about 1%.

33. A pad according to claim 25 wherein the pad has a surface tension of less than about 25 mN/m.

34. A pad according to claim 25 wherein the pad has a value of KEL less than about 100.

35. A pad according to claim 25 wherein said pad contains an interface.

36. A pad according to claim 35 wherein said interface is an integral interface.

37. A pad according to claim 25 wherein said pad contains a solid lubricant in a polishing surface of said pad.

38. A pad according to claim 25 wherein said pad contains an area that is more transmissive to light than an adjacent area.

39. An article according to claim 1 wherein the unitary polishing pad said first region is near a rotational axis of said unitary polishing pad and said second region is near an outer edge of said pad.

40. An article according to claim 39 containing a solid lubricant in the polishing surface.

41. An article according to claim 40 wherein the solid lubricant is Boron Nitride.

42. An article according to claim 39 containing a local transparent region in the polishing pad which is configured for endpoint detection.

43. An article according to claim 39 wherein the hardness of said second region is less than the hardness of said first region.

44. An article according to claim 39 wherein the pad contains an integral interface normal to the polishing surface wherein the interface is between two polymeric layers.

45. An article according to claim 44 where the first polymeric layer and the second polymeric layer are different polymers.

46. The article according to claim 39 wherein the polymer is formed from thermoset materials.

47. The article of claim 1, said pad providing increased planarity or yield for said substrate when compared to a comparative unitary pad under identical operating conditions that is uniform in regions corresponding to said different regions for said unitary polishing pad but is otherwise identical to said unitary polishing pad.

48. The article of claim 1, said pad having in situ grooves on the polishing surface.

* * * * *